US00RE48297E

(19) United States
(12) Reissued Patent
Ho et al.

(10) Patent Number: US RE48,297 E
(45) Date of Reissued Patent: *Nov. 3, 2020

(54) INTERFERENCE-RESISTANT COMPENSATION FOR ILLUMINATION DEVICES HAVING MULTIPLE EMITTER MODULES

(71) Applicant: Lutron Ketra, LLC, Coopersburg, PA (US)

(72) Inventors: Horace C. Ho, Austin, TX (US); Rebecca Frank, Austin, TX (US)

(73) Assignee: Lutron Ketra, LLC, Coopersburg, PA (US)

( * ) Notice: This patent is subject to a terminal disclaimer.

(21) Appl. No.: 15/970,436

(22) Filed: May 3, 2018

Related U.S. Patent Documents

Reissue of:
(64) Patent No.: 9,332,598
Issued: May 3, 2016
Appl. No.: 14/510,283
Filed: Oct. 9, 2014

U.S. Applications:
(63) Continuation-in-part of application No. 13/970,990, filed on Aug. 20, 2013, now Pat. No. 9,578,724, and
(Continued)

(51) Int. Cl.
*H05B 37/02* (2006.01)
*H05B 33/08* (2020.01)
(Continued)

(52) U.S. Cl.
CPC ..... *H05B 45/22* (2020.01); *H05B 45/37* (2020.01)

(58) Field of Classification Search
CPC ..... H05B 33/0869; H05B 33/0818; H05B 45/37; H05B 45/22
See application file for complete search history.

(56) References Cited

U.S. PATENT DOCUMENTS 4,029,976 A 6/1977 Fish et al.
4,402,090 A 8/1983 Gfeller et al.
(Continued)

FOREIGN PATENT DOCUMENTS

CN 1291282 4/2001
CN 1291282 A 4/2001
(Continued)

OTHER PUBLICATIONS

English Translation of Office Action dated Feb. 2, 2015 in CN Application No. 201080035731.X.
(Continued)

*Primary Examiner* — Angela M Lie
(74) *Attorney, Agent, or Firm* — Condo Roccia Koptiw LLP

(57) ABSTRACT

A method and light emitting diode (LED) illumination device comprising multiple emitter modules are provided. In one embodiment, the method includes bringing to a level insufficient to produce illumination the respective drive currents of all except one of multiple emission LED elements within respective first and second emitter modules for the duration of a measurement interval within respective first and second series of measurement intervals. The measurement intervals are interspersed with periods of illumination, and the first and second series of measurement intervals are separated by respective first and second offsets from a timing reference. An embodiment of an illumination device includes multiple emitter modules, where each emitter module includes multiple emission LED elements and one or more photodetectors. The illumination device further includes a lamp control circuit adapted to perform steps of the method.

40 Claims, 17 Drawing Sheets

Related U.S. Application Data a continuation-in-part of application No. 14/097,339, filed on Dec. 5, 2013, now Pat. No. 9,360,174, and a continuation-in-part of application No. 14/314,530, filed on Jun. 25, 2014, now Pat. No. 9,769,899.

(51) Int. Cl.
*H05B 45/22* (2020.01)
*H05B 45/37* (2020.01)

(56) References Cited

U.S. PATENT DOCUMENTS 4,713,841 A 12/1987 Porter et al.
4,744,672 A 5/1988 Turskey et al.
4,745,402 A 5/1988 Auerbach
4,809,359 A 2/1989 Dockery
5,018,057 A 5/1991 Biggs et al.
5,103,466 A 4/1992 Bazes
5,181,015 A 1/1993 Marshall et al.
5,193,201 A 3/1993 Tymes
5,218,356 A 6/1993 Knapp
5,299,046 A 3/1994 Spaeth et al.
5,317,441 A 5/1994 Sidman
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Borner et al.
6,234,648 B1 5/2001 Borner et al.
6,250,774 B1 6/2001 Begemann et al.
6,333,605 B1 12/2001 Grouev et al.
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 4/2005 Pederson et al.
6,965,205 B2 11/2005 Piepgras et al.
6,969,954 B2 11/2005 Lys
6,975,079 B2 12/2005 Lys et al.
7,006,768 B1 2/2006 Franklin
7,014,336 B1 3/2006 Ducharme et al.
7,038,399 B2 5/2006 Lys et al.
7,046,160 B2 5/2006 Pederson et al.
7,072,587 B2 7/2006 Dietz et al.
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,329,998 B2 2/2008 Jungwirth
7,330,002 B2 2/2008 Joung
7,330,662 B2 2/2008 Zimmerman
7,352,972 B2 4/2008 Franklin
7,358,706 B2 4/2008 Lys
7,359,640 B2 4/2008 Onde et al.
7,362,320 B2 4/2008 Payne et al.
7,372,859 B2 5/2008 Hall et al.
7,400,310 B2 7/2008 LeMay
7,445,340 B2 11/2008 Conner et al.
7,511,695 B2 3/2009 Furukawa et al.
7,525,611 B2 4/2009 Zagar et al.
7,554,514 B2 6/2009 Nozawa
7,573,210 B2 8/2009 Ashdown et al.
7,583,901 B2 9/2009 Nakagawa et al.
7,606,451 B2 10/2009 Morita
7,607,798 B2 10/2009 Panotopoulos
7,619,193 B2 11/2009 Deurenberg
7,649,527 B2 1/2010 Cho et al.
7,659,672 B2 2/2010 Yang
7,683,864 B2 3/2010 Lee et al.
7,701,151 B2 4/2010 Petrucci et al.
7,733,488 B1 6/2010 Johnson
7,737,936 B2 6/2010 Daly
7,801,600 B1 9/2010 Carbunaru et al.
7,828,479 B1 11/2010 Aslan et al.
8,013,538 B2 9/2011 Zampini et al.
8,018,135 B2 9/2011 Van De Ven et al.
8,040,299 B2 10/2011 Kretz et al.
8,044,899 B2 10/2011 Ng et al.
8,044,918 B2 10/2011 Choi
8,057,072 B2 11/2011 Takenaka et al.
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,264,171 B1 * 9/2012 Domer ..... H05B 33/0854 315/291
8,283,876 B2 10/2012 Ji
8,299,722 B2 * 10/2012 Melanson ..... H05B 33/0869 315/291
8,358,075 B2 * 1/2013 Sejkora ..... H05B 33/0869 315/158
8,362,707 B2 * 1/2013 Draper et al. ..... H05B 33/0872 315/149
8,471,496 B2 6/2013 Knapp
8,521,035 B2 8/2013 Knapp et al.
8,556,438 B2 10/2013 McKenzie et al.
8,569,974 B2 10/2013 Chobot
8,595,748 B1 11/2013 Haggerty et al.
8,624,527 B1 1/2014 Meir et al.
8,633,655 B2 1/2014 Kao et al.
8,653,758 B2 * 2/2014 Radermacher et al. ..... H05B 33/0818 315/309
8,680,787 B2 3/2014 Veskovic
8,704,666 B2 4/2014 Baker, Jr.
8,721,115 B2 5/2014 Ing et al.
8,749,172 B2 * 6/2014 Knapp ..... H05B 33/0869 315/185 R
8,773,032 B2 7/2014 May et al.
8,791,647 B2 7/2014 Kesterson et al.

(56) References Cited

U.S. PATENT DOCUMENTS 8,816,600 B2 8/2014 Elder
8,911,160 B2 12/2014 Seo et al.
9,084,310 B2 7/2015 Bedell et al.
9,155,155 B1 10/2015 Ho et al.
9,210,750 B2 12/2015 Van der Veen et al.
9,237,620 B1 1/2016 Knapp et al.
9,247,605 B1 * 1/2016 Ho ..... H05B 45/22
9,332,598 B1 5/2016 Ho et al.
9,337,925 B2 5/2016 Pickard et al.
9,345,097 B1 5/2016 Ho et al.
9,360,174 B2 6/2016 Dong et al.
9,392,660 B2 7/2016 Dias et al.
9,392,663 B2 7/2016 Knapp et al.
9,485,813 B1 11/2016 Lewis et al.
9,497,808 B2 11/2016 Murata et al.
9,500,324 B2 11/2016 Dong
9,510,416 B2 11/2016 Dias et al.
9,538,619 B2 1/2017 Swatsky et al.
9,557,214 B2 * 1/2017 Ho ..... H05B 47/10
9,578,724 B1 * 2/2017 Knapp ..... H05B 45/375
9,651,632 B1 * 5/2017 Knapp ..... H05B 45/24
9,736,895 B1 8/2017 Dong et al.
9,736,903 B2 * 8/2017 Lewis ..... H05B 45/22
9,769,899 B2 * 9/2017 Ho ..... H05B 45/10
9,888,543 B2 2/2018 Chitta et al.
9,954,435 B2 4/2018 Knauss et al.
10,595,372 B2 3/2020 Ho et al.
2001/0020123 A1 9/2001 Diab et al.
2001/0030668 A1 10/2001 Erten et al.
2002/0014643 A1 2/2002 Kubo et al.
2002/0033981 A1 3/2002 Keller et al.
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi, Jr. et al.
2003/0122749 A1 7/2003 Booth, Jr. et al.
2003/0133491 A1 7/2003 Shih
2003/0179721 A1 9/2003 Shurmantine et al.
2004/0044709 A1 3/2004 Cabrera et al.
2004/0052076 A1 3/2004 Mueller et al.
2004/0052299 A1 3/2004 Jay et al.
2004/0101312 A1 5/2004 Cabrera
2004/0136682 A1 7/2004 Watanabe
2004/0201793 A1 10/2004 Anandan et al.
2004/0220922 A1 11/2004 Lovison et al.
2004/0257311 A1 12/2004 Kanai et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al.
2005/0077838 A1 4/2005 Blumel
2005/0110777 A1 5/2005 Geaghan et al.
2005/0169643 A1 8/2005 Franklin
2005/0200292 A1 9/2005 Naugler et al.
2005/0207157 A1 9/2005 Tani
2005/0242742 A1 11/2005 Cheang et al.
2005/0265731 A1 12/2005 Keum et al.
2006/0061288 A1 3/2006 Zwanenburg et al.
2006/0145887 A1 7/2006 McMahon
2006/0164291 A1 7/2006 Gunnarsson
2006/0198463 A1 9/2006 Godin
2006/0220990 A1 10/2006 Coushaine et al.
2006/0227085 A1 10/2006 Boldt et al.
2007/0040512 A1 2/2007 Jungwirth et al.
2007/0109239 A1 5/2007 den Boer et al.
2007/0132592 A1 6/2007 Stewart et al.
2007/0139957 A1 6/2007 Haim et al.
2007/0248180 A1 10/2007 Bowman et al.
2007/0254694 A1 11/2007 Nakagwa et al.
2007/0279346 A1 12/2007 den Boer et al.
2008/0061717 A1 3/2008 Bogner et al.
2008/0107029 A1 5/2008 Hall et al.
2008/0120559 A1 5/2008 Yee
2008/0136334 A1 6/2008 Robinson et al.
2008/0136770 A1 6/2008 Peker et al.
2008/0136771 A1 6/2008 Chen et al.
2008/0150864 A1 6/2008 Bergquist
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0297070 A1 12/2008 Kuenzler et al.
2008/0304833 A1 12/2008 Zheng
2008/0309255 A1 12/2008 Myers et al.
2008/0317475 A1 12/2008 Pederson et al.
2009/0016390 A1 1/2009 Sumiyama et al.
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0171571 A1 7/2009 Son et al.
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer, III et al.
2010/0005533 A1 1/2010 Shamir
2010/0020264 A1 1/2010 Ohkawa
2010/0054748 A1 3/2010 Sato
2010/0061734 A1 3/2010 Knapp
2010/0096447 A1 4/2010 Kwon et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.
2010/0213856 A1 8/2010 Mizusako
2010/0272437 A1 10/2010 Yoon et al.
2010/0301777 A1 12/2010 Kraemer
2010/0327764 A1 12/2010 Knapp
2011/0031894 A1 2/2011 Van De Ven
2011/0044343 A1 2/2011 Sethuram et al.
2011/0052214 A1 3/2011 Shimada et al.
2011/0062874 A1 3/2011 Knapp
2011/0063214 A1 3/2011 Knapp
2011/0063268 A1 3/2011 Knapp
2011/0068699 A1 3/2011 Knapp
2011/0069094 A1 3/2011 Knapp
2011/0069960 A1 3/2011 Knapp et al.
2011/0084701 A1 4/2011 Bancken et al.
2011/0133654 A1 6/2011 McKenzie et al.
2011/0148315 A1 6/2011 Van Der Veen et al.
2011/0150028 A1 6/2011 Nguyen et al.
2011/0187281 A1 8/2011 Lu
2011/0241572 A1 10/2011 Zhang et al.
2011/0248640 A1 10/2011 Welten
2011/0253915 A1 10/2011 Knapp
2011/0299854 A1 12/2011 Jonsson et al.
2011/0309754 A1 12/2011 Ashdown et al.
2012/0056545 A1 3/2012 Radermacher et al.
2012/0153839 A1 6/2012 Farley et al.
2012/0229032 A1 9/2012 Van De Ven et al.
2012/0286694 A1 11/2012 Elder
2012/0299481 A1 11/2012 Stevens
2012/0306370 A1 12/2012 Van De Ven et al.
2013/0009551 A1 1/2013 Knapp
2013/0016978 A1 1/2013 Son et al.
2013/0088522 A1 4/2013 Gettemy et al.
2013/0201690 A1 8/2013 Vissenberg et al.
2013/0257314 A1 10/2013 Alvord et al.
2013/0293147 A1 11/2013 Rogers et al. ..... H05B 33/086 315/297
2014/0028377 A1 1/2014 Rosik et al.
2014/0225529 A1 8/2014 Beczkowski
2014/0333202 A1 11/2014 Hechtfischer
2015/0022110 A1 1/2015 Sisto ..... H05B 33/0866 315/210
2015/0055960 A1 2/2015 Zheng et al.

(56) References Cited

U.S. PATENT DOCUMENTS

| | | | |
|---|---|---|---|
| 2015/0155459 | A1 | 6/2015 | Ishihara et al. |
| 2015/0312990 | A1 | 10/2015 | van de Ven et al. |
| 2015/0351187 | A1 | 12/2015 | McBryde |
| 2015/0377695 | A1 | 12/2015 | Chang et al. |
| 2015/0382425 | A1 | 12/2015 | Lewis et al. |
| 2017/0105260 | A1 | 4/2017 | Ho et al. |
| 2018/0084617 | A1 | 3/2018 | Zhang et al. |
| 2018/0160491 | A1 | 6/2018 | Biery et al. |

FOREIGN PATENT DOCUMENTS

| | | | |
|---|---|---|---|
| CN | 1396616 | | 2/2003 |
| CN | 1396616 | A | 2/2003 |
| CN | 1573881 | | 2/2005 |
| CN | 1573881 | A | 2/2005 |
| CN | 1650673 | | 8/2005 |
| CN | 1650673 | A | 8/2005 |
| CN | 1849707 | | 10/2006 |
| CN | 1849707 | A | 10/2006 |
| CN | 101083866 | | 12/2007 |
| CN | 101083866 | A | 12/2007 |
| CN | 101150904 | | 3/2008 |
| CN | 101150904 | A | 3/2008 |
| CN | 101331798 | | 12/2008 |
| CN | 101331798 | A | 12/2008 |
| CN | 101458067 | | 6/2009 |
| CN | 101458067 | A | 6/2009 |
| CN | 101772988 | A | 7/2010 |
| CN | 102422711 | A | 4/2012 |
| CN | 102573214 | A | 7/2012 |
| CN | 102625944 | A | 8/2012 |
| CN | 103718005 | A | 4/2014 |
| DE | 102007036978 | | 2/2009 |
| EP | 0196347 | | 10/1986 |
| EP | 0196347 | A1 | 10/1986 |
| EP | 0456462 | | 11/1991 |
| EP | 0456462 | A2 | 11/1991 |
| EP | 0677983 | A2 | 10/1995 |
| EP | 1482770 | | 12/2004 |
| EP | 2273851 | | 1/2011 |
| EP | 2273851 | A2 | 1/2011 |
| GB | 2307577 | | 5/1997 |
| GB | 2307577 | A | 5/1997 |
| JP | 06-302384 | | 10/1994 |
| JP | H06302384 | A | 10/1994 |
| JP | 08-201472 | | 8/1996 |
| JP | H08201472 | A | 8/1996 |
| JP | 11-025822 | | 1/1999 |
| JP | H1125822 | A | 1/1999 |
| JP | 2001-514432 | | 9/2001 |
| JP | 2001514432 | A | 9/2001 |
| JP | 2004-325643 | | 11/2004 |
| JP | 2004325643 | A | 11/2004 |
| JP | 2005-539247 | | 12/2005 |
| JP | 2005539247 | A | 12/2005 |
| JP | 2006-260927 | | 9/2006 |
| JP | 2006260927 | A | 9/2006 |
| JP | 2007-266974 | | 10/2007 |
| JP | 2007-267037 | | 10/2007 |
| JP | 2007266974 | A | 10/2007 |
| JP | 2007267037 | A | 10/2007 |
| JP | 2008-507150 | | 3/2008 |
| JP | 2008507150 | A | 3/2008 |
| JP | 2008-300152 | | 12/2008 |
| JP | 2008300152 | A | 12/2008 |
| JP | 2009-134877 | | 6/2009 |
| JP | 2009134877 | A | 6/2009 |
| WO | 00/37904 | | 6/2000 |
| WO | 0037904 | A1 | 6/2000 |
| WO | 03/075617 | | 9/2003 |
| WO | 03075617 | A1 | 9/2003 |
| WO | 2005/024898 | | 3/2005 |
| WO | 2005024898 | A2 | 3/2005 |
| WO | 2007004108 | | 1/2007 |
| WO | 2007/069149 | | 6/2007 |
| WO | 2007069149 | A1 | 6/2007 |
| WO | 2008/065607 | | 6/2008 |
| WO | 2008065607 | A2 | 6/2008 |
| WO | 2008/129453 | | 10/2008 |
| WO | 2008129453 | A1 | 10/2008 |
| WO | 2010/124315 | | 11/2010 |
| WO | 2010124315 | A1 | 11/2010 |
| WO | 2011016860 | A1 | 2/2011 |
| WO | 2012/005771 | | 1/2012 |
| WO | 2012005771 | A2 | 1/2012 |
| WO | 2012/042429 | | 4/2012 |
| WO | 2012042429 | A2 | 4/2012 |
| WO | 2013/142437 | | 9/2013 |
| WO | 2013142437 | A1 | 9/2013 |

OTHER PUBLICATIONS

English Translation of Office Action dated Feb. 17, 2015 in JP Application No. 2012-520587.
English Translation of Office Action dated Mar. 11, 2014 in JP Application No. 2012-523605.
English Translation of Office Action dated Jul. 1, 2014 in JP Application No. 2012-520587.
English Translation of Office Action dated Sep. 24, 2014 in JP Application No. 2012-523605.
English Translation of Office Action dated Nov. 4, 2013 in CN Application No. 201080032373.7.
Int'l Search Report and Written Opinion dated Feb. 4, 2013 in Int'l Application No. PCT/US2012/052774.
Int'l Search Report and Written Opinion dated Feb. 24, 2011 in Int'l Application No. PCT/US2010/001919.
Int'l Search Report and Written Opinion dated Mar. 22, 2010 in Int'l Application No. PCT/US2010/004953.
Int'l Search Report and Written Opinion dated May 16, 2013 in Int'l Application No. PCT/US2013/027157.
Int'l Search Report and Written Opinion dated Jun. 22, 2015 in Int'l Application No. PCT/US2014/068556.
Int'l Search Report and Written Opinion dated Sep. 19, 2012 in Int'l Application No. PCT/US2012/045392.
Int'l Search Report and Written Opinion dated Oct. 12, 2010 in Int'l Application No. PCT/US2010/000219.
Int'l Search Report and Written Opinion dated Oct. 28, 2015 in Int'l Application No. PCT/US2015/037660.
Int'l Search Report and Written Opinion dated Nov. 24, 2010 in Int'l Application No. PCT/US2010/002171.
Notice of Allowance dated Jan. 20, 2012 in U.S. Appl. No. 12/360,467, by Knapp.
Notice of Allowance dated Jan. 28, 2014 in U.S. Appl. No. 13/178,686, by Knapp.
Notice of Allowance dated Feb. 4, 2013 in U.S. Appl. No. 12/806,113, by Knapp.
Notice of Allowance dated Feb. 21, 2014 in U.S. Appl. No. 12/806,118, by Knapp.
Notice of Allowance dated Feb. 25, 2013 in U.S. Appl. No. 12/806,121, by Knapp.
Notice of Allowance dated Mar. 30, 2015 in U.S. Appl. No. 14/097,355, by Logan.
Notice of Allowance dated May 3, 2013 in U.S. Appl. No. 12/806,126, by Knapp.
Notice of Allowance dated May 22, 2015 in U.S. Appl. No. 14/510,212, by Ho.
Notice of Allowance dated Aug. 21, 2014 in U.S. Appl. No. 12/584,143, by Knapp.
Notice of Allowance dated Sep. 11, 2015 in U.S. Appl. No. 13/970,944, by Knapp.
Notice of Allowance dated Sep. 25, 2015 in U.S. Appl. No. 14/604,886, by Lewis.
Notice of Allowance dated Oct. 9, 2015 in U.S. Appl. No. 14/604,881, by Lewis.
Notice of Allowance dated Oct. 15, 2012 in U.S. Appl. No. 12/806,113, by Knapp.
Notice of Allowance dated Oct. 31, 2013 in U.S. Appl. No. 12/924,628, by Knapp.

(56) References Cited

OTHER PUBLICATIONS

Notice of Allowance dated Nov. 6, 2015 in U.S. Appl. No. 14/510,243, by Ho.
Notice of Allowance dated Nov. 18, 2015 in U.S. Appl. No. 12/806,117, by Knapp.
Final Office Action dated Jan. 28, 2015 in U.S. Appl. No. 12/806,117, by Knapp.
Office Action dated Feb. 1, 2012 in U.S. Appl. No. 12/584,143, by Knapp.
Office Action dated Mar. 6, 2015 in U.S. Appl. No. 13/773,322, by Knapp.
Office Action dated Mar. 25, 2015 in U.S. Appl. No. 14/305,472, by Knapp.
Office Action dated Apr. 8, 2015 in U.S. Appl. No. 14/305,456, by Knapp.
Office Action dated Apr. 22, 2014 in U.S. Appl. No. 12/806,114, by Knapp.
Office Action dated May 12, 2011 in U.S. Appl. No. 12/360,467, by Knapp.
Office Action dated May 27, 2015 in U.S. Appl. No. 12/806,117, by Knapp.
Office Action dated Jun. 10, 2013 in U.S. Appl. No. 12/924,628, by Knapp.
Office Action dated Jun. 14, 2013 in U.S. Appl. No. 12/806,117, by Knapp.
Final Office Action dated Jun. 18, 2014 in U.S. Appl. No. 13/231,077, by Knapp.
Office Action dated Jun. 23, 2014 in U.S. Appl. No. 12/806,117, by Knapp.
Final Office Action dated Jun. 23, 2015 in U.S. Appl. No. 12/803,805, by Knapp.
Office Action dated Jun. 27, 2013 in U.S. Appl. No. 13/178,686, by Knapp.
Office Action dated Jun. 29, 2015 in U.S. Appl. No. 13/970,964, by Knapp.
Office Action dated Jul. 9, 2013 in U.S. Appl. No. 12/806,118, by Knapp.
Office Action dated Jul. 10, 2012 in U.S. Appl. No. 12/806,113, by Knapp.
Office Action dated Jul. 11, 2012 in U.S. Appl. No. 12/806,121, by Knapp.
Office Action dated Jul. 28, 2015 in U.S. Appl. No. 14/510,243, by Ho.
Office Action dated Jul. 31, 2015 in U.S. Appl. No. 14/510,266, by Ho.
Office Action dated Aug. 2, 2012 in U.S. Appl. No. 12/806,114, by Knapp.
Office Action dated Aug. 20, 2015 in U.S. Appl. No. 13/970,990, by Knapp.
Final Office Action dated Sep. 2, 2015 in U.S. Appl. No. 13/773,322, by Knapp.
Office Action dated Sep. 10, 2014 in U.S. Appl. No. 12/803,805, by Knapp.
Office Action dated Sep. 12, 2012 in U.S. Appl. No. 12/584,143, by Knapp.
Office Action dated Oct. 2, 2012 in U.S. Appl. No. 12/806,117, by Knapp.
Office Action dated Oct. 9, 2012 in U.S. Appl. No. 12/806,126, by Knapp.
Office Action dated Oct. 11, 2012 in U.S. Appl. No. 12/806,121, by Knapp.
Office Action dated Oct. 24, 2013 in U.S. Appl. No. 12/806,117, by Knapp.
Office Action dated Nov. 4, 2015 in U.S. Appl. No. 14/573,207, by Knapp.
Office Action dated Nov. 12, 2013 in U.S. Appl. No. 13/231,077, by Knapp.
Final Office Action dated Nov. 28, 2011 in U.S. Appl. No. 12/360,467, by Knapp.
Office Action dated Dec. 4, 2013 in U.S. Appl. No. 12/803,805, by Knapp.
Office Action dated Dec. 17, 2012 in U.S. Appl. No. 12/806,118, by Knapp.
Partial Int'l Search Report dated Mar. 27, 2015 in Int'l Application No. PCT/US2014/068556.
Partial Int'l Search Report dated Aug. 21, 2015 in Int'l Application No. PCT/US2015/037660.
Partial Int'l Search Report dated Nov. 16, 2012 in Int'l Application No. PCT/US2012/052774.
Partial Int'l Search Report dated Nov. 18, 2015 in Int'l Application No. PCT/US2015/045252.
International Search Report and the Written Opinion for PCT/US2015/035081 dated Jan. 26, 2016.
International Search Report and the Written Opinion for PCT/US2015/045252 dated Jan. 26, 2016.
Reissue U.S. Appl. No. 16/282,231, filed Feb. 21, 2019.
Reissue U.S. Appl. No. 16/033,917, filed Jul. 12, 2018.
Reissue U.S. Appl. No. 16/205,071, filed Nov. 29, 2018.
Reissue U.S. Appl. No. 15/982,681, filed May 17, 2018.
U.S. Appl. No. 16/819,497, filed Mar. 16, 2020.
Notice of Allowance mailed May 22, 2015 for U.S. Appl. No. 14/510,212.
Hall et al., "Jet Engine Control Using Ethernet with a BRAIN (Postprint)," AIAA/ASME/SAE/ASEE Joint Propulsion Conference and Exhibition, Jul. 2008, pp. 1-18.
Kebemou, "A Partitioning-Centric Approach for the Modeling and the Methodical Design of Automotive Embedded System Architectures," Dissertation of Technical University of Berlin, 2008, 176 pages.
O'Brien et al., "Visible Light Communications and Other Developments in Optical Wireless," Wireless World Research Forum, 2006, 26 pages.
Zalewski et al., "Safety Issues in Avionics and Automotive Databuses," IFAC World Congress, Jul. 2005, 6 pages.
"Visible Light Communication: Tutorial," Project IEEE P802.15 Working Group for Wireless Personal Area Networks (WPANs), Mar. 2008.
Johnson, "Visible Light Communications," CTC Tech Brief, Nov. 2009, 2 pages.
Chonko, "Use Forward Voltage Drop to Measure Junction Temperature," Dec. 2005, (c) 2013 Penton Media, Inc., 5 pages.
International Search Report & Written Opinion, PCT/US2010/000219, mailed Oct. 12, 2010.
International Search Report & Written Opinion, PCT/US2010/004953, mailed Mar. 22, 2010.
International Search Report & Written Opinion, PCT/US2010/001919, mailed Feb. 24, 2011.
Office Action mailed May 12, 2011 for U.S. Appl. No. 12/360,467.
Final Office Action mailed Nov. 28, 2011 for U.S. Appl. No. 12/360,467.
Notice of Allowance mailed Jan. 20, 2012 for U.S. Appl. No. 12/360,467.
Office Action Mailed Feb. 1, 2012 for U.S. Appl. No. 12/584,143.
Final Office Action Mailed Sep. 12, 2012 for U.S. Appl. No. 12/584,143.
Office Action Mailed Aug. 2, 2012 for U.S. Appl. No. 12/806,114.
Office Action Mailed Oct. 2, 2012 for U.S. Appl. No. 12/806,117.
Office Action Mailed Jul. 11, 2012 for U.S. Appl. No. 12/806,121.
Final Office Action Mailed Oct. 11, 2012 for U.S. Appl. No. 12/806,121.
Office Action mailed Dec. 17, 2012 for U.S. Appl. No. 12/806,118.
Office Action mailed Oct. 9, 2012 for U.S. Appl. No. 12/806,126.
Office Action mailed Jul. 10, 2012 for U.S. Appl. No. 12/806,113.
Notice of Allowance mailed Oct. 15, 2012 for U.S. Appl. No. 12/806,113.
International Search Report & Written Opinion mailed Sep. 19, 2012 for PCT/US2012/045392.
Notice of Allowance mailed Feb. 4, 2013 for U.S. Appl. No. 12/806,113.
Notice of Allowance mailed Feb. 25, 2013 for U.S. Appl. No. 12/806,121.

(56) References Cited

OTHER PUBLICATIONS

Notice of Allowance mailed May 3, 2013 for U.S. Appl. No. 12/806,126.
International Search Report & Written Opinion, PCT/US2013/027157, May 16, 2013.
Office Action mailed Jun. 10, 2013 for U.S. Appl. No. 12/924,628.
Final Office Action mailed Jun. 14, 2013 for U.S. Appl. No. 12/806,117.
Office Action mailed Jun. 27, 2013 for U.S. Appl. No. 13/178,686.
Final Office Action mailed Jul. 9, 2013 for U.S. Appl. No. 12/806,118.
Office Action mailed Oct. 24, 2013 for U.S. Appl. No. 12/806,117.
Notice of Allowance mailed Oct. 31, 2013 for U.S. Appl. No. 12/924,628.
Office Action mailed Nov. 12, 2013 for U.S. Appl. No. 13/231,077.
Office Action mailed Dec. 4, 2013 for U.S. Appl. No. 12/803,805.
Office Action mailed Nov. 4, 2013 for CN Application No. 201080032373.7.
Notice of Allowance mailed Jan. 28, 2014 for U.S. Appl. No. 13/178,686.
Notice of Allowance mailed Feb. 21, 2014 for U.S. Appl. No. 12/806,118.
Office Action mailed Apr. 22, 2014 for U.S. Appl. No. 12/806,114.
Final Office Action mailed Jun. 18, 2014 for U.S. Appl. No. 13/231,077.
Office Action mailed Jun. 23, 2014 for U.S. Appl. No. 12/806,117.
Notice of Allowance mailed Aug. 21, 2014 for U.S. Appl. No. 12/584,143.
Office Action mailed Sep. 10, 2014 for U.S. Appl. No. 12/803,805.
"Color Management of a Red, Green, and Blue LED Combinational Light Source," Avago Technologies, Mar. 2010, pp. 1-8.
Final Office Action mailed Jan. 28, 2015 for U.S. Appl. No. 12/806,117.
Office Action mailed Mar. 6, 2015 for U.S. Appl. No. 13/773,322.
Office Action mailed Feb. 2, 2015 for CN Application 201080035731.X.
Office Action mailed Jul. 1, 2014 for JP Application 2012-520587.
Office Action mailed Feb. 17, 2015 for JP Application 2012-520587.
Office Action mailed Mar. 11, 2014 for JP Application 2012-523605.
Office Action mailed Sep. 24, 2014 for JP Application 2012-523605.
Office Action mailed Mar. 25, 2015 for U.S. Appl. No. 14/305,472.
Notice of Allowance mailed Mar. 30, 2015 for U.S. Appl. No. 14/097,355.
Office Action mailed Apr. 8, 2015 for U.S. Appl. No. 14/305,456.
"LED Fundamentals, How to Read a Datasheet (Part 2 of 2) Characteristic Curves, Dimensions and Packaging," Aug. 19, 2011, OSRAM Opto Semiconductors, 17 pages.
International Search Report & Written Opinion for PCT/US2014/068556 mailed Jun. 22, 2015.
Final Office Action for U.S. Appl. No. 12/803,805 mailed Jun. 23, 2015.
Office Action for U.S. Appl. No. 13/970,964 mailed Jun. 29, 2015.
Office Action for U.S. Appl. No. 14/510,243 mailed Jul. 28 2015.
Office Action for U.S. Appl. No. 14/510,266 mailed Jul. 31, 2015.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.
Notice of Allowance for U.S. Appl. No. 13/970,944 mailed Sep. 11, 2015.
Notice of Allowance for U.S. Appl. No. 14/604,886 mailed Sep. 25, 2015.
Notice of Allowance for U.S. Appl. No. 14/604,881 mailed Oct. 9, 2015.
Bouchet et al., "Visible-light communication system enabling 73 Mb/s data streaming," IEEE Globecom Workshop on Optical Wireless Communications, 2010, pp. 1042-1046.
International Search Report & Written Opinion for PCT/US2015/037660 mailed Oct. 28, 2015.
Office Action for U.S. Appl. No. 14/573,207 mailed Nov. 4, 2015.
Partial International Search Report for PCT/US2015/045252 mailed Nov. 18, 2015.

* cited by examiner

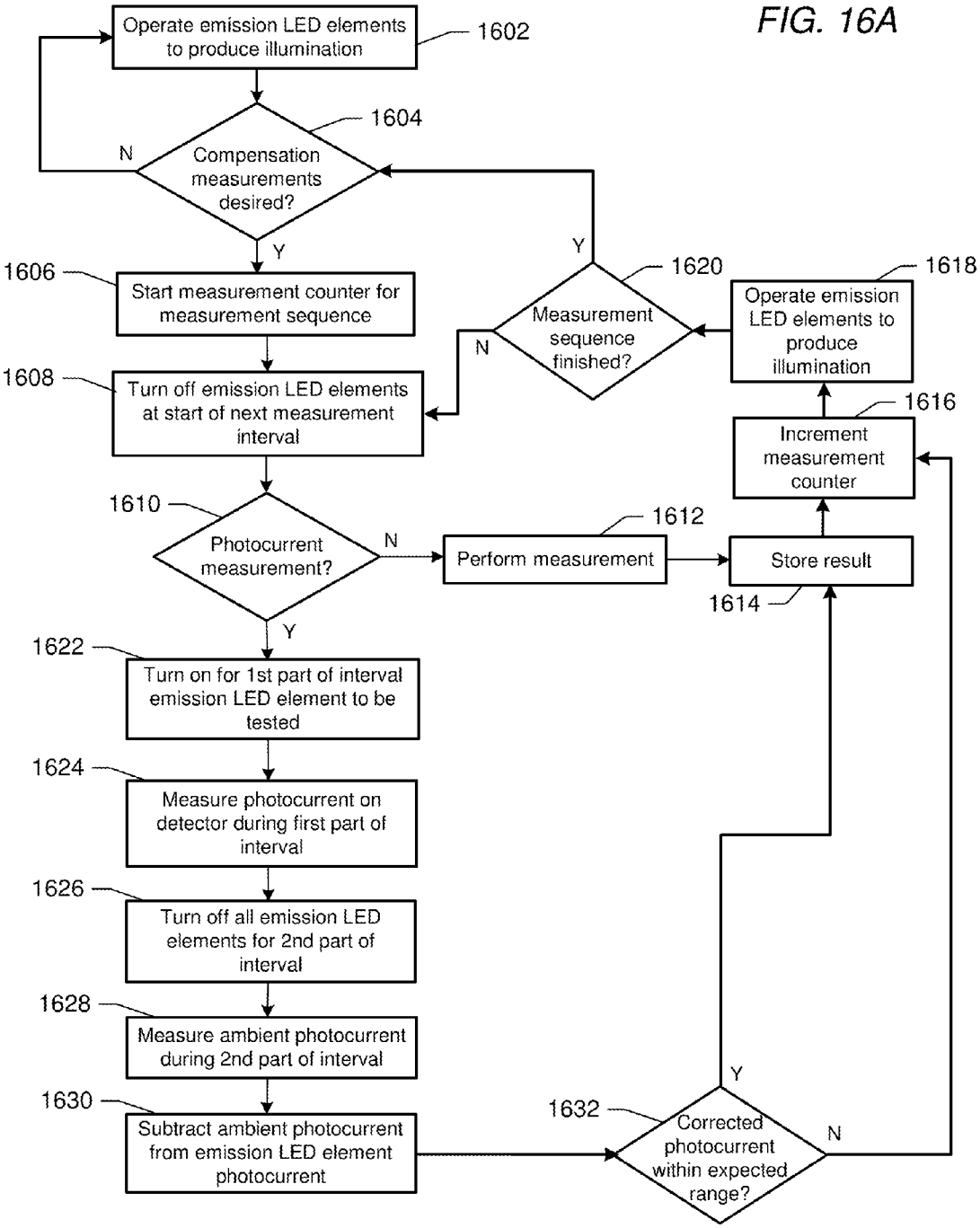
FIG. 16A
Operate emission LED elements to produce illumination
1602
Compensation measurements desired?
1604
N
Y
1606
Start measurement counter for measurement sequence
1608
Turn off emission LED elements at start of next measurement interval
1610
Photocurrent measurement?
N
Y
1612
Perform measurement
Store result
1614
1616
Increment measurement counter
1618
Operate emission LED elements to produce illumination
1620
Measurement sequence finished?
Y
N
1622
Turn on for 1st part of interval emission LED element to be tested
1624
Measure photocurrent on detector during first part of interval
1626
Turn off all emission LED elements for 2nd part of interval
1628
Measure ambient photocurrent during 2nd part of interval
1630
Subtract ambient photocurrent from emission LED element photocurrent
1632
Corrected photocurrent within expected range?
Y
N

1700

| | | 1702 | | | 1704 | | | 1706 | | |
|---|---|---|---|---|---|---|---|---|---|---|
| | | Brand A | | | Brand B | | | Brand C | | |
| | | Meas. | Sens. | Int. | Meas. | Sens. | Int. | Meas. | Sens. | Int. |
| 1708 Interval # | 1 | $V_{f1}$ | N | N | $V_{f1}$ | N | N | $I_{ph1}$ | S | I |
| | 2 | $I_{ph1}$ | S | I | $V_{f2}$ | N | N | $I_{ph2}$ | S | I |
| | 3 | $V_{f2}$ | N | N | $I_{ph1}$ | S | I | $I_{ph3}$ | S | I |
| | 4 | $I_{ph2}$ | S | I | $I_{ph2}$ | S | I | $I_{ph4}$ | S | I |
| | 5 | $V_{f3}$ | N | N | $V_{f3}$ | N | N | $V_{f1}$ | N | N |
| | 6 | $I_{ph3}$ | S | I | $V_{f4}$ | N | N | $V_{f2}$ | N | N |
| | 7 | $V_{f4}$ | N | N | $I_{ph3}$ | S | I | $V_{f3}$ | N | N |
| | 8 | $I_{ph4}$ | S | I | $I_{ph4}$ | S | I | $V_{f4}$ | N | N |
| | 9 | $V_{fd1}$ | N | N | $V_{fd1}$ | N | N | $V_{fd1}$ | N | N |
| | 10 | $V_{fd2}$ | N | N | $V_{fd2}$ | N | N | $V_{fd2}$ | N | N |
| | 11 | -- | N | N | -- | N | N | -- | N | N |
| | 12 | -- | N | N | -- | N | N | -- | N | N |
| 1710 Controlled device | | X | | | | | | | | |
| 1712 # Sens. Meas. | | 4 | | | 4 | | | 4 | | |
| 1714 # Non-sens. Meas. | | 8 | | | 8 | | | 8 | | |
| 1716 Same-seq. non-interfering offset | | Odd # of intervals | | | 2 or 6 intervals | | | 4-8 intervals | | |
| 1718 Interval range including all sens. meas. | | 7 intervals | | | 6 intervals | | | 4 intervals | | |
| 1720 Interval range of contiguous non-sens. meas. | | 5 intervals | | | 6 intervals | | | 8 intervals | | |

*FIG. 17*

INTERFERENCE-RESISTANT COMPENSATION FOR ILLUMINATION DEVICES HAVING MULTIPLE EMITTER MODULES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CONTINUING DATA

The present application is a continuation-in-part of the following: U.S. application Ser. No. 13/970,990 filed Aug. 20, 2013; U.S. application Ser. No. 14/097,339 filed Dec. 5, 2013; and U.S. application Ser. No. 14/314,530 filed Jun. 25, 2014; each of which is hereby incorporated.

BACKGROUND

1. Field of the Invention

This invention relates to illumination devices and, more particularly, to illumination devices comprising a plurality of light emitting diode (LED) elements and to interference-resistant methods for monitoring and adjusting the illumination devices during operation.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subjected mater claimed herein.

Lamps and displays using LEDs (light emitting diodes) for illumination are becoming increasingly popular in many different markets. LEDs provide a number of advantages over traditional light sources such as incandescent and fluorescent light bulbs, including low power consumption, long lifetime, lack of hazardous materials, and additional specific advantages for different applications. When used for general illumination, LEDs provide the opportunity to adjust the color (e.g., from white, to blue, to green, etc.) or the color temperature (e.g., from "warm white" to "cool white") to produce different lighting effects. In addition, LEDs are rapidly replacing the Cold Cathode Fluorescent Lamps (CCFL) conventionally used in many display applications (such as LCD backlights), due to the smaller form factor and wider color gamut provided by LEDs. Organic LEDs (OLEDs), which use arrays of multi-colored organic LEDs to produce light for each display pixel, are also becoming popular for many types of display devices.

LED devices may combine different colors of LEDs within the same package to produce a multi-colored LED device, or lamp. An example of a multi-colored LED device is one in which two or more different colors of LEDs are combined to produce white or near-white light. There are many different types of white light lamps on the market, some of which combine red, green and blue (RGB) LEDs, red, green, blue and yellow (RGBY) LEDs, white and red (WR) LEDs, RGBW LEDs, etc. By combining different colors of LEDs within the same package, and driving the differently colored LEDs with different drive currents, these lamps may be configured to generate white light or near-white light within a wide gamut of color points or color temperatures ranging from "warm white" (e.g., roughly 2600K-3700K), to "neutral white" (e.g., 3700K-5000K) to "cool white" (e.g., 5000K-8300K).

Although LEDs have many advantages over conventional light sources, a disadvantage of LEDs is that their output characteristics tend to vary over temperature, process and time. For example, it is generally known that the luminous flux, or the perceived power of light emitted by an LED, is directly proportional to the drive current supplied thereto. In many cases, the luminous flux of an LED is controlled by increasing/decreasing the drive current supplied to the LED to correspondingly increase/decrease the luminous flux. However, the luminous flux generated by an LED for a given drive current does not remain constant over temperature and time, and gradually decreases with increasing temperature and as the LED ages over time. Furthermore, the luminous flux tends to vary from batch to batch, and even from one LED to another in the same batch, due to process variations.

LED manufacturers try to compensate for process variations by sorting or binning the LEDs based on factory measured characteristics, such as chromaticity (or color), luminous flux and forward voltage. However, binning alone cannot compensate for changes in LED output characteristics due to aging and temperature fluctuations during use of the LED device. In order to maintain a constant (or desired) luminous flux, it is usually necessary to adjust the drive current supplied to the LED to account for temperature variations and aging effects.

As discussed further below, such adjustment may involve compensation measurements of one or more LED elements within a lamp. Interference from a nearby lamp can cause errors in such measurements for a given lamp, potentially resulting in incorrect compensation for the lamp. It would therefore be desirable to develop interference-resistant compensation methods for LED illumination devices, and illumination devices incorporating such methods.

SUMMARY

The following description of various embodiments of an illumination device and a method for controlling an illumination device is not to be construed in any way as limiting the subject matter of the appended claims.

A method is provided herein for controlling an illumination device comprising multiple emitter modules, where each emitter module comprises multiple emission light emitting diodes (LED) elements. An "LED element" as used herein refers to either a single LED or a chain of serially connected LEDs supplied with the same drive current. An "emission LED element" as used herein is an LED element configured for light emission, as opposed to, for example, an LED configured as a light detector. An embodiment of the method includes operating one or more of the multiple emission LED elements in each of the multiple emitter modules at a respective substantially continuous drive current sufficient to produce illumination. The method further includes bringing to a level insufficient to produce illumination the respective drive current of all except one of the emission LED elements within a first emitter module of the multiple emitter modules, for the duration of a first measurement interval within a first series of measurement intervals interspersed with periods of illumination. In addition, an embodiment of the method includes bringing to a level insufficient to produce illumination the respective drive current of all except one of the emission LED elements within a second emitter module of the multiple emitter modules, for the duration of a measurement interval within a second series of measurement intervals interspersed with periods of said operating. The first series of measurement intervals and second series of measurement intervals are separated by a respective first offset and second offset from a timing reference. In an embodiment, the timing reference comprises a periodic timing signal. In a further embodiment, the timing reference is derived from an AC mains signal. In another embodiment, the multiple emitter modules consist of one or more sets of three emitter modules, and each emitter module within a set uses a respective series of measurement intervals having a different offset from the timing reference than that used by the other emitter modules within the set.

The method may further include, for either of the first or second emitter modules, applying to the one of the emission LED elements a drive current sufficient to produce illumination during the measurement interval within the respective first or second series of measurement intervals, and monitoring a respective first or second measurement photocurrent induced in a respective first or second measurement photodetector within the emitter module while the drive current is applied. In a further embodiment, the method includes, for either of the first or second emitter modules, bringing the drive current applied to the one of the emission LED elements to a level insufficient to produce illumination for a portion of the respective measurement interval, such that the respective drive currents of all of the emission LED elements within the respective emitter module are at a level insufficient to produce illumination for the portion of the respective measurement interval. In such an embodiment, the method may further include, for either of the first or second emitter modules and during the portion of the respective measurement interval, monitoring a respective first or second background photocurrent induced in the respective first or second measurement photodetector. In addition, the method may further include, for either of the first or second emitter modules, subtracting the respective first or second background photocurrent from the respective first or second measurement photocurrent. In an embodiment, the result of this subtraction, for either of the first or second emitter modules, is stored as a respective first or second corrected photocurrent. In a further embodiment, storing a result of the subtraction is in response to a determination that the result is within an expected range.

In addition to the method embodiments described above, an illumination device is contemplated herein. In one embodiment, the device includes multiple emitter modules, where each emitter module includes multiple emission LED elements and one or more photodetectors. The device further includes a control circuit operably coupled to the multiple emitter modules. The control circuit is adapted to operate one or more of the multiple emission LED elements within each of the multiple emitter modules at a respective substantially continuous drive current to produce illumination. In an embodiment, the control circuit is further adapted to bring to a level insufficient to produce illumination the respective drive current of all except one of the emission LED elements within a first emitter module of the multiple emitter modules, for the duration of a measurement interval within a first series of measurement intervals interspersed with periods of illumination. The control circuit is further adapted in such an embodiment to bring to a level insufficient to produce illumination the respective drive currents of all except one of the emission LED elements within a second emitter module of the multiple emitter modules, for the duration of a measurement interval within a second series of measurement intervals interspersed with periods of illumination. The first series of measurement intervals and second series of measurement intervals are separated by a respective first offset and second offset from a timing reference.

In a further embodiment, the illumination device also includes a timing reference generator operatively coupled to the control circuit and adapted to generate the timing reference. In a still further embodiment, the timing reference comprises a periodic timing signal and the timing reference generator comprises a phase-locked loop. In another embodiment, the illumination device further includes multiple driver circuits operably coupled to respective emitter modules of the multiple emitter modules and to the control circuit, and the control circuit is configured to adjust a drive current of an LED element within an emitter module by providing a drive current setting to a respective driver circuit for the emitter module.

In another embodiment, the control circuit is further adapted to, for each of the first and second emitter modules, apply to the one of the emission LED elements a drive current sufficient to produce illumination during the measurement interval within the respective first or second series of measurement intervals, and monitor a respective first or second measurement photocurrent induced in a respective first or second measurement photodetector within the emitter module during the time the drive current sufficient to produce illumination is applied. In a further embodiment, the control circuit is further adapted to, for each of the first and second emitter modules, bring the drive current applied to the one of the emission LED elements to a level insufficient to produce illumination for a portion of the respective measurement interval, such that the respective drive currents of all of the emission LED elements within the respective emitter module are at a level insufficient to produce illumination for the portion of the respective measurement interval. The control circuit may be further adapted to monitor a respective first or second background photocurrent induced in the respective first or second measurement photodetector during the portion of the respective measurement interval. In a further embodiment, the control circuit is further adapted to, for each of the first and second emitter modules, subtract the respective first or second background photocurrent from the respective first or second measurement photocurrent.

In a further embodiment, the illumination device also includes a plurality of storage locations accessible by the control circuit, and the control circuit is further adapted to store a result of subtracting the first or second background photocurrent from the first or second measurement photocurrent in one or more of the storage locations as a first or second corrected photocurrent. In a still further embodiment, the control circuit is further adapted to determine whether the result of the subtraction is within an expected range and store the result in response to a determination that the result is within an expected range. In another embodiment, the control circuit includes a respective module control circuit for each emitter module within the illumination device. In a further embodiment, the control circuit also includes a device control circuit adapted to provide to each of the module control circuits a respective offset from the timing reference for the respective series of measurement intervals used by the respective emitter module. In still another embodiment, the multiple emitter modules consist of one or more sets of three emitter modules, and the control circuit is further adapted to use, for each emitter module within a set, a respective measurement interval having a different offset from the timing reference than that of the other emitter modules within the set.

BRIEF DESCRIPTION OF THE DRAWINGS

Other objects and advantages of the invention will become apparent upon reading the following detailed description and upon reference to the accompanying drawings.

FIG. 16A is a flow chart illustrating an exemplary method disclosed for controlling a lamp to perform compensation measurements;

FIG. 17 is a chart illustrating exemplary configuration information that may be stored within an illumination device and used in embodiments of methods described herein;

Figure 1:
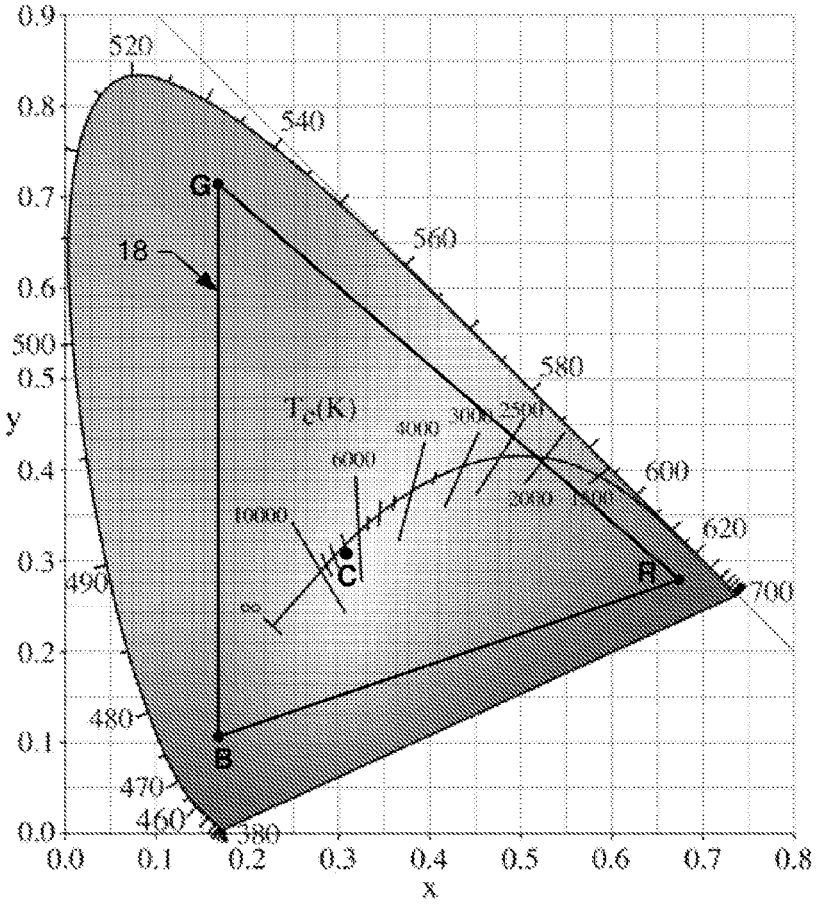
FIG. 1 is a graph of the 1931 CIE chromaticity diagram illustrating the gamut of human color perception and the gamut achievable by an illumination device comprising a plurality of multiple color LEDs (e.g., red, green and blue)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EXEMPLARY EMBODIMENTS

An LED generally comprises a chip of semiconducting material doped with impurities to create a p-n junction. As in other diodes, current flows easily from the p-side, or anode, to the n-side, or cathode, but not in the reverse direction. Charge-carriers—electrons and holes—flow into the junction from electrodes with different voltages. When an electron meets a hole, it falls into a lower energy level, and releases energy in the form of a photon (i.e., light). The wavelength of the light emitted by the LED, and thus its color, depends on the band gap energy of the materials forming the p-n junction of the LED.

Red and yellow LEDs are commonly composed of materials (e.g., AlInGaP) having a relatively low band gap energy, and thus produce longer wavelengths of light. For example, most red and yellow LEDs have a peak wavelength in the range of approximately 610-650 nm and approximately 580-600 nm, respectively. On the other hand, green and blue LEDs are commonly composed of materials (e.g., GaN or InGaN) having a larger band gap energy, and thus, produce shorter wavelengths of light. For example, most green and blue LEDs have a peak wavelength in the range of approximately 515-550 nm and approximately 450-490 nm, respectively.

In some cases, a "white" LED may be formed by covering or coating, e.g., a violet or blue LED having a peak emission wavelength of about 400-490 nm with a phosphor (e.g., YAG), which down-converts the photons emitted by the blue LED to a lower energy level, or a longer peak emission wavelength, such as about 525 nm to about 600 nm. In some cases, such an LED may be configured to produce substantially white light having a correlated color temperature (CCT) of about 3000K. However, a skilled artisan would understand how different colors of LEDs and/or different phosphors may be used to produce a "white" LED with a potentially different CCT.

When two or more differently colored LEDs are combined within a single package, the spectral content of the individual LEDs is combined to produce blended light. In some cases, differently colored LEDs may be combined to produce white or near-white light within a wide gamut of color points or CCTs ranging from "warm white" (e.g., roughly 2600K-3000K), to "neutral white" (e.g., 3000K-4000K) to "cool white" (e.g., 4000K-8300K). Examples of white light illumination devices include, but are not limited to, those that combine red, green and blue (RGB) LEDs, red, green, blue and yellow (RGBY) LEDs, white and red (WR) LEDs, and RGBW LEDs.

The illumination devices disclosed herein may in certain embodiments include one or more emitter modules, which may also be called lamps. An emitter module has a plurality of LED elements and one or more photodetectors combined into a package. As noted above, an LED element may be either a single LED or a chain of serially connected LEDs supplied with the same drive current. An LED element configured for its junction(s) to have sufficient forward bias for light emission may be referred to herein as an "emission LED element." An LED may also be configured as a photodetector, typically by applying zero bias or reverse bias to the LED junction and collecting photocurrent induced by incident light. In an embodiment, multiple LEDs configured as photodetectors may be connected in parallel so that their photocurrents can be combined.

Although not limited to such, the present invention is particularly well suited to multi-colored illumination devices in which two or more different colors of LEDs are combined to produce blended white or near-white light, since the output characteristics of differently colored LEDs vary differently over drive current, temperature and time. The present invention is also particularly well suited to illumination devices (i.e., tunable illumination devices) that enable the target dimming level and/or the target chromaticity setting to be changed by adjusting the drive currents supplied to one or more of the LEDs, since changes in drive current inherently affect the lumen output, color and temperature of the illumination device. These tunable illumination devices should all produce the same color and color rendering index (CRI) when set to a particular dimming level and chromaticity setting (or color set point) on a standardized chromaticity diagram.

A chromaticity diagram maps the gamut of colors the human eye can perceive in terms of chromaticity coordinates and spectral wavelengths. An example of a chromaticity diagram is shown in FIG. 1. The spectral wavelengths of all saturated colors are distributed around the edge of an outlined space (called the "gamut" of human vision), which encompasses all of the hues perceived by the human eye. The curved edge of the gamut is called the spectral locus and corresponds to monochromatic light, with each point representing a pure hue of a single wavelength. The straight edge on the lower part of the gamut is called the line of purples. These colors, although they are on the border of the gamut, have no counterpart in monochromatic light. Less saturated colors appear in the interior of the figure, with white and near-white colors near the center.

In the 1931 Commission Internationale de l'Êclairage (CIE) Chromaticity Diagram of FIG. 1, colors within the gamut of human vision are mapped in terms of chromaticity coordinates (x, y). The diagram of FIG. 1 is only one illustrative example of how perceived colors may be represented using a two-dimensional space, and other "color spaces," with corresponding chromaticity values, may also be used. Some exemplary color spaces include the CIE 1931 XYZ color space, the CIE 1931 RGB color space, the CIE 1976 LUV color space, and various other RGB color spaces (e.g., sRGB, Adobe RGB, etc.). Wavelength in nanometers (nm) of the corresponding monochromatic light is indicated along the curved edge of the gamut in FIG. 1. The dominant wavelength, as perceived by the eye, of a point within the gamut may be found using a line including the point and a reference point for the illumination source, such as point C of FIG. 1 corresponding to the CIE-C reference. The dominant wavelength under the reference illumination is read at the intersection of the line with the curved edge of the gamut. For example, a red (R) LED with a dominant wavelength of about 640 nm may have a chromaticity coordinate of (0.68, 0.28), a green (G) LED with a dominant wavelength of about 525 nm may have a chromaticity coordinate of (0.17, 0.72), and a blue (B) LED with a dominant wavelength of 465 nm may have a chromaticity coordinate of (0.16, 0.11). This dominant wavelength perceived by the eye does not necessarily correspond to the peak wavelength, or wavelength of highest intensity, emitted from an LED.

The color of an incandescent black body as a function of temperature in Kelvin is also plotted on the diagram of FIG. 1, in a curve known as the blackbody locus. The chromaticity coordinates (i.e., color points) that lie along the blackbody locus obey Planck's equation, $E(\lambda)=A\lambda^{-5}/(e^{(B/T)}-1)$. Color points that lie on or near the blackbody locus provide a range of white or near-white light with color temperatures ranging between approximately 2500K and 10,000K. These color points are typically achieved by mixing light from two or more differently colored LEDs. For example, light emitted from the RGB LEDs plotted in FIG. 1 may be mixed to produce a substantially white light with a color temperature in the range of about 2500K to about 5000K.

Although an illumination device is typically configured to produce a range of white or near-white color temperatures arranged along the blackbody curve (e.g., about 2500K to 5000K), some illumination devices may be configured to produce any color within the color gamut, such as triangular color gamut 18 of FIG. 1, formed by the individual LEDs (e.g., RGB). The chromaticity coordinates of the combined light, e.g., (0.437, 0.404) for 3000K white light, define the target chromaticity or color set point at which the device is intended to operate. In some devices, the target chromaticity or color set point may be changed by altering the ratio of drive currents supplied to the individual LEDs.

In general, the target chromaticity of the illumination device may be changed by adjusting the drive current levels (in current dimming) or duty cycle (in PWM dimming) supplied to one or more of the emission LEDs. For example, an illumination device comprising RGB LEDs may be configured to produce "warmer" white light by increasing the drive current supplied to the red LEDs and decreasing the drive currents supplied to the blue and/or green LEDs. Since adjusting the drive currents also affects the lumen output and temperature of the illumination device, the target chromaticity must be carefully calibrated and controlled to ensure that the actual chromaticity equals the target value.

Figure 2:
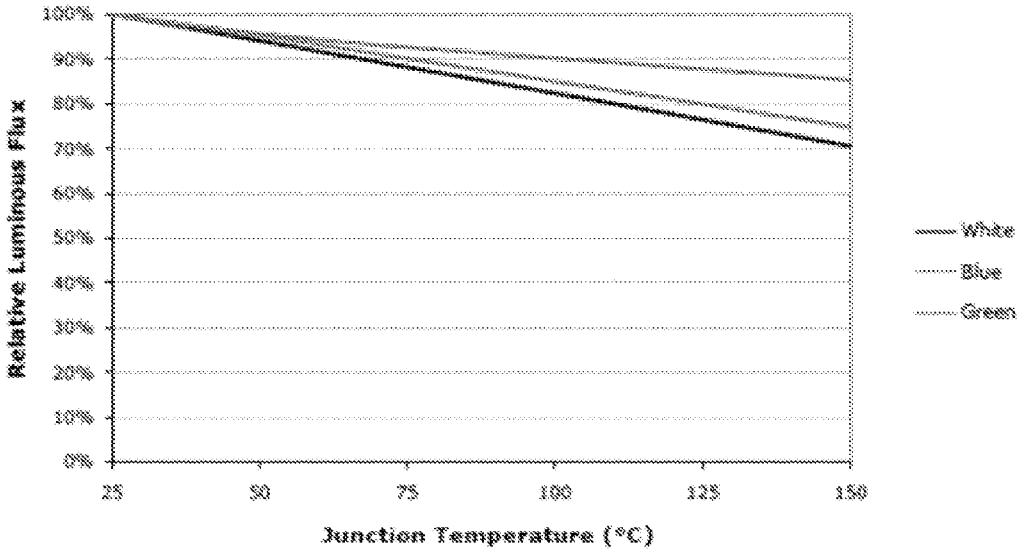
FIG. 2 is a graph illustrating the non-linear relationship between relative luminous flux and junction temperature for white, blue and green LEDs.
Figure 3:
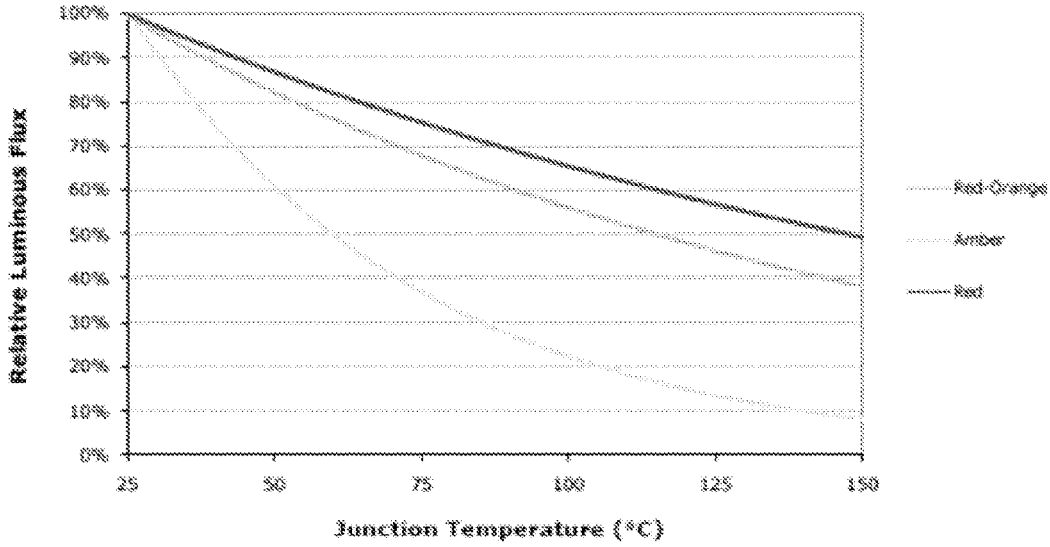
FIG. 3 is a graph illustrating the substantially more non-linear relationship between relative luminous flux and junction temperature for red, red-orange and yellow (amber) LEDs.

FIGS. 2-3 illustrate how the relative luminous flux of an individual LED changes over junction temperature for different colors of LEDs. As shown in FIGS. 2-3, the luminous flux output from all LEDs generally decreases with increasing temperature. For some colors (e.g., white, blue and green), the relationship between luminous flux and junction temperature is relatively linear (see FIG. 2), while for other colors (e.g., red, orange and especially yellow) the relationship is significantly non-linear (see, FIG. 3). The chromaticity of an LED also changes with temperature, due to shifts in the dominant wavelength (for both phosphor converted and non-phosphor converted LEDs) and changes in the phosphor efficiency (for phosphor converted LEDs). In general, the peak emission wavelength of green LEDs tends to decrease with increasing temperature, while the peak emission wavelength of red and blue LEDs tends to increase with increasing temperature. While the change in chromaticity is relatively linear with temperature for most colors, red and yellow LEDs tend to exhibit a more significant non-linear change.

Figure 4:
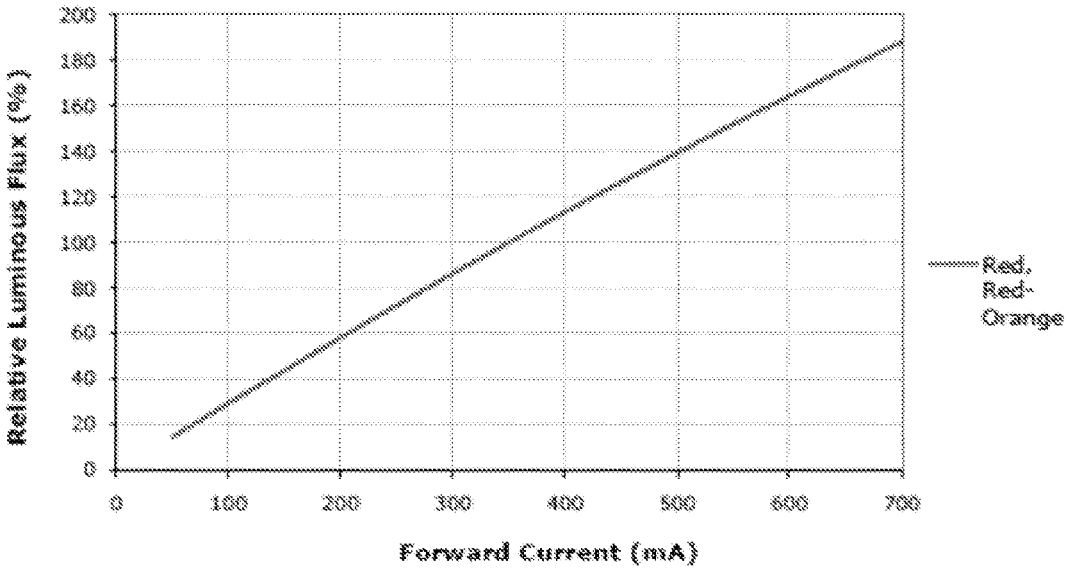
FIG. 4 is a graph illustrating the non-linear relationship between relative luminous flux and drive current for red and red-orange LEDs.
Figure 5:
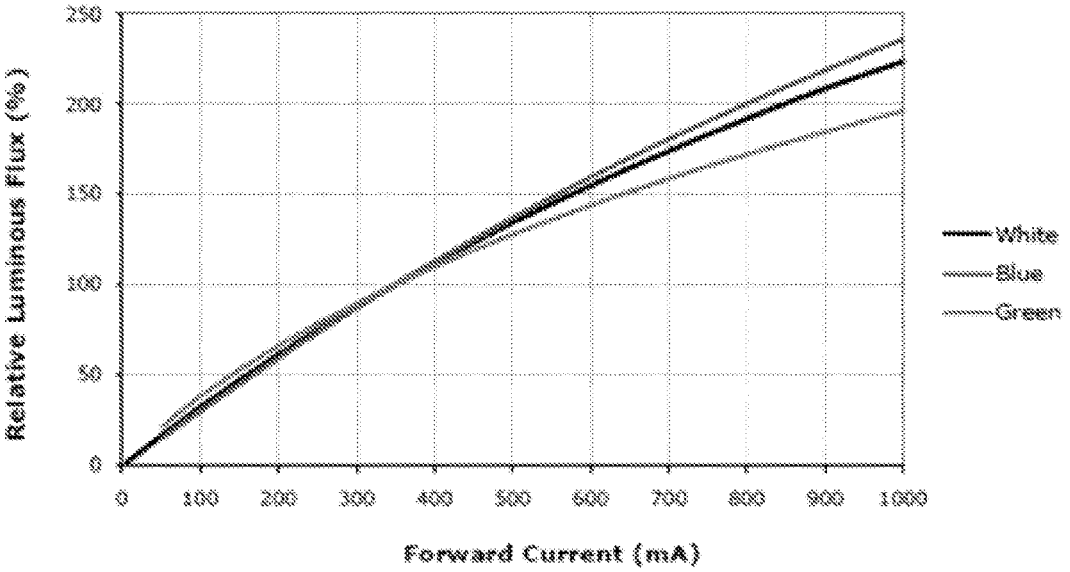
FIG. 5 is a graph illustrating the substantially more non-linear relationship between relative luminous flux and drive current for white, blue and green LEDs.

FIGS. 4 and 5 illustrate the relationship between luminous flux and drive current for different colors of LEDs (e.g., red, red-orange, white, blue and green LEDs). In general, the luminous flux increases with larger drive currents, and decreases with smaller drive currents. However, the change in luminous flux with drive current is non-linear for all colors of LEDs, and this non-linear relationship is substantially more pronounced for certain colors of LEDs (e.g., blue and green LEDs) than others. The chromaticity of the illumination also changes when drive currents are increased to combat temperature and/or aging effects, since larger drive currents inherently result in higher LED junction temperatures (see, FIGS. 2-3). While the change in chromaticity with drive current/temperature is relatively linear for all colors of LEDs, the rate of change is different for different LED colors and even from part to part.

U.S. application Ser. Nos. 13/970,990 and 14/314,530, co-pending with the present application and commonly owned and/or subject to assignment with the present application, describe methods of compensation for variation in quantities including temperature and drive current, and illumination devices employing such methods. Approaches described in these applications to compensating for variations in luminous flux from LEDs, such as the effects illustrated by FIGS. 2-5, in some embodiments include the use of calibration tables created for the LEDs within an illumination device. Such calibration tables store results of calibration measurements previously made using the LEDs. In an embodiment, a calibration table stores values of photocurrent induced on a photodetector within the illumination device when a drive current is applied to each LED within the device separately. Such a calibration table may in some embodiments store photocurrent values obtained when applying multiple different drive current levels to an LED. In some embodiments in which photocurrent values are obtained when applying different drive current levels, forward voltage measurements are obtained for each LED after each drive current is applied. Such forward voltage measurements can be used as an indication of junction temperature in the LED. The calibration table may in further embodiments store photocurrent values obtained at different values of ambient temperature. Other types of data and variations of the above-described data may also be included in a calibration table, as described in more detail in co-pending application Ser. Nos. 13/970,990 and 14/314,530. In general, the data stored in a calibration table is in some embodiments used for comparison to measurements made during operation of the illumination device. Such comparison can be used to indicate whether properties of one or more of the LEDs within the device have changed, and whether the corresponding drive current of the LED should be adjusted.

Figure 6:
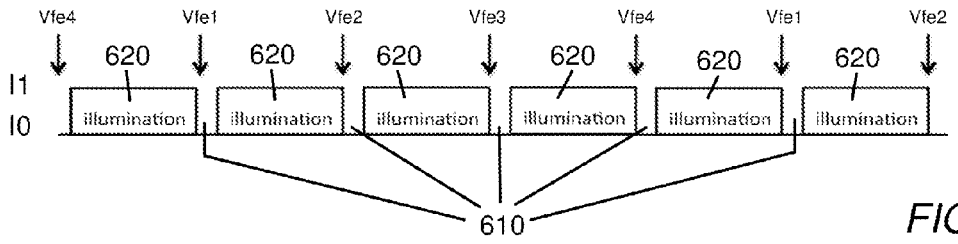
FIG. 6 is an exemplary timing diagram for an illumination device comprising four emission LEDs, illustrating intervals during which emitter forward voltage measurements are obtained from each emission LED, one LED at a time.
Figure 7:
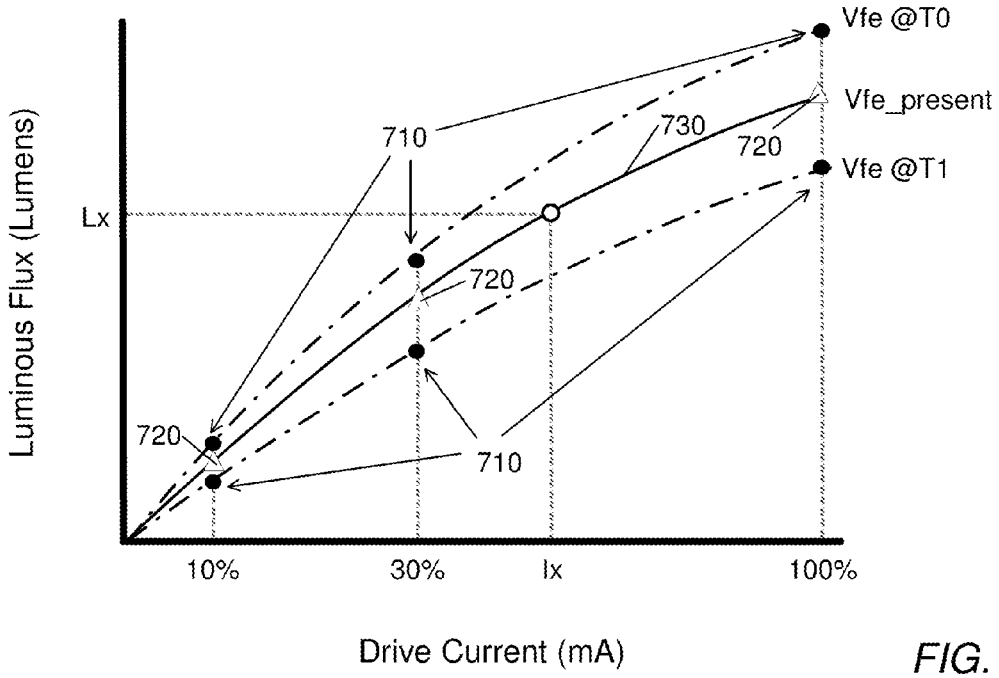
FIG. 7 is a graphical representation depicting how one or more interpolation technique(s) may be used in a compensation method to determine the drive current needed to produce a desired luminous flux for a given LED using previously-obtained calibration values stored within the illumination device.
Figure 8:
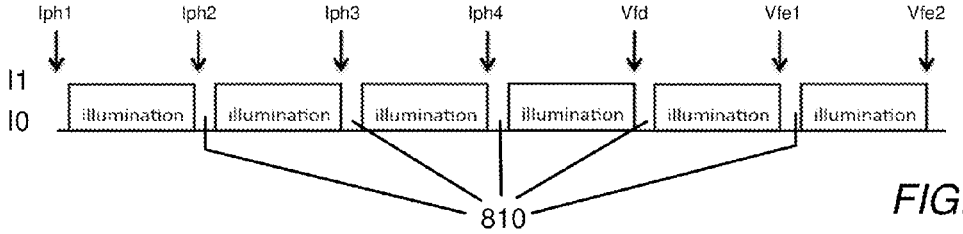
FIG. 8 is an exemplary timing diagram for an illumination device comprising four emission LEDs and one or more photodetectors, illustrating intervals during which measurements are taken of photocurrent, detector forward voltage and emitter forward voltage.
Figure 9:
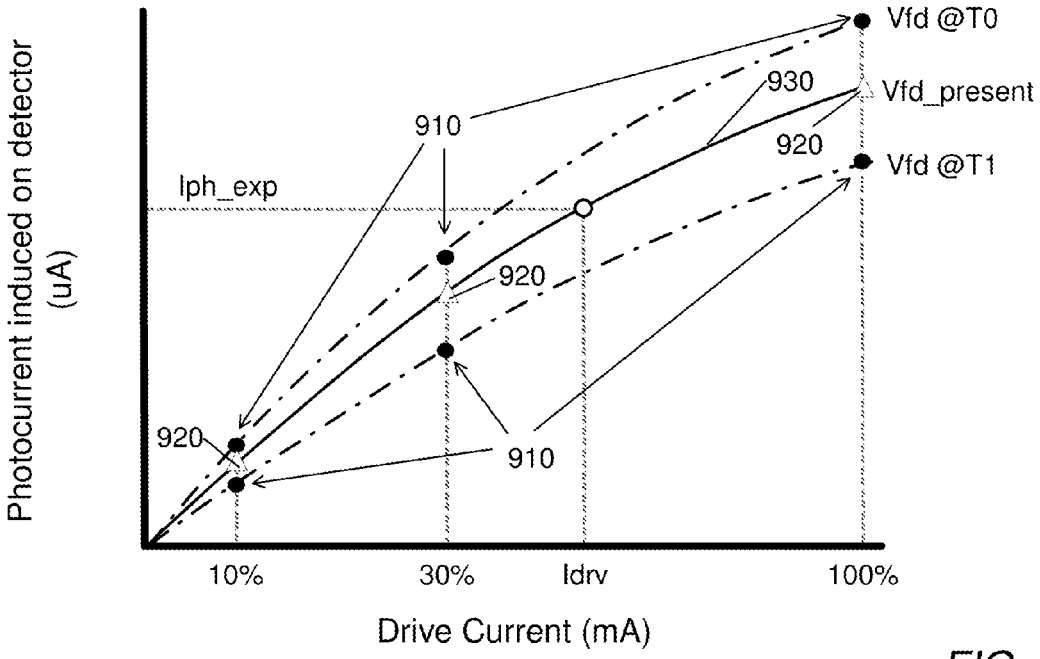
FIG. 9 is a graphical representation depicting how one or more interpolation technique(s) may be used in a compensation method to determine the expected photocurrent value for a given LED using the present forward voltage, the present drive current and previously-obtained calibration values stored within the illumination device.

Exemplary compensation approaches for an illumination device including multiple emission LED elements and at least one photodetector are illustrated by FIGS. 6-8. FIG. 6 is an exemplary timing diagram illustrating substantially continuous operation of one or more of the LED elements to produce illumination. As used herein, the term "substantially continuously" means that an operative drive current (denoted generically as I1 in FIG. 6) is supplied to the emission LED elements almost continuously, with the exception of intervals in which all of the emission LED elements are momentarily turned "off" for short durations of time 610. As used herein, "off" in connection with an LED element refers to the LED element having a drive current reduced to a non-operative level, such that the LED element does not produce illumination that is generally detectable by the detectors used in the illumination device or in nearby devices. In an embodiment, drive current I1 represents a combination of different drive currents applied as appropriate to respective different LED elements within the illumination device, to produce the desired illumination. In the exemplary embodiment of FIG. 6, the intervals are utilized for obtaining forward voltage measurements from each of four emission LED elements (Vfe), one LED element at a time, by supplying a relatively small drive current to each LED and measuring the forward voltage developed thereacross. The intervals may also be used for other types of measurements, as shown in FIGS. 8-9 and discussed in more detail below. In certain embodiments discussed further below, all LED elements within the illumination device remain off throughout some of the intervals to allow detection to determine whether measurements are being conducted by a different illumination device.

In the embodiment of FIG. 6, the illumination device includes at least four emission LED elements. In an embodiment, the device includes exactly four emission LED elements, and the forward voltage across each element is measured, one at a time during successive respective measurement intervals. Unless specified otherwise, a measurement performed "during" an interval as used herein is performed within the interval, but not necessarily for the entirety of the interval. In such an embodiment the four emission LED elements may be of different colors to form a multi-color lamp. In some embodiments the multicolor lamp may be configured to produce white light, as described above. During illumination periods 620, one or more of the LED elements are driven with respective DC drive currents to produce illumination. In an embodiment, all of the LED elements in the lamp are driven during illumination periods 620. In other embodiments, depending on the color, intensity, and/or pattern of light desired, fewer than all of the LED elements may be driven during the illumination periods. With the exception of the LED under test, all emission LED elements within the device are turned off throughout intervals 610, however, with their respective drive currents removed or at least reduced to non-operative levels (denoted as I0 in FIG. 6). In an embodiment, intervals 610 are part of a periodic series having a specific offset (which may be zero) from a periodic timing reference.

The plot in FIG. 7 of luminous flux vs. LED drive current illustrates an exemplary technique of using calibration values to determine the drive current (Ix) needed to achieve a desired luminous flux (Lx) from an emission LED element at its present operating temperature (reflected in the present value of Vfe, Vfe_present, for the LED element measured during one of intervals 610 of FIG. 6). Data points 710, denoted by filled circles, represent luminous flux values from a calibration table, obtained during calibration of the LED element using three different drive currents (10%, 30% and 100% of the maximum drive current, in the embodiment of FIG. 7) and two different ambient temperatures T0 and T1. Each of data points 710 may be associated with a respective forward voltage value Vfe in the calibration table, obtained just before or just after the respective luminous flux measurement at the respective drive current and ambient temperature value. Comparison of these forward voltages in the calibration table for a given LED element to a forward voltage measured during operation can allow the present temperature T_present to be estimated. In an embodiment, interpolation between the calibration values 710 is used to predict luminous flux values 720, denoted by unfilled triangles, corresponding to the calibration drive currents at the current operating temperature (T_present). In a further embodiment, an interpolation or curve-fitting using predicted values 720 is used to generate a relationship, plotted as curve 730, for luminous flux vs. drive current at the present operating temperature. The drive current Ix needed to produce the desired luminous flux Lx can then be obtained from the generated relationship. As described further in the above-referenced co-pending applications, the specific interpolation techniques used may depend on the characteristics of the LED element being compensated, along with considerations such as memory and processing capability. The approach illustrated in FIGS. 6 and 7 is employed in embodiments of methods for maintaining a target luminous flux from an LED element in spite of changes in the LED element's temperature.

Another example of a compensation method is illustrated by FIGS. 8 and 9. The timing diagram of FIG. 8 is similar to that of FIG. 6, with operative drive current I1 supplied to one or more of the emission LED elements within an illumination device almost continuously, with the exception of intervals during which all of the emission LED elements, except for the emission LED under test, are momentarily turned off for short durations of time 810. In the embodiment of FIG. 8, the first four of intervals 810 are used for measuring a photocurrent (Iph) induced on a photodetector within the illumination device, in response to illumination that is produced by each emission LED element, one LED element at a time. During each photocurrent measurement, the emission LED under test is driven with an operative drive current level. In an embodiment, such photocurrent measurements allow detection of changes in the luminous flux produced by an LED element at a given drive current, as may occur in LEDs over time.

The plot in FIG. 9 of photocurrent induced on a detector as a function of LED drive current illustrates an exemplary technique of using calibration values to determine the expected photocurrent (Iph_exp) induced by a particular drive current (Ix) applied to an emission LED element at the present detector temperature (reflected in the present value of the forward voltage measured across the detector, Vfd_present, during one of intervals 810 of FIG. 8). Data points 910, denoted by filled circles, represent photocurrent values from a calibration table, obtained during calibration of an LED element using three different drive currents (10%, 30% and 100% of the maximum drive current, in the embodiment of FIG. 9) and two different ambient temperatures (corresponding to Vfd0 and Vfd1 measured at ambient temperatures T0 and T1). In an embodiment, interpolation between the calibration values is used to predict expected photocurrent values 920, denoted by unfilled triangles, corresponding to the calibration drive currents at the current detector temperature (Vfd_present). In a further embodiment, an interpolation or curve-fitting using predicted values 920 is used to generate a relationship, plotted as curve 930, for expected photocurrent vs. drive current at the present detector temperature. The expected photocurrent induced on the detector by an LED operated at the present value of drive current (for example, a drive current obtained using the method illustrated in FIGS. 6 and 7) can then be obtained from the generated relationship. This expected value can then be compared to the corresponding presently measured photocurrent obtained during one of intervals 810 shown in FIG. 8. In an embodiment of a compensation method, a difference between the measured and expected values indicates a change in the light intensity generated by the LED element over time. Such an "aging" effect may be compensated for by adjusting the drive current applied to the LED element, as described in co-pending application Ser. No. 14/314,530.

FIGS. 6-9 illustrate two examples of compensation methods. As discussed further in the above-referenced co-pending applications, other compensation methods may be used instead of or in combination with these methods. For example, variations in additional quantities, such as x and y chromaticity values, can be compensated for. In some embodiments, adjustment to compensate for one quantity may cause a variation in another, such that compensation methods are iterated until stable desired settings are achieved. Other embodiments of compensation methods may also include taking additional or different measurements than those indicated in FIGS. 6 and 8. For example, photocurrent measurements may include measurements using each of multiple photodetectors, where each photodetector is configured for sensitivity to a different spectral range.

As shown by the examples above and described further in the co-pending applications referenced herein, it can be advantageous to take measurements during brief interruptions in illumination by an LED illumination device. When used in conjunction with calibration data, such measurements allow monitoring and correction of variations from desired settings. In one embodiment, a series of intervals such as intervals 610 of FIG. 6 may extend for the entire time that an illumination device is operating. In such an embodiment, a sequence of compensation measurements may be repeated continuously, one measurement per interval, while the illumination device is operating.

Figure 10:
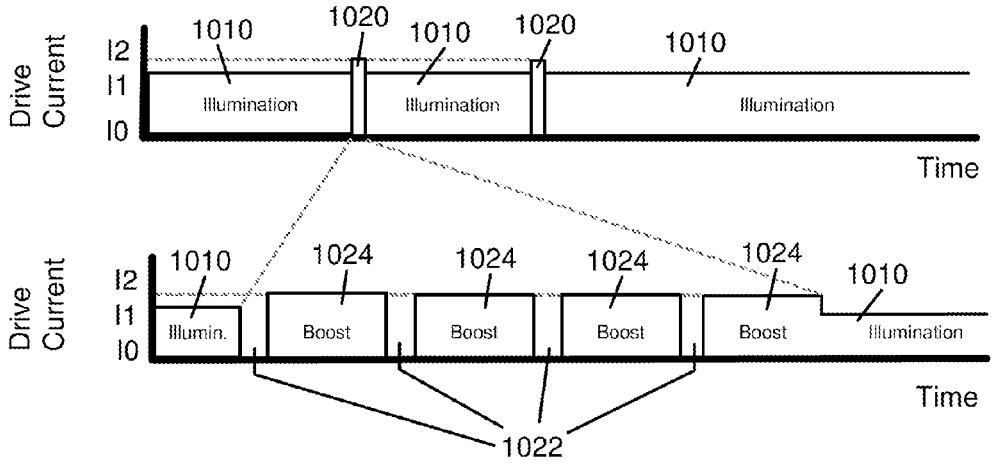
FIG. 10 is an exemplary timing diagram illustrating an embodiment for which the measurement intervals of FIG. 6 or FIG. 8 are within compensation periods occurring relatively infrequently, and for which illumination drive currents are increased during a compensation period to avoid flicker.

In an alternative embodiment, compensation using intervals such as intervals 610 of FIG. 6 is performed only at certain times during operation of an illumination device. For example, compensation may be performed when a significant change in ambient temperature has been detected, or when there has been a change in settings for the illumination device. Timing diagrams illustrating performance of compensation at selected times are shown in FIG. 10. The upper diagram of FIG. 10 illustrates periods 1010 of continuous illumination produced by application of an operative drive current designated I1 to one or more LED elements. In an embodiment, drive current I1 represents a combination of different drive currents applied to respective different LED elements within the illumination device, to produce the desired illumination. In the embodiment of FIG. 10, illumination periods 1010 are occasionally interrupted by compensation periods 1020, during which measurements are taken as part of a compensation method. In an embodiment, initiation of a compensation period 1020 is in response to a determination that there has been a change in some quantity such as ambient temperature or illumination settings for the device. In such an embodiment, compensation periods may be repeated until a changing quantity has stabilized. In an alternative embodiment, compensation periods 1020 may be initiated at previously specified times or for a fixed number of times, including one time.

The lower diagram of FIG. 10 is an expanded timing diagram of an exemplary compensation period 1020. Intervals 1022 are similar to intervals 610 of FIG. 6 or intervals 810 of FIG. 8. Within intervals 1022, all emission LED elements are turned off except for a single LED element that may be turned on as part of a particular measurement. Between intervals 1022, one or more of the LED elements within the lamp are supplied with an operative drive current during illumination periods 1024. In the embodiment of FIG. 10, the drive current applied during illumination periods 1024 is "boosted" to an increased level designated generically as 12. In an embodiment, drive current level I2 represents a combination of different drive currents applied to respective different LED elements, each at a higher level than is applied to the LED element in connection with drive current level I1 during illumination periods 1010. As discussed in more detail in co-pending application Ser. No. 13/970,990, use of a boosted drive current during compensation periods may counteract a "flicker" effect that can result from the interruptions in illumination occurring during a compensation period such as period 1020.

As discussed above in connection with FIGS. 8-9, in some embodiments compensation methods for an LED illumination device such as an emitter module rely upon measurements of photocurrent induced in a photodetector when a drive current is applied to an LED element. In such an embodiment, it is critical that the photocurrent induced reflect the LED element being measured rather than interference from other light sources. In some embodiments of methods disclosed herein, subtraction of ambient-induced photocurrent is employed to mitigate the effects of interference. An embodiment for which interference-related illumination can be effectively subtracted is illustrated in FIG. 11A.

Figure 11A:
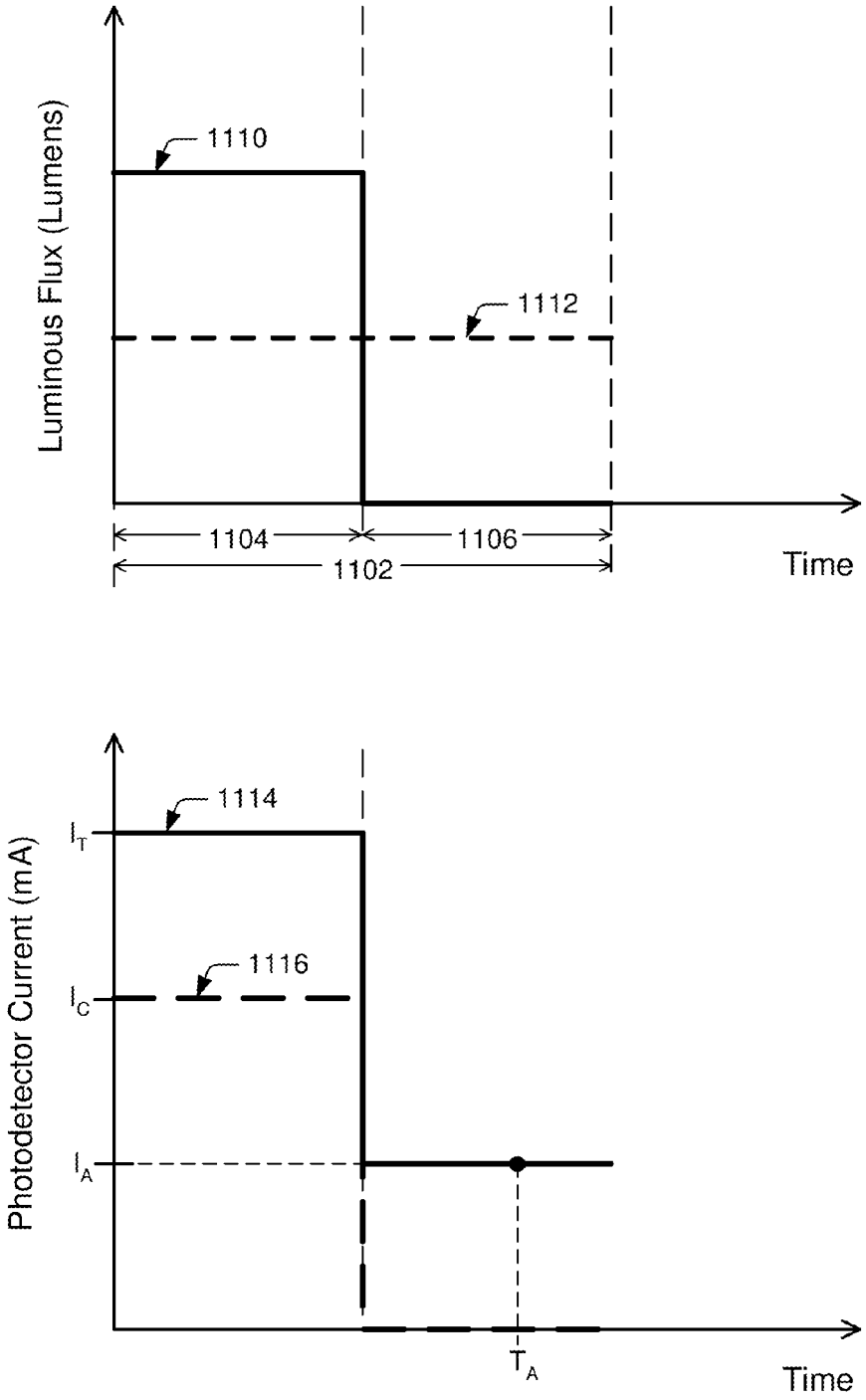
FIG. 11A is a graph illustrating subtraction of ambient light detected when the measured LED element is turned off.

The upper diagram of FIG. 11A plots luminous flux vs. time during an interval 1102 similar to, for example, interval 1022 of FIG. 10. In the embodiment of FIG. 11A, a first portion 1104 of the interval is a measurement portion of the interval during which a particular emission LED element may be turned on (while all other emission LED elements in the illumination device are turned off). Second portion 1106 in this embodiment is a portion of the interval used for ambient detection, during which all emission LED elements within the illumination device are turned off. Although portions 1104 and 1106 each have a duration of approximately one-half of interval 1102, the portions could have different relative durations in other embodiments. Waveform 1110, denoted with a solid line, represents the luminous flux resulting from turning on an LED element during interval portion 1104 for a measurement, then turning the LED element off during interval portion 1106. Waveform 1112, denoted with a dashed line, represents the luminous flux resulting from ambient light that is constant in intensity for at least the duration of interval 1102.

The lower diagram of FIG. 11A plots photocurrent induced in a photodetector in response to the luminous flux plotted in the upper diagram. For purposes of illustration, it is assumed that the photodetector has equal sensitivity to the LED illumination represented by waveform 1110 and the ambient illumination represented by waveform 1112. Waveform 1114, denoted with a solid line, represents the total photocurrent induced by the LED and ambient illumination, or the sum of the photocurrent induced by each type of illumination. Waveform 1116, denoted by a dashed line, represents the difference between the total photocurrent at any time and an ambient current value $I_A$, where $I_A$ is the total current measured at a point during portion 1106 of interval 1102. For example, $I_A$ corresponds to the total photocurrent at time $T_A$. In other embodiments, $I_A$ can be obtained by averaging multiple measurements taken during interval portion 1106, or by using other signal processing techniques known to one of ordinary skill in the art in view of this disclosure. Similarly, total photocurrent $I_T$ is obtained by one or more measurements of photocurrent in the detector during interval portion 1104, accompanied by averaging and/or other signal processing as understood by one of ordinary skill in the art in view of this disclosure. Subtraction of ambient photocurrent $I_A$ from total photocurrent $I_T$ results in corrected photocurrent $I_C$ attributable to the LED illumination corresponding to waveform 1110.

In an embodiment, the detector used to measure induced ambient photocurrent $I_A$ is the same detector used to measure total photocurrent $I_T$ during interval portion 1104 when the target LED element is driven at an operative current level. In this way, the ambient photocurrent induced during measurement of the tested LED element may be most accurately accounted for by the ambient photocurrent detected during interval portion 1106 when the tested LED element is off. In some embodiments, a separate detector may be used for ambient light detection, alternatively or in addition to a detector used for ambient detection during photocurrent measurements. A separate detector for ambient light measurement may be particularly useful, for example, in embodiments for which target settings of the illumination device are adjusted depending on ambient light conditions.

The importance of the ambient subtraction of FIG. 11A can be appreciated by reference back to the method illustrated by FIGS. 8-9. As described above, FIG. 9 illustrates determination of an expected photocurrent value by interpolation from stored calibration values. The expected value is compared to the photocurrent measured for the corresponding LED element—for example, Iph1 of FIG. 8. If the measured photocurrent includes photocurrent induced by illumination other than that from the LED element, such as total current $I_T$ of FIG. 11A, comparison to the expected photocurrent determined as shown in FIG. 9 will provide an inaccurate indication of how illumination from the LED element has changed. The resulting scaling and adjustment of drive current to the LED element may therefore move the LED element away from its target settings rather than helping to maintain them. Comparison of the expected photocurrent to corrected photocurrent $I_C$ in the embodiment of FIG. 11A, however, should provide an accurate indication of how the illumination from the LED element may have changed.

Figure 11B:
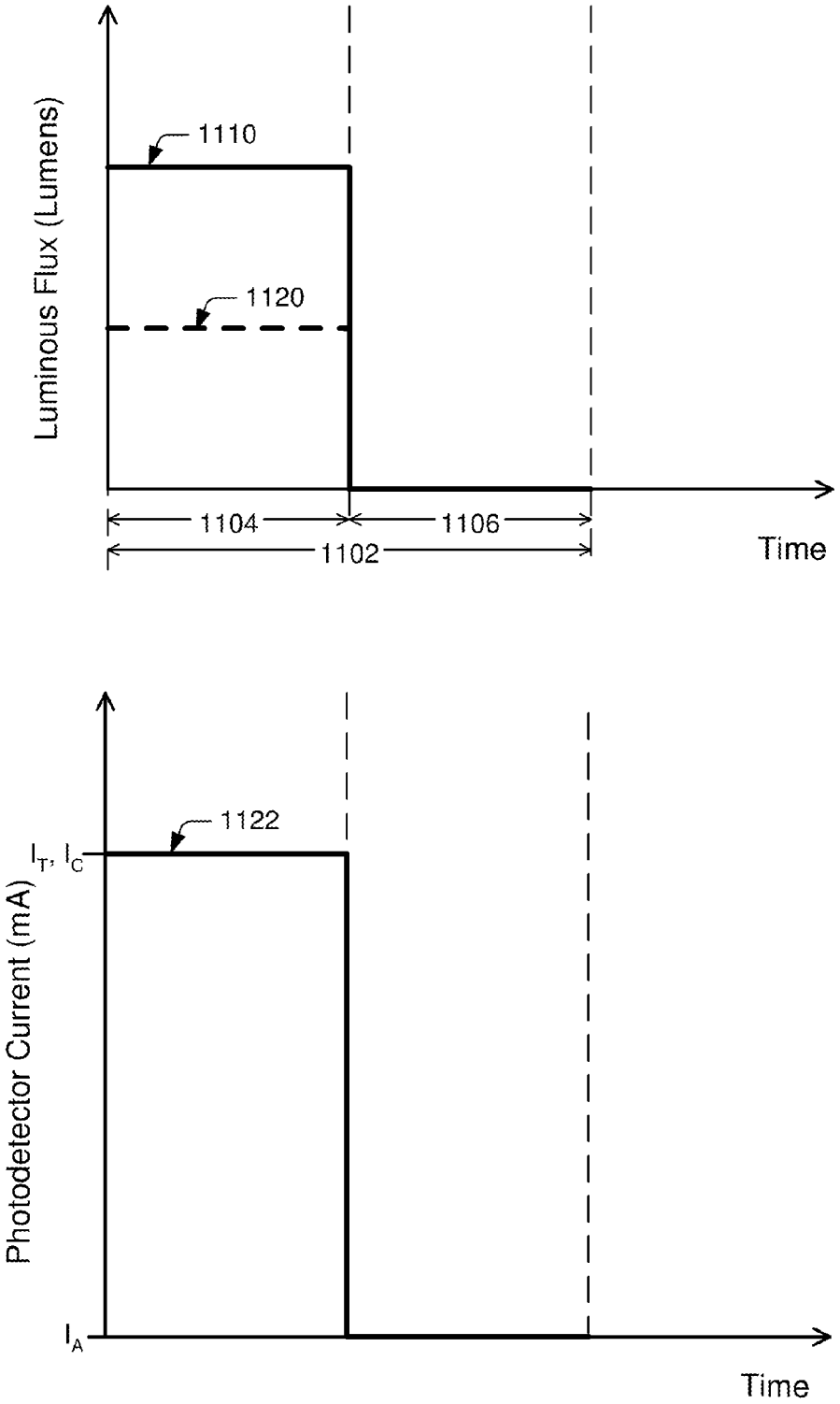
FIG. 11B is a graph illustrating error that can result from ambient subtraction when a nearby lamp is performing compensation measurements.

A situation in which the subtraction technique illustrated in FIG. 11A is not effective in mitigating interference is illustrated by FIG. 11B. The upper diagram of FIG. 11B is a plot of luminous flux during the same interval 1102 having first and second portions 1104 and 1106, respectively, as that shown in the upper diagram of FIG. 11A. The upper diagram also includes waveform 1110 as also shown in FIG. 11A, representing luminous flux from an LED element turned on during interval portion 1104. Instead of the constant ambient illumination 1112 shown in FIG. 11A, however, the upper diagram of FIG. 11B includes waveform 1120 representing an additional illumination source that is on during interval portion 1104 and off during interval portion 1106. In an embodiment, waveform 1120 represents illumination from an additional LED element within a separate illumination device or emitter module than that of the LED element represented by waveform 1110.

The lower diagram of FIG. 11B plots photocurrent induced in a photodetector in response to the luminous flux plotted in the upper diagram, assuming equal sensitivity of the photodetector to the LED illumination represented by waveforms 1110 and 1120. Like waveform 1114 of FIG. 11A, waveform 1122 in FIG. 11B represents the total photocurrent induced by the illumination sources corresponding to waveforms 110 and 1120. In the embodiment of FIG. 11B, the difference between the total photocurrent and current $I_A$ measured at a point during portion 1106 of interval 1102 is also represented by waveform 1122, because $I_A$ is zero in FIG. 11B. Using $I_A$, $I_T$ and $I_C$ defined in the same manner as for FIG. 11A, $I_C$ is equal to $I_T$ in the embodiment of FIG. 11B because $I_A$ is zero. Therefore, $I_C$ in FIG. 11B does not represent the photocurrent induced solely by illumination from the LED element corresponding to waveform 1110. Use of the photocurrent from FIG. 11B in a compensation method such as that illustrated in FIGS. 8 and 9 would lead to serious errors since a photocurrent not corresponding to a given LED element would be used for determining the adjustment to the drive current of that LED element.

In the example of FIG. 11B, an extreme case is illustrated of an interfering light source that is turned on and off at exactly the same times as the LED element being compensated. It is noted that any interference source not having constant intensity over interval 1102 can produce an error in measured photocurrent, even if the interference source does not turn on and off at exactly the same times as the target LED element. If the "ambient" photocurrent measured during interval portion 1106 is not equal to the interference-generated portion of the photocurrent measured during interval portion 1104, ambient subtraction will not be effective in extracting the photocurrent corresponding to the LED element being compensated. An embodiment including a non-constant interference source as shown in FIG. 11B may of course include constant ambient illumination as well, in the manner shown in FIG. 11A. In such an embodiment, the photocurrent associated with the constant illumination could be subtracted out, while the non-constant interfering illumination would lead to compensation errors.

"Non-constant illumination" as used herein refers to illumination having a substantial variation with time during a measurement interval, or during a portion of a measurement interval in which detection of background or ambient illumination is being performed. In an embodiment, a substantial variation is a variation that would result in a significant error for a photocurrent measurement conducted during the same interval. The size of the variation that would result in a significant error depends on the relative magnitudes of photocurrents induced by a measured LED element and by the external illumination in the photodetector used for the photocurrent measurement.

Figure 12:
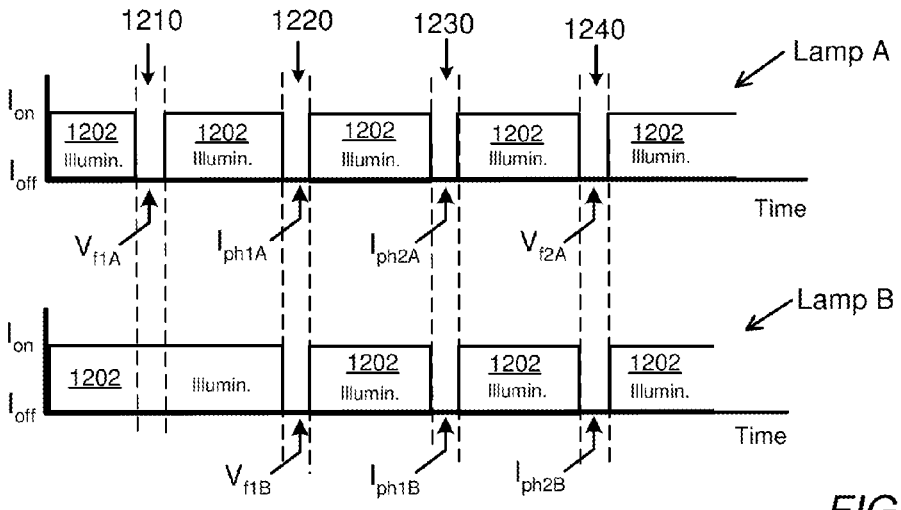
FIG. 12 is an exemplary timing diagram illustrating overlap of compensation measurements by neighboring lamps.

A further illustration of how the kind of interference shown in FIG. 11B can arise is given by FIG. 12. Two timing diagrams are shown in FIG. 12. The upper diagram, designated Lamp A, is associated with a first emitter module including multiple LED elements and a photodetector. The lower diagram, designated Lamp B, corresponds to a second emitter module. The two lamps may in some embodiments be part of a single larger illumination device. In other embodiments, the two lamps may be in separate illumination devices that are installed in proximity to one another, or even facing one another. Each timing diagram corresponds to a portion of a compensation period such as period 1020 of FIG. 10, in which periods of illumination 1202 are interrupted by intervals including intervals 1210, 1220, 1230 and 1240, during which the emission LED elements within the lamp are turned off and a measurement associated with a particular LED element and/or detector may be taken. In some embodiments, drive currents applied to LED elements during the illumination periods may be "boosted" as shown in FIG. 10, to a higher level as compared to the level during longer illumination periods not interrupted by measurements, such as periods 1010 of FIG. 10.

During interval 1210 of FIG. 12, a forward voltage measurement (denoted as $V_{f1A}$) is taken of an emission LED element 1 within Lamp A. No measurements are taken for Lamp B during interval 1210; instead, drive currents are applied to one or more of the emission LED elements of Lamp B to produce the desired illumination. In other words, interval 1210 is an interval for Lamp A but not for Lamp B. Whether illumination from Lamp B interferes with the forward voltage measurement taken for Lamp A depends on the relative magnitudes of the bias-induced current in the LED element being measured and the photocurrent induced in the LED element by the external illumination. The magnitude of the photocurrent induced may depend on multiple factors, such as the relative locations of Lamp B and Lamp A, the relative wavelengths of the driven LED element in Lamp B and Lamp A, and the carrier recombination lifetimes under measurement conditions for the measured LED element in Lamp A. In an embodiment, the induced photocurrent from external radiation is on the order of a microampere or less, while the forward bias induced current in the measured element is on the order of a milliampere. In such an embodiment, illumination by Lamp B in interval 1210 of FIG. 12 would not have a significant effect on the forward voltage measurement taken by Lamp A. The forward voltage measurement in such an embodiment may be considered to not be sensitive to illumination from the other illumination device.

In an alternative embodiment in which Lamp A were taking a photocurrent measurement during interval 1210 rather than a forward voltage measurement, the magnitude of the externally-induced photocurrent may be significant by comparison to the measured current. However, the constant illumination provided by the illumination from Lamp B during interval 1210 could be successfully subtracted out if a photocurrent measurement were taken by Lamp A during that interval. This subtraction would correspond to the situation illustrated in FIG. 11A above.

During each of intervals 1220 and 1240, one of the lamps is performing a photocurrent measurement on an LED element, while the other lamp is performing a forward voltage measurement. During interval 1240, for example, a forward voltage measurement $V_{f2A}$ of emission LED element 2 of Lamp A is performed, while a photocurrent measurement $I_{ph2B}$ measures the photocurrent induced in a detector of Lamp B by operation of emission LED element 2 of Lamp B. In an embodiment, forward voltage measurements of emission LED elements are taken using non-operative levels of drive current, meaning drive current levels insufficient to produce significant illumination from the LED. In such an embodiment, the forward voltage measurement taken using one lamp would not be expected to interfere with the photocurrent measurement taken using the other lamp. Whether there is interference in the opposite direction—i.e., whether the photocurrent measurement of Lamp B interferes with the forward voltage measurement of Lamp A—depends upon the relative magnitudes of the forward bias induced current in the measured LED element of Lamp A and the photocurrent induced in that LED element by the illumination from Lamp B. This can depend on various factors, as discussed above in the discussion of interval 1210.

During interval 1230, however, a photocurrent measurement is taken in both Lamp A and Lamp B. Because illumination is produced by both of these measurements, errors will be introduced into each measurement, and any resulting drive current adjustments, to the extent that illumination produced by one lamp is detectable by the other lamp. Interference from these two photocurrent measurements cannot be mitigated using ambient subtraction techniques. An attempt to subtract interference-related photocurrent from the photocurrent measured by each lamp would in one embodiment lead to a situation similar to that shown in FIG. 11B: each LED element would be turned on during one portion of interval 1230 and off during the other portion, causing the "corrected" photocurrent values to be too large. (Even in an embodiment for which one lamp turned its LED element on during a first portion of the interval and the other lamp turned its LED element on during a second portion, the ambient subtraction would still be incorrect: in this case the "ambient" subtracted would be too large and the resulting "corrected" photocurrent too small.) Another way of avoiding interference caused by two lamps taking measurements during the same interval is needed.

In an embodiment of a method described herein for avoiding interference, detection is performed during one or more intervals before a photocurrent measurement is performed during one of the intervals. In a further embodiment, the detection during one or more intervals is performed before any measurement associated with compensation of an illumination device is performed. Photocurrent measurements, or in some embodiments any measurements, are initiated after detection has been performed for enough intervals to indicate that interference from compensation measurements of another lamp is unlikely. In an embodiment, a photodetector is used to determine whether outside illumination is present that is not constant throughout the measurement interval.

In an embodiment, the number of intervals used for detection depends on the particular sequences of measurements used by the illumination device performing the method and by any potentially interfering devices. As noted above in the discussion of FIG. 12, some types of measurement used for compensation of LED elements in an illumination device are more likely to interfere with other illumination devices than other types of measurement. In an embodiment, the specific measurements most likely to cause interference include measurements of photocurrent induced in a detector by an illuminated LED element. In such an embodiment, those are the measurements most likely to produce a non-constant illumination that could interfere with a photocurrent measurement by a different illumination device. In a typical embodiment, the measurements that are most likely to result in interference are also the measurements most likely to be detected by a different illumination device employing detection intervals before starting its own photocurrent measurements. The number of intervals used for detection may depend on how many total measurements are expected to be performed in a compensation measurement sequence, as well as how many of those measurements are expected to be of the kind most likely to cause interference.

As an example, consider an emitter module including 4 LED elements and at least one photodetector. The photodetector(s) may be dedicated photodetectors or may in some embodiments be emission LEDs configured at certain times as photodetectors. In an embodiment, such an emitter module may use a sequence of 12 measurements for compensation. For example, 4 of the compensation measurements could be forward voltage measurements for each of the 4 LED elements. Another 4 measurements could be photocurrent measurements for each of the 4 LED elements using one dedicated photodetector. Another 2 measurements could be photocurrent measurements for two of the LED elements using an additional photodetector. The remaining 2 measurements could be forward voltages across each of two detectors. In this example, 6 of the 12 compensation measurements are photocurrent measurements.

In one embodiment of the above example, it may be expected that any interfering illumination devices will also be configured to use a sequence of 12 compensation measurements, 6 of which are photocurrent measurements. If the particular sequence of measurements that an interfering device may be configured to use is not known, one approach would be to detect for 12 measurement intervals before starting compensation measurements. If no non-constant illumination is detected during any of the 12 intervals, it is likely that no nearby illumination device is performing compensation measurements. In another embodiment, if it is expected that 6 of the compensation measurements performed by an interfering device are photocurrent measurements, detection could be performed for 7 intervals before starting compensation measurements if no non-constant illumination is detected. If another device were performing compensation measurements including six photocurrent measurements, one of the 6 photocurrent measurements would be expected to occur within a sequence of 7 intervals. In still another embodiment, if the 6 photocurrent measurements were expected to be uniformly spaced within the 12-measurement sequence (in this case, every other measurement of the 12 measurements would be a photocurrent measurement), 2 consecutive intervals in which no non-constant illumination is detected may be sufficient to indicate that no nearby device is likely to be currently performing compensation measurements.

In a further embodiment of the emitter module example described above, the various photocurrent measurements included in the compensation measurement sequence are not equally detectable. Some of the photocurrent measurements may be easier to detect, and more likely to cause interference, than others. This may particularly be the case in embodiments with emitter modules containing emission LED elements emitting different colors of light. Certain combinations of LED element and detector may result in significantly higher photocurrent signals. Measurements using these emitter/detector combinations may be referred to as "beacon" measurements. The magnitude of the photocurrent signal for a particular measurement depends on factors including the luminous flux emitted by the LED element, the sensitivity of the detector, and how well the emitter and detector are matched in terms of spectral response. As an example, one measurement for a multi-color emission module that may result in a relatively high photocurrent signal is measurement of a green emission LED element using a detector configured to detect red light (in an embodiment, the detector is a red LED configured as a detector).

For the example described above of an emitter module having 12 compensation measurements including 6 photocurrent measurements, consider an embodiment in which two of the photocurrent measurements result in significantly higher photocurrent signals than the other photocurrent measurements. In such an embodiment, the number of detection intervals used before starting compensation measurements may be chosen such that one of these higher-photocurrent signals would be expected to occur if a nearby device is performing compensation measurements. If the sequence of the measurements is not known, for example, 11 intervals without detection of a non-constant illumination would be needed to be certain that one of the 2 "beacon" measurements should have occurred if interfering measurements are in progress. Alternatively, if the 2 "beacon" measurements are known to be evenly spaced within the measurement sequence (6 measurements apart, in this example), 6 intervals without detection of a non-constant illumination would be sufficient before beginning compensation measurements.

Figure 13A:
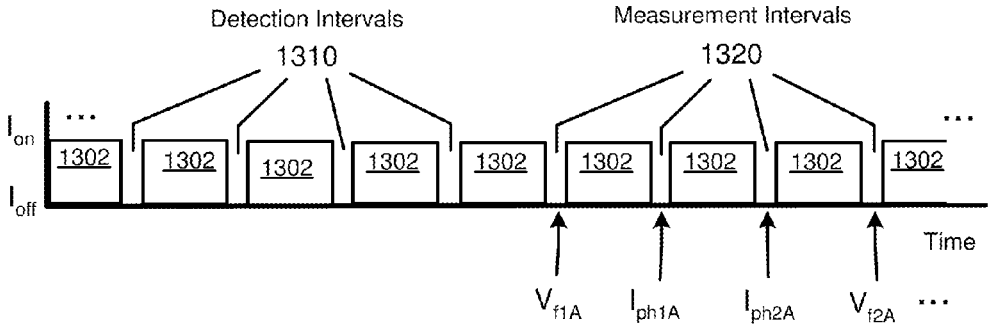
FIG. 13A is an exemplary timing diagram illustrating a series of detection intervals followed by a series of measurement intervals.

The embodiments described above relating to determining a number of detection intervals to use before starting compensation measurements can be illustrated using a timing diagram such as that of FIG. 13A. In FIG. 13A, detection intervals 1310 are used to determine whether measurements taken by another lamp can be detected. If no other measurements are detected, compensation measurements are initiated during subsequent intervals denoted in FIG. 13A as measurement intervals 1320. The necessary number of detection intervals 1310 in which no interfering measurement is detected depends on factors such as the number, nature and sequencing of compensation measurements, as discussed further above. The specific measurements illustrated in FIG. 13A as being performed during the first of measurement intervals 1320 are merely exemplary.

Figure 13B:
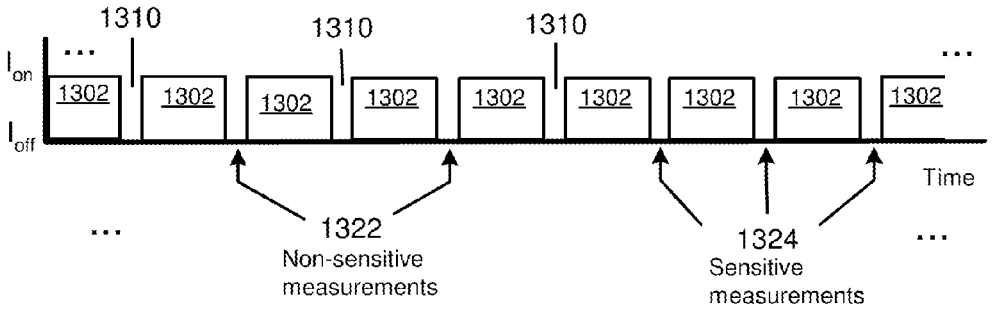
FIG. 13B is a timing diagram illustrating a series of detection intervals interspersed with intervals for taking non-sensitive measurements, followed by a series of intervals for taking sensitive measurements.

An alternative approach to that of FIG. 13A is shown in FIG. 13B. In the timing diagram of FIG. 13B, detection intervals 1310 are alternated with intervals in which non-sensitive measurements 1322 are taken. Non-sensitive measurements as used herein are measurements not affected significantly by external illumination. In an embodiment, non-sensitive measurements include forward voltage measurements across an LED element or a photodetector. As discussed further above in connection with FIG. 12, such forward voltage measurements are expected to be non-sensitive if the forward-bias induced current in the measured LED element is large compared to the photocurrent induced by the external illumination. A timing sequence such as that of FIG. 13B may allow non-sensitive measurements to be taken earlier, while it is still being determined whether measurements sensitive to interfering illumination (denoted as sensitive measurements 1324) can be taken without interference. In an embodiment, detection for interfering measurements may be performed during the same interval as one of non-sensitive measurements 1322, as long as the detector used for detecting interference is not involved in the non-sensitive measurement. In an embodiment for which the non-sensitive measurement is a forward voltage measurement, the forward voltage measurement would need to be performed at a non-illuminating level of drive current to avoid error in performing detection at the same time.

In an embodiment for which non-sensitive measurements are performed during an overall detection sequence but detection is not performed during the intervals in which non-sensitive measurements are taken, the expected measurement sequence of any interfering devices would need to include enough consecutive higher-intensity measurements that a measurement sequence performed by a nearby device would be detected during one of the intervals when detection is performed. For example, in an embodiment of FIG. 13B in which no detection is performed during one or both of the intervals allocated to non-sensitive measurements 1322, higher-intensity measurements performed by an interfering device would need to be grouped so that at least two of the high-intensity measurements are performed in consecutive intervals. In this way, if the interfering device is performing measurements and one high-intensity measurement occurs in the same interval as a non-sensitive measurement 1322 and is not detected, the other consecutive high-intensity measurement would be detected during either the preceding or succeeding detection interval 1310.

The timing diagrams of FIGS. 13A and 13B illustrate examples of an approach in which some number of detection intervals is used to obtain an indication that no nearby device is performing interfering measurements. When no interfering measurement is observed after a sufficient number of detection intervals, compensation measurements are initiated during subsequent intervals. If, on the other hand, a non-constant illumination is detected during a detection interval, this is an indication that a nearby device is performing interfering measurements. Detection of a constant illumination during the interval is not associated with an interfering measurement in such an embodiment, because the effects of a constant external illumination on a photocurrent measurement can be removed by ambient subtraction such as that illustrated in FIG. 11A. In some embodiments, detection can be performed by taking photocurrent measurements during each of two portions of the interval, and then subtracting the photocurrents, in the manner described above for FIG. 11A. A non-zero result of the subtraction in such an embodiment indicates a non-constant illumination during the interval.

In an embodiment, detection of a non-constant illumination during a detection interval causes an illumination device to discontinue the detection sequence and return to driving the emission LED elements in the device to provide continuous illumination. In such an embodiment, the illumination device may be returned to a continuous illumination state uninterrupted by detection intervals or measurement intervals, similar to illumination periods 1010 of FIG. 10 above. In an alternative embodiment, a sequence of alternating illumination periods and intervals with the emission LED elements turned to non-operative levels may be continued after the detection sequence is discontinued, but without measurement taking place during the intervals. In a further embodiment, any intervals present after the detection sequence is suspended would not be used for detection or measurement until such time that a detection sequence is restarted.

When the detection sequence is discontinued after detection of a non-constant illumination during a detection interval, the measurement control circuit of the illumination device waits, in one embodiment, for some delay time before restarting the detection sequence. In a further embodiment, the delay time is a randomized delay time. After waiting for the delay time, the measurement control circuit may in one embodiment start again at the beginning of the detection sequence that was aborted upon detection of the non-continuous illumination. Alternatively, in some embodiments the detection sequence may be picked up at a point after the beginning of the sequence. In an embodiment, the detection sequence is started again at the point in the sequence when the non-continuous illumination was previously detected. Such an embodiment may be suitable, for example, in a sequence such as that of FIG. 13B in which some non-sensitive measurements are performed successfully in an earlier detection sequence before it is aborted.

As an alternative to the above-described embodiments of suspending a detection sequence and resuming detection after a delay, another approach to handling detection of a non-constant illumination during a detection interval may be suitable in certain embodiments. In an embodiment for which the sequence of measurements expected to be performed by an interfering device is known, detection of a non-constant illumination during one or more detection intervals may allow a measurement control circuit to predict which upcoming intervals will or will not contain interfering measurements. In such an embodiment, the measurement control circuit may be able to select a starting interval for its own measurement sequence such that each of the two devices is able to complete its respective measurement sequence without obtaining erroneous results. An example of such a scenario is illustrated by FIG. 14.

Figure 14:
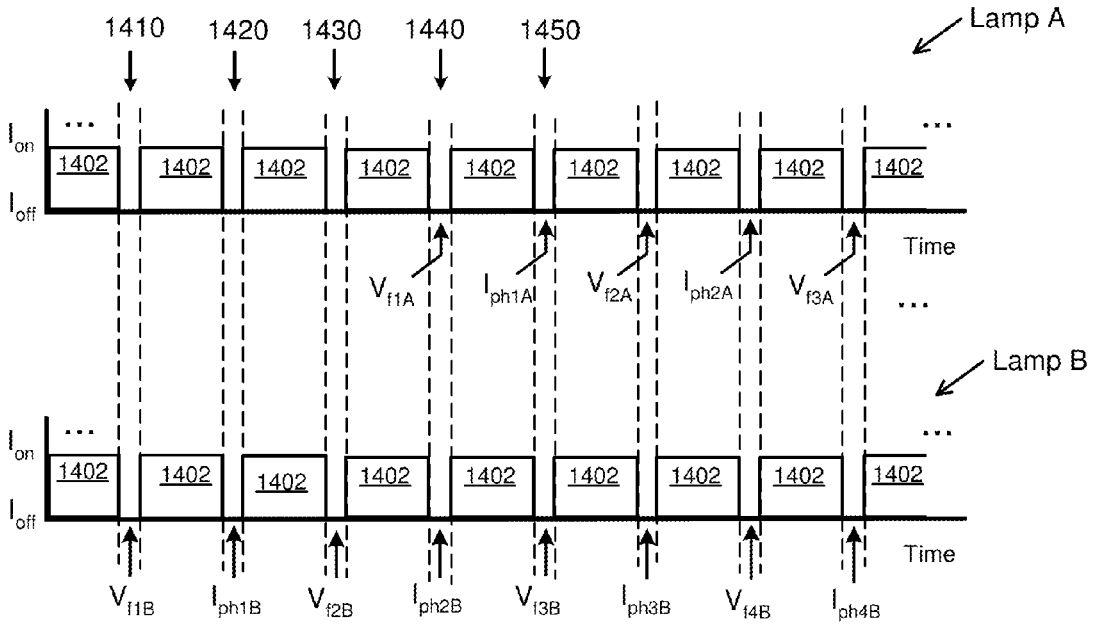
FIG. 14 is an exemplary timing diagram illustrating overlapping but non-interfering measurement sequences by neighboring lamps.

The pair of timing diagrams in FIG. 14 is for two emitter modules, designated Lamp A and Lamp B, similar to those described in the discussion of FIG. 12 above. Each lamp is operating in a compensation mode such as that within a compensation period 1020 of FIG. 10, in which periods of illumination 1402 are interrupted by intervals including intervals 1410, 1420, 1430, 1440 and 1450. At the beginning of each interval the emission LED elements within the lamp are turned off (or to a non-illuminating level) and detection may be performed or a measurement associated with a particular LED element and/or detector may be taken. In the embodiment of FIG. 14, intervals 1410 and 1420 are detection intervals for Lamp A. These intervals are measurement intervals for Lamp B, however. In the embodiment of FIG. 14, Lamp B is carrying out a sequence of 8 measurements in which a forward voltage for each of four emission LED elements is followed by a measurement of photocurrent induced in a detector when a drive current is applied to that LED element. The lower timing diagram in FIG. 14 therefore shows the entire sequence of measurements carried out by Lamp B. In an embodiment, this measurement sequence is repeated continuously using subsequent intervals. In another embodiment, the lamp returns to a continuous illumination mode such as an illumination period 1010 of FIG. 10, and the measurement sequence is repeated if a change in operating conditions is detected or at certain preset times.

During interval 1410, Lamp B carries out a forward voltage measurement $V_{f1B}$ of a first emission LED element. Even in an embodiment for which Lamps A and B are in close proximity and/or facing one another, Lamp A does not detect any significant non-constant illumination from the measurement by Lamp B as long as the drive current for the measurement $V_{f1B}$ is at a level too low to result in illumination. During interval 1420, however, Lamp A does, in this embodiment, detect a non-constant illumination associated with the measurement by Lamp B of photocurrent $I_{ph1B}$ induced in a detector when the first LED element is illuminated. In the embodiment of FIG. 14, the sequence of measurements employed by potentially interfering lamps, including Lamp B, is known to the control circuit of Lamp A, and Lamp A employs the same sequence for its own compensation measurements. Upon detecting a non-constant illumination during interval 1420, the control circuit of Lamp A determines that an interfering lamp made a photocurrent measurement during that interval. Because the measurement sequence is known to alternate photocurrent measurements with non-illuminating forward voltage measurements, the control circuit of Lamp A can predict that the interfering lamp will make a forward voltage measurement during the next interval, interval 1430. Because the measurement sequence begins with a forward voltage measurement, the control circuit of Lamp A waits for one additional interval and begins the measurement sequence for Lamp A at interval 1440. In this way, the photocurrent measurements by Lamp B line up in the same intervals as the non-sensitive, and non-interfering, forward voltage measurements by Lamp A.

In the embodiment of FIG. 14, both Lamps A and B can keep repeating the measurement sequence continuously in subsequent intervals, if desired, without interfering with each other's measurements. An approach such as that of FIG. 14, in which potentially interfering lamps perform measurement sequences in an overlapping manner that avoids interference, may be particularly suitable for embodiments in which a measurement sequence is repeated continuously. In an embodiment with continuous compensation measurements, the alternate approach described above, of suspending measurements when an interference is detected and attempting measurements again after a delay, may be less effective. For the measurement sequence used in FIG. 14 having alternating photocurrent and forward voltage measurements, the control circuit of Lamp A can determine an interval for starting a non-interfering measurement sequence after detection of just one interfering measurement. In embodiments using different measurement sequences, the control circuit may need to detect multiple interfering measurements in order to determine a starting interval for a non-interfering measurement sequence. In the case of some measurement sequences, overlapping but non-interfering measurement sequences may not be available.

The approach of FIG. 14 depends on access by the control circuit of an illumination device to the measurement sequence used by potential interfering devices. One embodiment in which the control circuit may have such information is an installation in which the lamps in close proximity to one another are all made by the same manufacturer and use the same control sequence. In another embodiment, a control circuit has information on measurement sequences of potential interfering lamps because the lamps in close proximity to one another are manufactured to a common standard that specifies the measurement sequence. In installations having lamps in close proximity that use different measurement sequences, information regarding the measurement sequences of various other lamps may in some embodiments be available to the control circuit of an illumination device. An illumination device may in certain embodiments include a data structure storing configuration information including compensation measurement sequences for various potentially interfering lamp models. In embodiments for which interference by lamps having multiple different measurement sequences is a possibility, the control circuit may need to detect multiple interfering measurements before determining which measurement sequence is being used by another device and whether overlapping measurement sequences are possible without interference.

The discussion above of FIGS. 13 and 14 describes ways that detection during some number of intervals before performing compensation measurements during subsequent intervals can help to avoid measurement errors caused by interfering measurements by nearby illumination devices. In some cases, however, measurement errors may occur despite use of the above-described detection techniques. For example, a prediction that a lamp may safely begin making measurements based on the expected measurement sequence of a single interfering lamp may be in error if multiple nearby lamps are making measurements. As another example, measurement errors can occur if two or more lamps are performing detection during the same intervals and, each detecting no other measurements, both begin measurements at the same time.

In an embodiment, measurement errors are detected by checking to see whether a measured value is within an expected range. In a further embodiment, the expected range is based on the most recently stored value of the measured quantity. In such an embodiment, the expected range accounts for the magnitude of expected variations in the measured quantity caused by factors such as LED aging or temperature change of an LED element. In one embodiment, a measured value is outside of the expected range if it varies by more than about 5 percent from the most recently stored value of the measured quantity. In another embodiment, a measured value is outside of the expected range if it varies by more than about 3 percent from the most recently stored value. In yet another embodiment, a measured value is outside of the expected range if it varies by more than about 2 percent from the most recently stored value. Other thresholds for considering a measurement out-of-range may be used, depending on factors such as the volatility of the particular quantity being measured and the degree of accuracy required for compensation and control of the illumination device. If the measured value is outside of the expected range, the measured value is discarded rather than stored. In an embodiment, the measurement sequence continues after an out-of range measurement is detected, with in-range measurements stored while out-of-range measurements are discarded. In an alternative embodiment, an out-of-range measurement causes the measurement sequence to be suspended. In such an embodiment, the control circuit of the illumination device may wait for a delay time and then attempt the measurement sequence again. The new attempt may start at the beginning of the sequence, or alternatively may start with the measurement that was out of range. In another embodiment in which the measurement sequence is suspended after an out-of-range measurement, the control circuit may wait for a delay time and then begin a detection sequence before attempting measurements again.

Checking for whether a measurement is in range is in some embodiments combined with methods described above for detection during some number of intervals before performing compensation measurements. In an alternative embodiment, measurements are performed without any detection intervals beforehand, with the measured values checked for being out of an expected range. In still another embodiment, measurements are initially performed without detection beforehand, but if an out-of-range value is obtained, a detection method as described above is employed before resuming measurements. In some embodiments, checking for whether a measurement is in range is performed only for interference-sensitive measurements such as photocurrent measurements. In other embodiments, all measured values are checked for being within an expected range.

Approaches described above to avoiding interference from nearby illumination devices when performing compensation measurements include performing detection to predict interference-free intervals for taking measurements, checking measured values to determine whether measurement error has occurred, and suspending and reattempting detection and/or measurements in the event that interference is detected. Another approach to avoiding interference is to use a different set of intervals than that used by a potentially interfering device. In an embodiment of this approach, one set of periodic intervals is established having a first offset time from a periodic timing reference, while another set of periodic intervals is established having a second offset time from the timing reference. An exemplary timing diagram illustrating such an embodiment is shown in FIG. 15.

Figure 15:
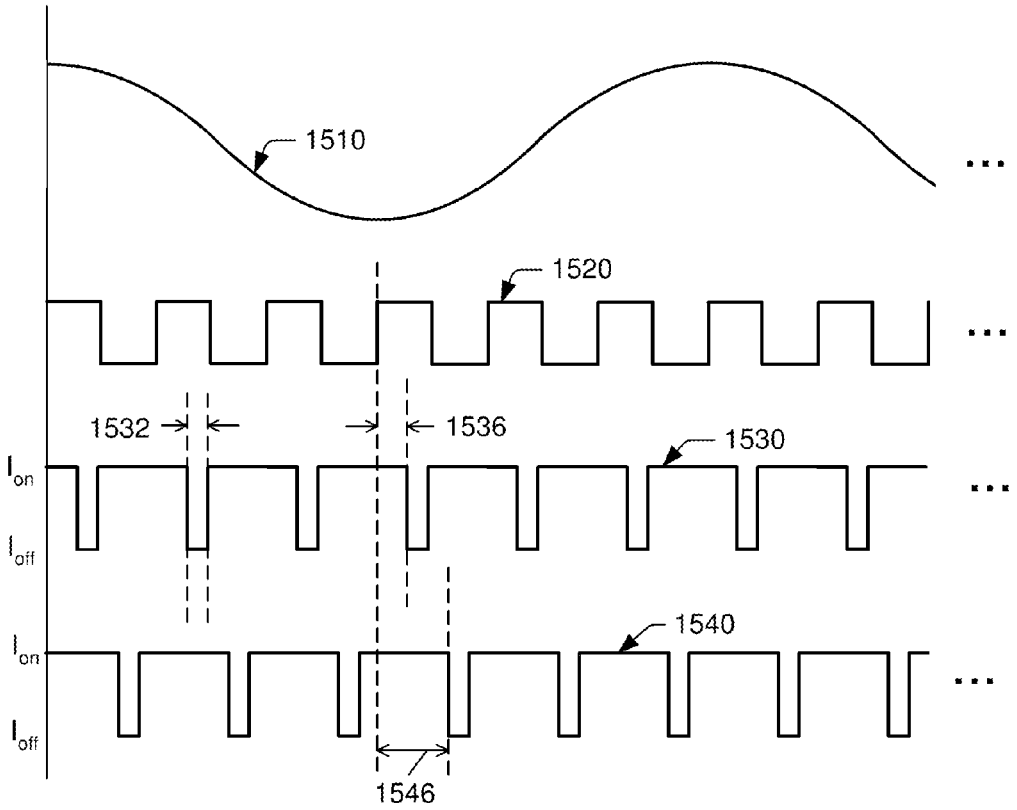
FIG. 15 is an exemplary timing diagram illustrating a timing reference synchronized to the AC mains, and first and second sets of measurement intervals separated from the timing reference by first and second offset times.

In the embodiment of FIG. 15, a timing reference signal 1520 is generated from an AC reference signal 1510. In an embodiment, timing reference signal 1520 is generated from AC signal 1510 using a phase locked loop (PLL) circuit. In the example of FIG. 15, reference signal 1520 has a frequency of six times that of AC signal 1510. In an embodiment, AC signal 1510 is the AC mains signal, typically having a frequency of 50 Hz or 60 Hz. For an AC mains frequency of 60 Hz, reference signal 1520 has a frequency of 360 Hz in the embodiment of FIG. 15. Waveform 1530 illustrates the drive current variation with time for an illumination device, such as an emitter module, using a first set of intervals for compensation measurements. As discussed in connection with FIG. 6 above, "on" current $I_{on}$ represents a combination of one or more different drive currents applied as appropriate to respective different LED elements within the illumination device, to produce the desired illumination. During periodic measurement intervals the drive currents are reduced to a level $I_{off}$ at which none of the LED elements are operating, or illuminated, except for a single LED element that may be subject to measurement during the interval. Each of the intervals has a duration 1532 and is separated from a rising edge of timing reference 1520 by a first offset 1536. Waveform 1540 illustrates the drive current variation with time for an illumination device using a second set of intervals for compensation measurements. Waveform 1540 is similar to waveform 1530, except that the periodic intervals in waveform 1540 are separated from a rising edge of timing reference 1520 by a second offset 1546.

If one emitter module is configured to perform compensation measurements using a first set of measurement intervals such as those of waveform 1530, and another emitter module is configured to perform its compensation measurements using a second set of measurement intervals such as those of waveform 1540, measurements by the two emitter modules will not interfere with one another because the two sets of measurement intervals are displaced in time. In an embodiment, lamps or emitter modules that are to be placed in close proximity are assigned to different sets of measurement intervals. Such an embodiment may be particularly suitable for illumination fixtures containing multiple lamps or emitter modules. In another embodiment, an emitter module may initially use one set of measurement intervals and later switch to another set of measurement intervals if interference from nearby devices is encountered. This type of embodiment may be suitable in the case of an individual emitter module, since the configuration of lamps that it may be operated in proximity to is typically not known.

In the example described above of a 60 Hz AC signal and a 360 Hz timing reference signal used in the embodiment of FIG. 15, timing reference signal 1520 has a period of approximately 2.8 milliseconds. Using these values and the dimensions as drawn in FIG. 15, the measurement intervals of waveforms 1530 and 1540 have a duration of approximately 550 microseconds while the first offset is approximately 800 microseconds and the second offset approximately 2 milliseconds. It should be noted that the measurement intervals may have any duration sufficient to perform any compensation measurement needed. In an embodiment, the measurement interval should be long enough to allow a period of measuring the desired quantity and a period for ambient measurement. At the same time, it is preferred in some embodiments to have measurement intervals be as short as possible in order to reduce effects such as "flicker" caused by turning the LED elements on and off. In one embodiment, the measurement interval duration is approximately 100 microseconds. The number of different sets of measurement intervals that may be used depends on the period of the timing reference signal and the duration of the measurement interval.

In one embodiment having a timing reference signal with frequency of an integer N times the frequency of an AC reference signal (like the embodiment of FIG. 15, where N=6), the number of intervals in a measurement sequence is set to be an integral multiple of N. For the example of FIG. 15 in which N=6, the number of intervals in the measurement sequence in this embodiment would be set to a multiple of 6, even if some intervals were left empty in order to do so. In this way, repetition of the measurement sequence would cause repetitions of any individual measurement to occur at the same point in the phase of the AC signal. In an alternative embodiment with a timing reference signal having a frequency of N times the AC reference signal, the number of intervals in the measurement sequence is instead set to a number that is not an integral multiple of N. In such an embodiment repetition of the measurement sequence would cause repetitions of any individual measurement to occur at different points in the phase of the AC signal. In a further embodiment, values obtained from repetitions of an individual measurement are averaged. In such an embodiment, use of a number of measurements that is not an integral multiple of N may provide a more accurate measurement when results from repetitions of a measurement taken at different AC phase points are averaged.

Figure 16B:
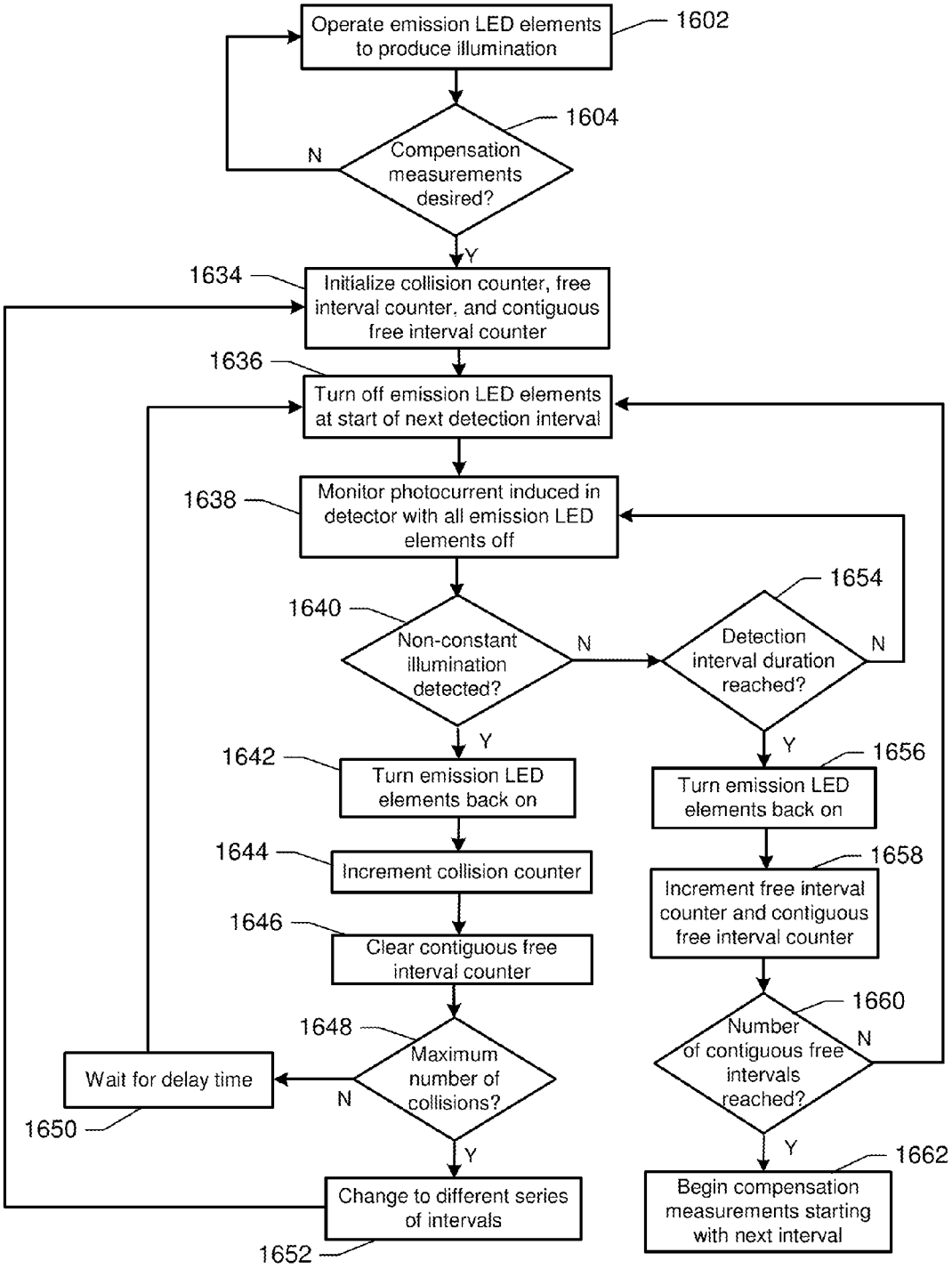
FIG. 16B is a flow chart illustrating an exemplary method for controlling a lamp to initiate compensation measurements.

Flowcharts of exemplary methods of performing interference-resistant compensation measurements using the approaches described above are shown in FIGS. 16A through 16C. The flowchart of FIG. 16A is for a method in which no detection is performed before beginning a sequence of measurements. In the embodiment of FIG. 16A, photocurrent measurements include subtraction of ambient photocurrent, and the method includes determining whether photocurrent values are within an expected range. The starting point for the method is operation of one or more emission LED elements within an illumination device or emitter module at respective drive currents to produce the desired illumination (step 1602). This illumination is continued until the control circuit of the illumination device determines that it is time to take compensation measurements (decision 1604). In some embodiments, compensation measurements are performed at specific times. In other embodiments the measurements may be performed when a change is detected in operating conditions, such as temperature of the illumination device or a change in drive current supplied to one or more of the emission LEDs to alter the lumen output or color point setting of the illumination device. In still other embodiments, periodic compensation measurement intervals may be created throughout the time the illumination fixture is operating, and compensation measurement sequences may be continually repeated using those intervals.

In the embodiment of FIG. 16A, a measurement counter is initialized to keep track of which measurements in a measurement sequence have been performed (step 1606). All of the emission LED elements are then turned off (to non-operative or non-illuminating levels) at the start of the next measurement interval (step 1608). The measurement interval is one of a set of intervals such as those discussed in connection with FIGS. 6, 8 and 10-15 above. If the measurement to be performed is not a photocurrent measurement, the measurement is performed during the interval and the result of the measurement is stored (decision 1610, step 1612, step 1614). A non-photocurrent measurement may include, for example, a forward voltage measurement across an emission LED or a photodetector. Methods of performing forward voltage measurements are described further in the co-pending applications referenced herein. After the result is stored, the measurement counter is incremented and the emission LED elements are turned back on to produce illumination (steps 1616, 1618).

If a photocurrent measurement is performed, the emission LED element to be tested is turned on using the desired drive current during a first part of the measurement interval (decision 1610 and step 1622). In one embodiment, the emission LED element is turned on for half of the measurement interval. In other embodiments, the emission LED element is turned on for a different fraction of the measurement interval. The photocurrent on a detector within the illumination device or emitter module is measured during the part of the measurement interval when the tested LED element is turned on (step 1624). The detector used in the measurement may be referred to herein as a measurement photodetector and the photocurrent detected by the measurement may be referred to as a measurement photocurrent. During a second part of the measurement interval, the tested LED element is turned off (while the other emission LED elements remain turned off) (step 1626). The ambient or background photocurrent induced in the detector is measured during this second part of the measurement interval (step 1628). As noted in the discussion of FIG. 11 above, the photocurrent values may be obtained using averaging and/or other signal processing techniques known to those of ordinary skill in the art in view of this disclosure. In some embodiments, the first part of the measurement interval during which the LED element is turned on is at the beginning of the interval, as illustrated by portion 1104 of FIG. 11. In other embodiments, the first part is at the end of the interval, and the ambient measurement in the second part of the interval is done before the measurement of photocurrent from the driven LED element.

When both the photocurrent induced by the driven LED element and the ambient photocurrent have been measured, the ambient photocurrent is subtracted from the photocurrent induced by the driven emission LED element to obtain a corrected photocurrent (step 1630). In an embodiment, this subtraction is done in hardware. The corrected photocurrent is then checked to see whether it is within an expected range (decision 1632). In an embodiment, the expected range is based on a target value of the photocurrent, or on the most recent reliable measured value. The expected range is in some embodiments set to be larger than the expected variation of the photocurrent caused by temperature variation or LED aging. If the corrected photocurrent is within the expected range, it is stored (step 1614) and the measurement counter is incremented (step 1616).

In the embodiment of FIG. 16A, if the corrected photocurrent is out of the expected range, storage of the corrected value is skipped (N branch of decision 1632). Incrementing of the measurement counter and continuing on with the next measurement in the sequence (steps 1616 and 1618, decision 1620) are performed in the same way whether the photocurrent measurement is stored or discarded. In this embodiment, a measurement for which the result is not stored can be attempted again when its turn comes up in the next measurement sequence. In an alternate embodiment to that of FIG. 16A, the measurement sequence is suspended when an out-of-range measurement is discovered. In such an embodiment, the measurement sequence may be re-attempted after a delay time or after changing to a different set of measurement intervals. Some of these options are illustrated in the method of FIG. 16B discussed below.

At the end of the measurement interval, one or more of the emission LED elements are again operated to produce the desired illumination (step 1618). As compensation measurements are taken and evaluated, the drive currents applied to the respective LED elements to obtain desired illumination may be adjusted, as described further in the co-pending applications referenced herein. In the embodiment of FIG. 16A, the sequence of measurements is continued, with any photocurrent measurements either stored or discarded, until the end of the sequence (decision 1620). At the end of the sequence, a new measurement sequence may be started as determined by the control circuit (decision 1604). As discussed above, measurement sequences may be repeated continually in some embodiments, or performed only at certain times or under certain conditions. In one embodiment, a measurement sequence is repeated if an out-of-range measurement is detected in the previous sequence.

Variations of the method of FIG. 16A will be recognized by one of ordinary skill in the art in view of this disclosure. For example, for this and all flowcharts described herein, a group of steps in between two decision points of the flowchart may often be performed in more than one order. Although the embodiment of FIG. 16A performs ambient subtraction only for photocurrent measurements, in another embodiment a similar scheme of interval portions and subtraction could be used for non-photocurrent measurements. In some embodiments, non-photocurrent measurements can also be checked for being within an expected range.

An exemplary flowchart for a method of detecting during a series of intervals prior to starting compensation measurements is shown in FIG. 16B. In the same manner as discussed above for FIG. 16A, the method begins with operation of one or more emission LED elements to produce the desired illumination (step 1602). This illumination is continued until the control circuit of the illumination device determines that it is time to take compensation measurements (decision 1604). After it is determined that compensation measurements are to be taken, the control circuit initializes a counter for "collisions," or determinations that another device is making a measurement during an interval. Counters are also initialized for free intervals, or intervals in which no measurement by another device is detected, and for contiguous free intervals since the last collision (step 1634). All of the emission LED elements are turned "off", or to non-operative levels, at the start of the next interval (step 1636), which in the embodiment of FIG. 16B is used as a detection interval similar to intervals 1310 in FIG. 13. The photocurrent induced in a detector within the illumination device is monitored during the detection interval (step 1638). The detector used during a detection interval may be referred to herein as a "detection interval photodetector," and the photocurrent induced during the detection interval as "detection photocurrent." In an embodiment, the detection interval photodetector and measurement photodetector used during compensation measurements are the same photodetector. In an alternative embodiment, the detection interval photodetector and measurement photodetectors are different detectors. In some embodiments, different measurement photodetectors are used for photocurrent measurements of different LED elements. Such embodiments may allow a more favorable combination of wavelengths of the tested LED element and the photodetector. Unless otherwise specified, any of the detectors referenced herein may be either a dedicated photodetector or an LED element temporarily configured as a photodetector.

If no non-constant illumination is detected during the interval (decisions 1640 and 1654), a "free" interval is recorded by incrementing the free interval counter and contiguous free interval counter (step 1658). The emission LED elements are turned back on to resume illumination at the end of the interval (step 1656). In the embodiment of FIG. 16B, a number of contiguous free intervals has been designated as an indicator that no other device is likely to be taking measurements using the same set of intervals. Considerations for determining a suitable number of free contiguous intervals are described above in the discussion of FIGS. 12 and 13. When the designated number of contiguous free intervals has been reached, compensation measurements are started in the next interval (decision 1660 and step 1662). Measurements may then proceed in any suitable manner, including a manner similar to that illustrated in FIG. 16A.

If non-constant illumination is detected during an interval, the collision counter is incremented and the contiguous free interval counter is reset (decision 1640 and steps 1644 and 1646). The emission LED elements are turned back on as usual to resume illumination at the end of the interval (step 1642). If a maximum number of collisions has not been reached, the control circuit waits for a delay time before attempting detection again (decision 1648, steps 1650 and 1636). In an embodiment, the delay time is a randomized delay time. In a further embodiment, the delay time is determined using the collision counter, such that after each successive collision the delay time is progressively longer. For example, in one embodiment the delay time is randomized within a specific range, and that range is set to progressively higher values after each successive collision. In a further embodiment, the delay time increases after each successive collision at an exponential rate.

In an embodiment of the method of FIG. 16B, detection of non-constant illumination refers to detection of illumination having an intensity that varies substantially with time during the detection interval, or during a portion of the detection interval in which detection is performed. In a further embodiment, illumination intensity varies substantially with time if the variation would be large enough to induce a significant error in a photocurrent measurement conducted during the same interval. In some embodiments, a substantial variation in intensity is defined in terms of the intensity of illumination produced by a photocurrent measurement within the illumination device performing a method such as that of FIG. 16B. In a further embodiment, a substantial variation in intensity is defined in terms of the intensity of illumination produced by the LED element within the illumination device producing the lowest illumination intensity during photocurrent measurements performed as part of a compensation measurement sequence. For example, a substantial variation in intensity with time may be defined in one embodiment as a variation large enough that the change in intensity during the interval is greater than about 5% of the intensity produced by the LED element within the illumination device having the lowest illumination intensity during photocurrent measurements. In a further embodiment, a substantial variation is a variation large enough that the change in intensity during the interval is greater than about 3% of the intensity produced by the LED element within the illumination device having the lowest illumination intensity during photocurrent measurements. In a still further embodiment, a substantial variation is a variation large enough that the change in intensity during the interval is greater than about 2% of the intensity produced by the LED element within the illumination device having the lowest illumination intensity during photocurrent measurements. Other thresholds for detecting interference may be used, depending on factors such as the degree of accuracy required for compensation and control of the illumination device.

If measurements by other devices continue to be detected during repeated attempts separated by delay times, a maximum number of collisions may be reached (decision 1648). At this point, the control circuit changes to a different series of measurement intervals, separated from a timing reference by a different offset time (step 1652). Such sets of intervals are described above in connection with waveforms 1530 and 1540 in FIG. 15. In the embodiment of FIG. 16B, the detection sequence is restarted by resetting all counters after a change to a new set of intervals (step 1634). A change to a new series of intervals such as that of FIG. 16B may be particularly suitable in the case of an illumination device including a single lamp or emission module. Changing of an interval series may be less appropriate in the case of a multiple-lamp device, such as that described below in connection with FIG. 18. In a multi-lamp device, each lamp may be assigned to a specific interval series in order to avoid interference between them, such that changing of the interval series could in some cases increase the likelihood of interference.

Variations of the method of FIG. 16B will be recognized by one of ordinary skill in the art in view of this disclosure. For example, in the embodiment of FIG. 16B a collision is detected by monitoring the entire detection interval for non-constant illumination. In another embodiment, only a portion of the detection interval is monitored, based on knowledge of when during the interval a change in illumination intensity caused by an interfering measurement is expected to take place. For example, the expected intensity variation may be associated with a transition between driving an LED element for a photocurrent measurement and having the LED element turned off for an ambient photocurrent measurement, as shown in FIG. 11A. In such an embodiment, if the time of the change between the LED measurement and ambient measurement portions of the interval is known, the monitoring can be done over a range including that transition time.

Figure 16C:
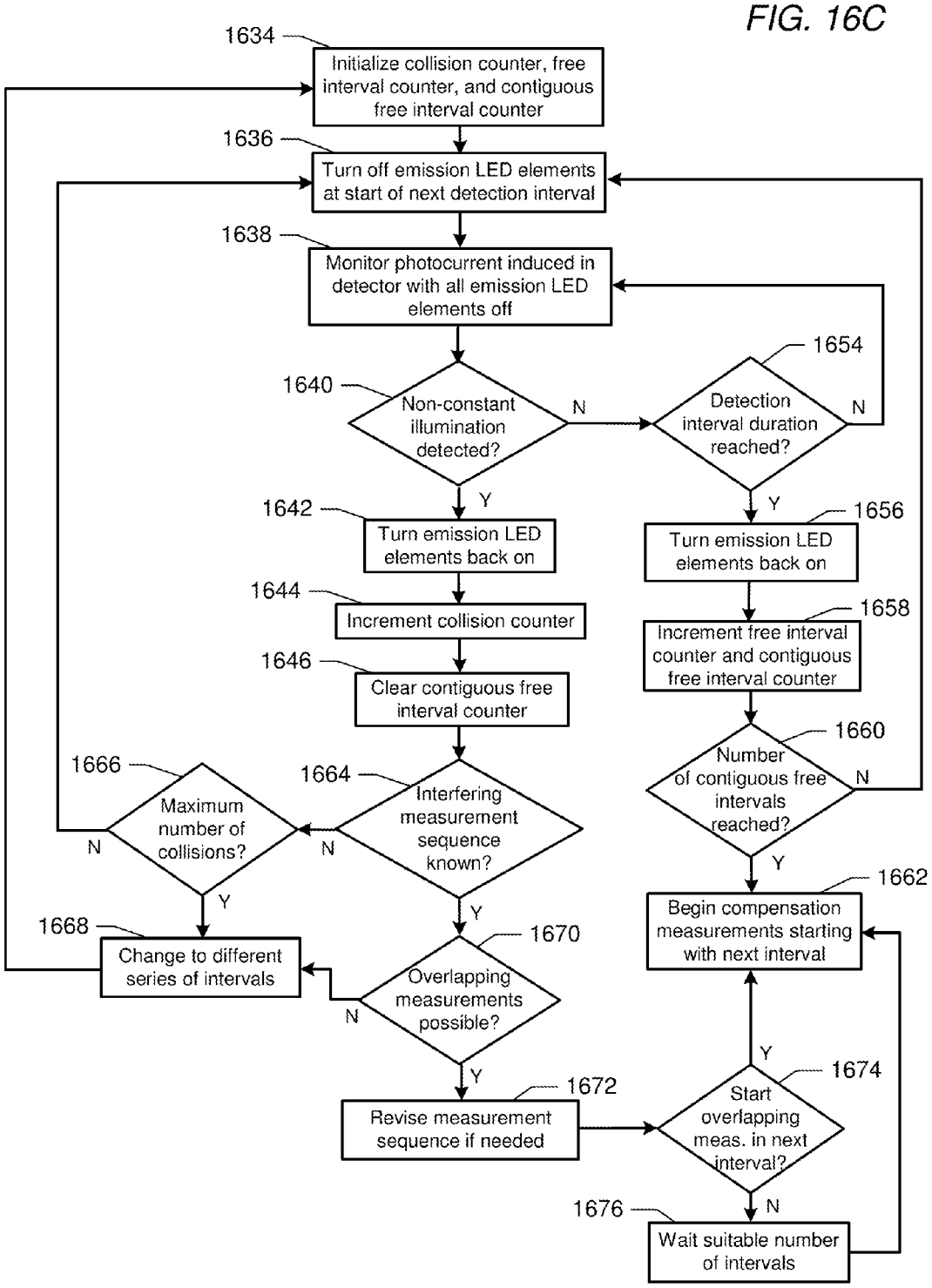
FIG. 16C is a flow chart illustrating another exemplary method for controlling a lamp to initiate compensation measurements.

An alternative method of detecting prior to starting compensation measurements is illustrated by the flowchart of FIG. 16C. The method of FIG. 16C is similar in some respects to that of FIG. 16B, but in FIG. 16C there does not always have to be a certain number of contiguous free intervals detected before compensation measurements can start. In certain situations the method of FIG. 16C allows a measurement sequence to be started if it can be overlapped with an ongoing measurement sequence of another device in such a way that the measurements do not interfere with (i.e. cause measurement errors for) one another.

Although not shown in FIG. 16C, the context of the method is the same as for FIGS. 16A and 16B in that one or more LED elements are operated to produce the desired illumination until the control circuit of the illumination device determines that it is time to take compensation measurements (see steps 1602 and 1604 of FIGS. 16A and 16B). Monitoring for non-constant illumination is performed in the same manner as for FIG. 16B, and in the event that a designated number of contiguous free intervals is reached, a measurement sequence is started in the same way as in the method of FIG. 16B (steps 1638-1662, going down right side of flowchart). The method of FIG. 16C differs from that of FIG. 16B in the event that a collision is detected, however. Instead of automatically instituting a delay or a change in interval series after a collision is detected, the control circuit in the embodiment of FIG. 16C determines whether the measurement sequence causing the detected collision is known (decision 1664). If the interfering measurement sequence is known, the control circuit determines whether it can initiate compensation measurements that overlap with those of the other device in a manner that avoids interference (step 1670).

In an embodiment, determinations as to whether an interfering measurement sequence is known and whether overlapping, but non-interfering, measurements may be conducted are done using configuration information such as that shown in FIG. 17. The chart of FIG. 17 includes exemplary configuration information that may be contained in a data structure stored on the illumination device. In an embodiment, such configuration information may be stored in the same storage medium that contains a calibration table used for compensating the operation of the illumination device to account for changes in temperature or LED characteristics. In the embodiment of FIG. 17, configuration information 1700 includes measurement sequences for three different illumination devices, designated Brand A, Brand B, and Brand C. In an embodiment, the three illumination devices are made by different manufacturers. Configuration information 1702 is for the Brand A device, while information 1704 and 1706 is for the Brand B and Brand C devices, respectively. Controlled device information 1710 indicates that the controlled device (the one that configuration information 1700 is stored in) is a Brand A device in this embodiment.

Sequence information 1708 includes the sequence of compensation measurements performed for each device. In the embodiment of FIG. 17 sequence information 1708 includes the specific measurement performed in each interval of the sequence, as well as whether the measurement is Sensitive or Non-sensitive (to external illumination) and whether the measurement is Interfering or Non-interfering. In this embodiment, photocurrent measurements are all considered to be both sensitive and interfering, since photocurrent measurements both detect illumination (and are therefore sensitive to external illumination) and create illumination from the tested LED element (and therefore can interfere with another photocurrent measurement). In this embodiment, forward voltage measurements, whether across an emission LED element (e.g. $V_{f1}$) or a detector (e.g. $V_{fd1}$), are considered to be non-sensitive and non-interfering. That a forward voltage measurement is non-interfering is believed to be a suitable assumption when the forward voltage measurements are performed with low drive current levels so that the measured devices do not produce illumination. In other embodiments with higher drive current levels, a forward voltage measurement may be an interfering measurement (though probably still not a sensitive measurement). As discussed further above with reference to FIGS. 12 and 13, a forward voltage measurement can be considered non-sensitive if the forward bias induced current in the measured LED element is large with respect to any photocurrent induced by external illumination. In the embodiment of FIG. 17, the measurement sequence for each device includes two empty intervals to bring the length of the sequence to 12 intervals. Such empty intervals are non-sensitive and non-interfering. The 12 interval length of the measurement sequences in FIG. 17 is merely exemplary. Any number of intervals may be used to form a measurement sequence, and a set of measurement sequences included in configuration information such as configuration information 1700 may include sequences having different lengths (i.e., including different numbers of measurement intervals).

In the embodiment of FIG. 17, actual measurement sequences for all three devices are known. In other embodiments, specific measurement sequences for devices made by other manufacturers may not be known. In such an embodiment, data on whether measurements are sensitive or interfering may be experimentally obtainable (for example, through use of an external detector), even if the actual measurements are unknown. In an alternative embodiment of the method of FIG. 16C, decision block 1664 determines whether the order of interfering and non-interfering measurements within the interfering measurement sequence is known, rather than whether the actual measurements within the sequence are known.

The remaining information in configuration data 1700 characterizes the measurement sequence for each device in ways that may be helpful in determining whether an overlapping measurement sequence can be formed. In an embodiment, an overlapping but not interfering measurement sequence can be conducted as long as any sensitive measurements in one sequence of measurements performed by one device are not performed in the same interval as an interfering measurement in another sequence of measurements performed by a nearby device. Because in the embodiment of FIG. 17 sensitive measurements and interfering measurements are the same, much of the configuration information is described in terms of sensitive measurements, but is also applicable to interfering measurements. In this embodiment, the rule for conducting overlapping but not interfering measurements can be restated as making sure that a sensitive measurement in one sequence is not performed in the same interval as a sensitive measurement in the other sequence.

Within configuration information 1700, number of sensitive measurements 1712 indicates the number of sensitive measurements within each sequence. In the embodiment of FIG. 17 there are four sensitive measurements (the four photocurrent measurements) in each sequence. The number of non-sensitive measurements 1714 is accordingly eight for each of the devices. As a first-order indicator, a high fraction of sensitive (or interfering) measurements in a measurement sequence can make it less likely that an overlapping measurement sequence can be performed. For example, if in an alternate embodiment the measurement sequence for the Brand A device had 7 out of 12 interfering measurements rather than 4 out of 12, it would be very difficult to overlap measurement sequences for two Brand A devices in close proximity to one another without having a sensitive measurement by one device performed in the same interval as a sensitive (and interfering) measurement by the other device. It could be done if each device ran its measurement sequence only once without repeating, and most of the sensitive measurements by one device were finished before the second device started its sequence. A non-interfering overlap would not be possible in this embodiment, however, if either of the devices were configured to immediately repeat its measurement sequence.

Same-sequence non-interfering offset 1716 refers to a number of intervals by which a device performing a measurement sequence needs to offset (i.e., delay) its sequence with respect to another device performing the same sequence. For example, if a Brand A device detected a photocurrent measurement performed by an interfering device and it was known that the interfering device was also a Brand A device, it would be known from Brand A configuration information 1702 that the next measurement, if any, by the interfering device would be a non-interfering (non-photocurrent) measurement. The detecting device could not start its measurement sequence during that next interval, because the non-interfering first measurement of its sequence would align with the non-interfering next measurement of the interfering sequence. Because much of the Brand A measurement sequence alternates between interfering and non-interfering measurements, aligning two non-interfering measurements between the devices would likely cause alignment of two interfering (and sensitive) measurements in a subsequent interval of the sequence. If the detecting device delays one more interval before starting its sequence, however, any remaining sensitive (photocurrent) measurements by the interfering device should align with a non-sensitive measurement by the detecting device. This delay has the effect of offsetting, or shifting, the measurement sequence of the detecting device by an odd number of intervals from that of the interfering device.

Using a similar analysis for the measurement sequence of the Brand B device, it can be seen from configuration information 1704 that an offset 1716 of either 2 or 6 intervals would allow another Brand B device to perform an overlapping measurement sequence. Similarly, for the sequence of the Brand C device, an offset of between 4 and 8 intervals would allow another Brand C device to perform an overlapping but non-interfering measurement sequence.

Another quantity included in configuration information 1700 is interval range 1718 including all sensitive measurements. The Brand A sequence has a range 1718 of 7 intervals, from interval 2 to interval 8, in which all of the sensitive measurements are performed. The Brand B sequence has a range 1718 of 6 intervals, from interval 3 to interval 8. For the brand C device, all of the sensitive measurements are performed within a range 1718 of 4 intervals.

Also included in configuration information 1700 is interval range 1720 of the most contiguous non-sensitive measurements within a measurement sequence. Interval range 1720 is 5 for the sequence of Brand A, from interval 9 to interval 1 (assuming that the measurement sequence is continually repeated). For the measurement sequence of Brand B, interval range 1720 is 6 intervals, from interval 9 to interval 2. For the sequence of Brand C, interval range 1720 is eight intervals, from interval 5 to interval 12. Interval ranges 1718 and 1720 may be useful in determining whether different measurement sequences, such as those used by different device manufacturers, may be overlapped without interference. For example, the measurement sequences of the three devices of configuration information 1700 are too different to allow non-interfering overlap of two different device sequences using a simple one- or two-interval shift. In some cases, however, a larger shift can align a contiguous range of non-sensitive measurements in one sequence with the entire range of sensitive measurements in another sequence. To illustrate, the measurement sequence of Brand A in FIG. 17 can overlap with the sequence of Brand C if the Brand A sequence is shifted so that interval 2 of the Brand A sequence is aligned with interval 5 or 6 of the Brand C sequence. In this way, all of the sensitive measurements in the Brand A sequence are performed in intervals with non-sensitive measurements by the Brand C device. On the other hand, the measurement sequence of a Brand A device cannot overlap with that of a Brand B device, because there is no contiguous range of non-sensitive measurements in the Brand B sequence large enough to accommodate the range of intervals in the Brand A sequence including sensitive measurements.

Returning to the method of FIG. 16C, configuration information such as that of FIG. 17 may be used by the control circuit of an illumination device in determining (for decision 1664) whether a measurement sequence associated with a detected measurement is known. In an embodiment for which the configuration information of FIG. 17 is used, a single detection of an interfering measurement by another device would not in itself be enough to determine whether which of the known measurement sequences is being used by the interfering device. If the interfering measurement sequence is not known, the control circuit initiates a detection process during the next interval to get further information (N branch of decision 1664 and step 1636). In the embodiment of FIG. 16C, a change of interval series after a maximum number of collisions is included (decision 1666 and 1668) to avoid an endless loop if the control circuit is unable to determine the measurement sequence used by the interfering device. This change to a different series of intervals is similar to that described above for FIG. 16B.

In some embodiments, the control circuit is able to determine a measurement sequence used by the interfering device by monitoring the collision, free interval, and contiguous free interval counters during successive intervals. For example, a sequence of a detected photocurrent measurement (i.e., a collision), followed by a non-sensitive measurement (which increments the free interval and contiguous free interval counters), followed by another sensitive measurement (which increments the collision counter and clears the contiguous free interval counter) indicates that the sequence of Brand A is used by the interfering device. A sequence of three sensitive measurements in a row, on the other hand, would indicate that the sequence of Brand C is used by the interfering device.

If the sequence of the interfering measurements is known, the control circuit determines whether an overlapping, but non-interfering, measurement sequence by the controlled device is possible (decision 1670). In an embodiment, configuration information such as that of FIG. 17 is used to determine whether such an overlapping measurement configuration is possible. In addition to the considerations discussed above in connection with FIG. 17, the control circuit may in an embodiment consider whether the measurement sequence of the controlled device should be changed. For example, in an embodiment for which an interfering device uses a different measurement sequence than the controlled device, an overlapping measurement sequence may become easier or possible if the controlled device changes its measurement sequence to be more compatible with that of the interfering device. Changing of a device's measurement sequence may in some embodiments make prediction of a device's behavior by other devices more difficult. However, in embodiments in which there are a limited number of measurement sequences used and the illumination devices are capable of detecting the sequence used by an interfering device, temporary adjustment of a device's measurement sequence may be a useful option for avoiding interference.

In the embodiment of FIG. 16C, if overlapping measurements are a possibility, the measurement sequence is revised if necessary to achieve the non-interfering overlap (decision 1670 and step 1672). The measurement sequence is started in the next interval if appropriate, or delayed for a suitable number of intervals if needed to achieve a non-interfering measurement sequence (decision 1674 and step 1662). If overlapping measurements are not possible, the control circuit changes to a different set of intervals and begins the detection sequence again (decision 1670, steps 1668 and 1634). In an alternate embodiment, another approach such as a delay time is used instead of changing to a different set of intervals. Variations of the method of FIG. 16C will be recognized by one of ordinary skill in the art in view of this disclosure. It is noted, for example, that configuration information for compensation measurement sequences of illumination devices may be more complex than that shown in FIG. 17. Additional measurements may be taken in some embodiments, such as additional forward voltage measurements using alternate detectors. In some embodiments of illumination devices storing configuration information for other illumination devices, measurement sequences are not necessarily the same length for each device. In embodiments for which non-sensitive measurements are not necessarily non-interfering measurements, configuration information such as that of FIG. 17 may include quantities defined separately for sensitive measurements and interfering measurements. Analysis in such an embodiment may be more complex than that described for FIG. 17. Variations of the methods of FIGS. 16A, 16B and 16C may be combined, resulting in many possible methods of avoiding interference-related error when performing compensation measurements for illumination devices.

Exemplary Embodiments of Improved Illumination Devices

The improved methods described herein for controlling an illumination device may be used within substantially any LED illumination device having a plurality of emission LED elements and one or more photodetectors. As described in more detail below, the improved methods described herein may be implemented within an LED illumination device in the form of hardware, software or a combination of both.

Illumination devices, which benefit from the improved methods described herein, may have substantially any form factor including, but not limited to, parabolic lamps (e.g., PAR 20, 30 or 38), linear lamps, flood lights and mini-reflectors. In some cases, the illumination devices may be installed in a ceiling or wall of a building, and may be connected to an AC mains or some other AC power source. However, a skilled artisan would understand how the improved methods described herein may be used within other types of illumination devices powered by other power sources (e.g., batteries or solar energy).

Exemplary embodiments of an improved illumination device are described with reference to FIGS. 18-21, which show different types of LED illumination devices, each having one or more emitter modules. Although examples are provided herein, the present invention is not limited to any particular type of LED illumination device or emitter module design. A skilled artisan would understand how the method steps described herein may be applied to other types of LED illumination devices having substantially different emitter module designs.

Figure 18A:
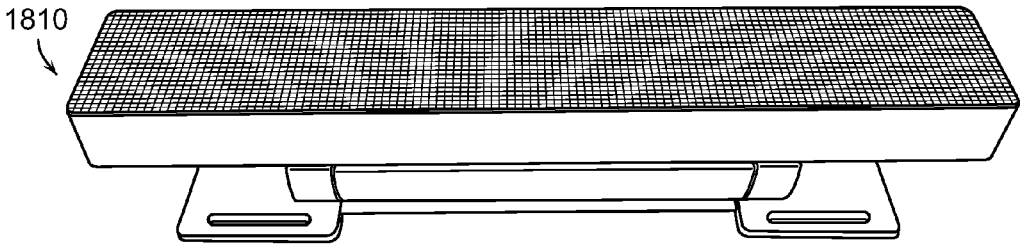
FIG. 18A is a photograph of an exemplary multi-lamp illumination device.

FIG. 18A is a photograph of a linear lamp 1810 comprising a plurality of emitter modules (not shown in FIG. 18A), which are spaced apart from one another and arranged generally in a line. In an embodiment, each emitter module included within linear lamp 1810 includes a plurality of emission LEDs and at least one dedicated photodetector, all of which are mounted onto a common substrate and encapsulated within a primary optics structure. The primary optics structure may be formed from a variety of different materials and may have substantially any shape and/or dimensions necessary to shape the light emitted by the emission LEDs in a desirable manner. Although the primary optics structure is described below as a dome, one skilled in the art would understand how the primary optics structure may have substantially any other shape or configuration, which encapsulates the emission LEDs and the at least one photodetector.

Figure 18B:
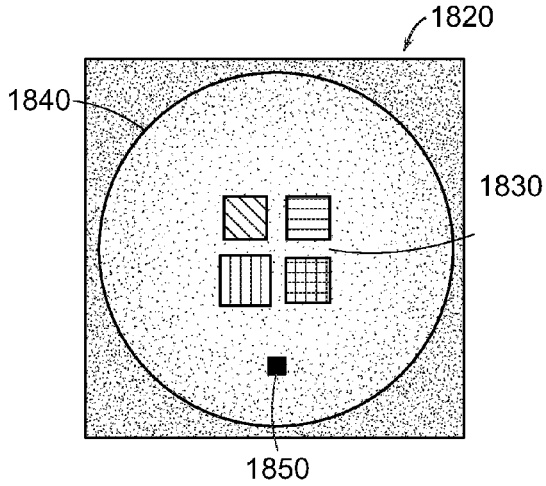
FIG. 18B is a computer generated image showing a top view of an exemplary emitter module, or lamp, that may be included within the exemplary illumination device of FIG. 18A.

A computer-generated representation of a top view of an exemplary emitter module 1820 that may be included within the linear lamp 1810 of FIG. 18A is shown in FIG. 18B. In the illustrated embodiment, emitter module 1820 includes four differently colored emission LEDs 1830, which are arranged in a square array and placed as close as possible together in the center of a primary optics structure (e.g., a dome) 1840, so as to approximate a centrally located point source. In some embodiments, the emission LEDs 1830 may each be configured for producing illumination at a different peak emission wavelength. For example, the emission LEDs 1830 may include RGBW LEDs or RGBY LEDs. In addition to the emission LEDs 1830, a dedicated photodetector 1850 is included within the dome 1840 and arranged somewhere around the periphery of the emission LED array. The dedicated photodetector 1850 may be any device (such as a silicon photodiode or an LED) that produces current indicative of incident light.

Figure 19A:
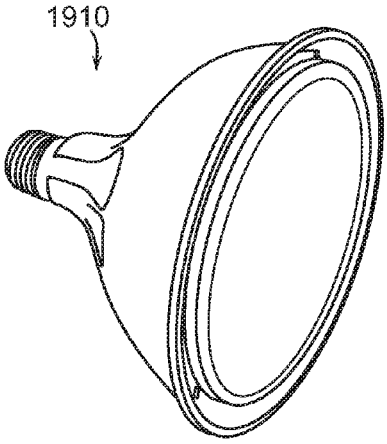
FIG. 19A is a photograph of an exemplary illumination device.
Figure 19B:
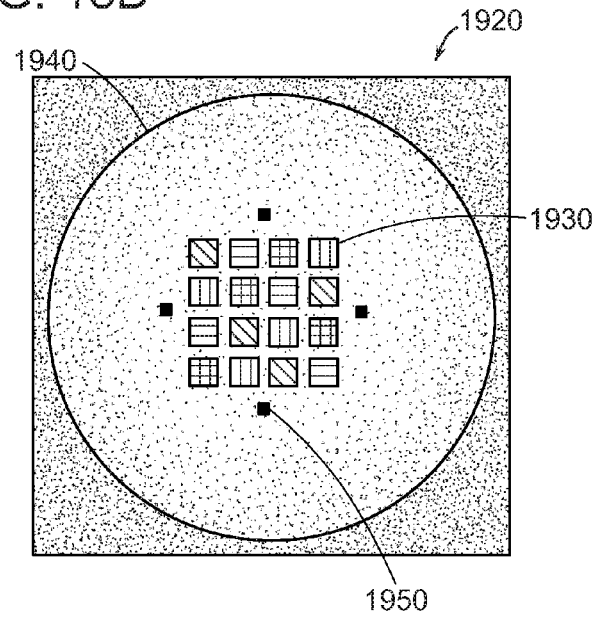
FIG. 19B is a computer generated image showing a top view of an exemplary emitter module, or lamp, that may be included within the exemplary illumination device of FIG. 19A.

FIGS. 19A and 19B illustrate a substantially different type of illumination device and emitter module design. Specifically, FIG. 19A depicts an illumination device 1910 having a parabolic form factor (e.g., a PAR 38) and a single emitter module (not shown in FIG. 19A). As these illumination devices have only one emitter module, the emitter modules included in such devices typically include a plurality of differently colored chains of LEDs (LED elements), where each chain includes two or more LEDs of the same color. FIG. 19B illustrates an exemplary emitter module 1920 that may be included within the PAR lamp 1910 shown in FIG. 19A.

In the illustrated embodiment, emitter module 1920 includes an array of emission LEDs 1930 and a plurality of dedicated photodetectors 1950, all of which are mounted on a common substrate and encapsulated within a primary optics structure (e.g., a dome) 1940. In some embodiments, the array of emission LEDs 1930 may include a number of differently colored chains of LEDS, wherein each chain is configured for producing illumination at a different peak emission wavelength. According to one embodiment, the array of emission LEDs 1930 may include a chain of four red LEDs, a chain of four green LEDs, a chain of four blue LEDs, and a chain of four white or yellow LEDs. Each chain of LEDs is coupled in series and driven with the same drive current. In some embodiments, the individual LEDs in each chain may be scattered about the array, and arranged so that no color appears twice in any row, column or diagonal, to improve color mixing within the emitter module 1920.

In the exemplary embodiment of FIG. 19B, four dedicated photodetectors 1950 are included within the dome 1940 and arranged around the periphery of the array. In some embodiments, the dedicated photodetectors 1950 may be placed close to, and in the middle of, each edge of the array and may be connected in parallel to a receiver of the illumination device. By connecting the dedicated photodetectors 1950 in parallel with the receiver, the photocurrents induced on each photodetector may be summed to minimize the spatial variation between the similarly colored LEDs, which may be scattered about the array. The dedicated photodetectors 1950 may be any devices that produce current indicative of incident light (such as a silicon photodiode or an LED). In one embodiment, however, the dedicated photodetectors 1950 are preferably LEDs with peak emission wavelengths in the range of 500 nm to 700 nm. Photodetectors with such peak emission wavelengths will not produce photocurrent in response to infrared light, which reduces interference from ambient light. To the extent some amount of ambient light is nonetheless detectable during, for example, a photocurrent measurement, methods as described herein may be used to minimize compensation errors caused by such ambient light. For example, effects of a constant ambient illumination on a photocurrent measurement may be removed by subtraction as discussed above. In the case of non-constant external illumination, methods as described herein may be used to avoid taking photocurrent measurements in the presence of such non-constant illumination.

The illumination devices shown in FIGS. 18A and 19A and the emitter modules shown in FIGS. 18B and 19B are provided merely as examples of illumination devices in which the interference-resistant compensation methods described herein may be used. Further description of these illumination devices and emitter modules may be found in U.S. patent application Ser. No. 14/097,339 and U.S. Provisional Patent Application No. 61/886,471, which are commonly assigned and incorporated herein by reference in their entirety. Still further description of additional emitter module embodiments may be found in co-pending U.S. patent application Ser. No. 14/314,530. However, the inventive concepts described herein are not limited to any particular type of LED illumination device, any particular number of emitter modules that may be included within an LED illumination device, or any particular number, color or arrangement of emission LEDs and photodetectors that may be included within an emitter module. Instead, the methods described herein may contemplate only an LED illumination device including a plurality of emission LEDs and at least one photodetector. In some embodiments, a dedicated photodetector may not be required, if one or more of the emission LEDs is configured, at times, to provide such functionality.

Figure 20:
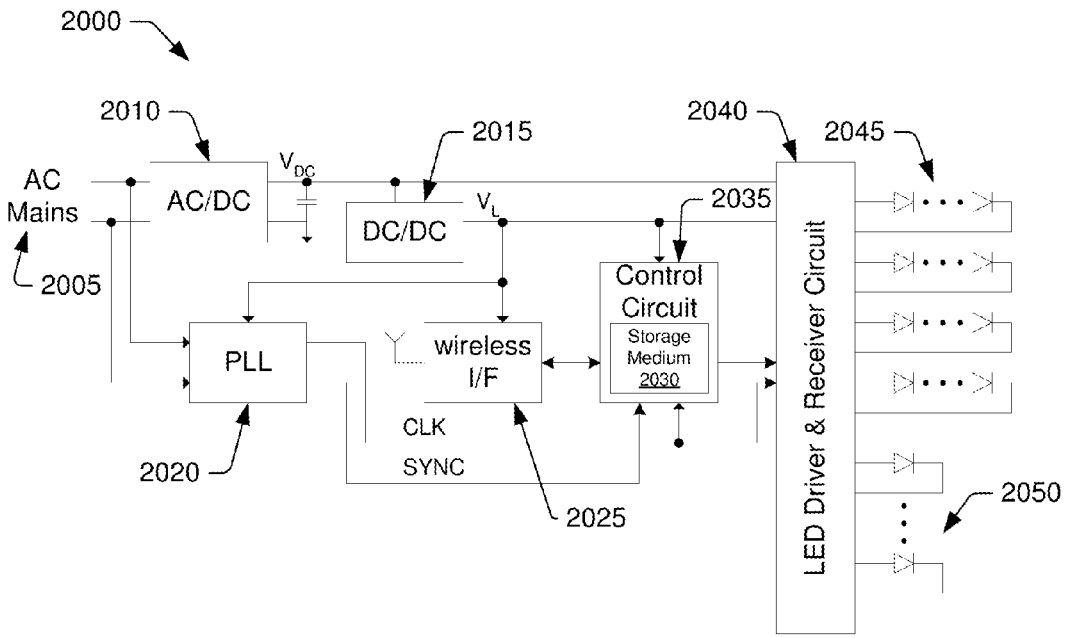
FIG. 20 is an exemplary block diagram of circuit components that may be included within an embodiment of an illumination device disclosed herein.

FIG. 20 is one example of a block diagram of an illumination device 2000 configured to avoid interference-related errors when compensating for variations in parameters such as drive current, temperature, and LED characteristics. The illumination device illustrated in FIG. 20 provides one example of the hardware and/or software that may be used to implement interference-resistant measurement methods such as those shown in FIGS. 16A through 16C.

In the illustrated embodiment, illumination device 2000 comprises a plurality of emission LED elements 2045 and one or more dedicated photodetectors 2050. The emission LED elements 2045, in this example, comprise four chains of any number of LEDs. In typical embodiments, each chain may have 2 to 4 LEDs of the same color, which are coupled in series and configured to receive the same drive current. In one example, the emission LED elements 2045 may include a chain of red LEDs, a chain of green LEDs, a chain of blue LEDs, and a chain of white or yellow LEDs. However, the methods and devices described herein are not limited to any particular number of LED chains, any particular number of LEDs within the chains, or any particular color or combination of LED colors.

Similarly, the methods and devices described herein are not limited to any particular type, number, color, combination or arrangement of photodetectors. In one embodiment, the one or more dedicated photodetectors 2050 may include a small red, orange or yellow LED. In another embodiment, the one or more dedicated photodetectors 128 may include one or more small red LEDs and one or more small green LEDs. In some embodiments, one or more of the dedicated photodetector(s) 2050 shown in FIG. 20 may be omitted if one or more of the emission LEDs 2045 is configured, at times, to function as a photodetector. The plurality of emission LEDs 2045 and the (optional) dedicated photodetectors 2050 may be included within an emitter module, as discussed above. In some embodiments, an illumination device may include more than one emitter module, as discussed above.

In addition to including one or more emitter modules, illumination device 2000 includes various hardware and software components, which are configured for powering the illumination device and controlling the light output from the emitter module(s). In one embodiment, the illumination device is connected to AC mains 2005, and includes an AC/DC converter 2010 for converting AC mains power (e.g., 120V or 240V) to a DC voltage ($V_{DC}$). As shown in FIG. 20, this DC voltage (e.g., 15V) is supplied to the LED driver and receiver circuit 2040 for producing the operative drive currents applied to the emission LEDs 2045 for producing illumination. In addition to the AC/DC converter, a DC/DC converter 2015 is included for converting the DC voltage $V_{DC}$ (e.g., 15V) to a lower voltage $V_L$ (e.g., 3.3V), which is used to power the low voltage circuitry included within the illumination device, such as PLL 2020, wireless interface 2025, and control circuit 2035.

In the illustrated embodiment, PLL 2020 locks to the AC mains frequency (e.g., 50 or 60 HZ) and produces a high speed clock (CLK) signal and a synchronization signal (SYNC). The CLK signal provides the timing for control circuit 2035 and LED driver and receiver circuit 2040. In one example, the CLK signal frequency is in the tens of MHz range (e.g., 23 MHz), and is precisely synchronized to the AC Mains frequency and phase. The SYNC signal is used by the control circuit 2035 to create the timing of the intervals used for the detection and compensation measurements described above. In one example, the SYNC signal frequency is equal to the AC Mains frequency (e.g., 50 or 60 HZ) and also has a precise phase alignment with the AC Mains. In another embodiment, the SYNC signal frequency is an integral multiple of the AC mains frequency. In an embodiment, timing reference signal 1520 of FIG. 15 is an example of the SYNC signal of FIG. 20.

In some embodiments, a wireless interface 2025 may be included and used to calibrate the illumination device 2000 during manufacturing. As discussed in the co-pending applications referenced herein, an external calibration tool (not shown in FIG. 20) may communicate calibration values (e.g., luminous flux, chromaticity and/or other optical measurement values) to an illumination device under test via the wireless interface 2025. The calibration values received via the wireless interface 2025 may be stored in the table of calibration values within a storage medium 2030 of the control circuit 2035, for example. In some embodiments, the control circuit 2035 may use the calibration values to generate calibration coefficients, which are stored within the storage medium 2030 in addition to, or in lieu of, the received calibration values.

Wireless interface 2025 is not limited to receiving only calibration data, and may be used for communicating information and commands for many other purposes. For example, wireless interface 2025 could be used during normal operation to communicate commands, which may be used to control the illumination device 2000, or to obtain information about the illumination device 2000. For instance, commands may be communicated to the illumination device 2000 via the wireless interface 2025 to turn the illumination device on/off, to control the dimming level and/or color set point of the illumination device, to initiate the calibration procedure, or to store calibration results in memory. In other examples, wireless interface 2025 may be used to obtain status information or fault condition codes associated with illumination device 2000.

In some embodiments, wireless interface 2025 could operate according to ZigBee, WiFi, Bluetooth, or any other proprietary or standard wireless data communication protocol. In other embodiments, wireless interface 2025 could communicate using radio frequency (RF), infrared (IR) light or visible light. In alternative embodiments, a wired interface could be used, in place of the wireless interface 2025 shown, to communicate information, data and/or commands over the AC mains or a dedicated conductor or set of conductors.

Using the timing signals received from PLL 2020, the control circuit 2035 calculates and produces values indicating the desired drive current to be used for each LED chain 2045. This information may be communicated from the control circuit 2035 to the LED driver and receiver circuit 2040 over a serial bus conforming to a standard, such as SPI or $I^2C$, for example. In addition, the control circuit 2035 may provide a latching signal that instructs the LED driver and receiver circuit 2040 to simultaneously change the drive currents supplied to each of the LEDs 2045 to prevent brightness and color artifacts.

Control circuit 2035 may be configured for determining the respective drive currents needed to achieve a desired luminous flux and/or a desired chromaticity for the illumination device in accordance with one or more compensation methods as described above in connection with FIGS. 6-9 and described further in the co-pending applications referenced herein. Control circuit 2035 is further configured for operations described herein in connection with avoiding interference. Depending on the particular embodiment such operations include, for example, determining whether an interfering photocurrent measurement is made by another device during a detection interval or measurement interval, waiting for a delay time before continuing to monitor detection intervals, changing to a different series of intervals, determining whether detection has indicated that compensation measurements may be started without likely interference, or determining the measurement sequence used by an interfering device.

In some embodiments, the control circuit 2035 may determine the respective drive currents and perform the interference-related operations described herein by executing program instructions stored within the storage medium 2030. In one embodiment, the storage medium may be a non-volatile memory, and may be configured for storing the program instructions along with a table of calibration values used in the compensation methods and a data structure including configuration information such as that of FIG. 17. Alternatively, the control circuit 2035 may include combinational logic for determining the desired drive currents or performing other operations, such that program instructions for determining drive currents are not stored on storage medium 2030. In a further embodiment, operations of control circuit 2035 may be carried out using a combination of program instructions and combinational logic. Storage medium 2030, along with other memory or storage described herein, includes a plurality of storage locations addressable by control circuit 2035 or a processor such as that associated with controller 2190 in FIG. 21 for storing software programs and data associated with the methods described herein. As such, storage medium 2030 and other memory or storage media described herein may be implemented using any combination of built-in volatile or non-volatile memory, including random-access memory (RAM) and read-only memory (ROM) and integrated or peripheral storage devices such as magnetic disks, optical disks, solid state drives or flash drives. In an embodiment, storage medium 2030 may be used to store one or more counters such as the collision counter, free interval counter, and contiguous free interval counters described in connection with FIGS. 16B and 16C above.

In general, the LED driver and receiver circuit 2040 may include a number (N) of driver blocks 2115 equal to the number of emission LED chains 2045 included within the illumination device. In the exemplary embodiment discussed herein, LED driver and receiver circuit 2040 comprises four driver blocks 2115, each configured to produce illumination from a different one of the emission LED chains 2045. The LED driver and receiver circuit 2040 also comprises the circuitry needed to measure ambient temperature (optional), the detector and/or emitter forward voltages, and the detector photocurrents, and to adjust the LED drive currents accordingly. Each driver block 2115 receives data indicating a desired drive current from the control circuit 2035, along with a latching signal indicating when the driver block 2115 should change the drive current.

Figure 21:
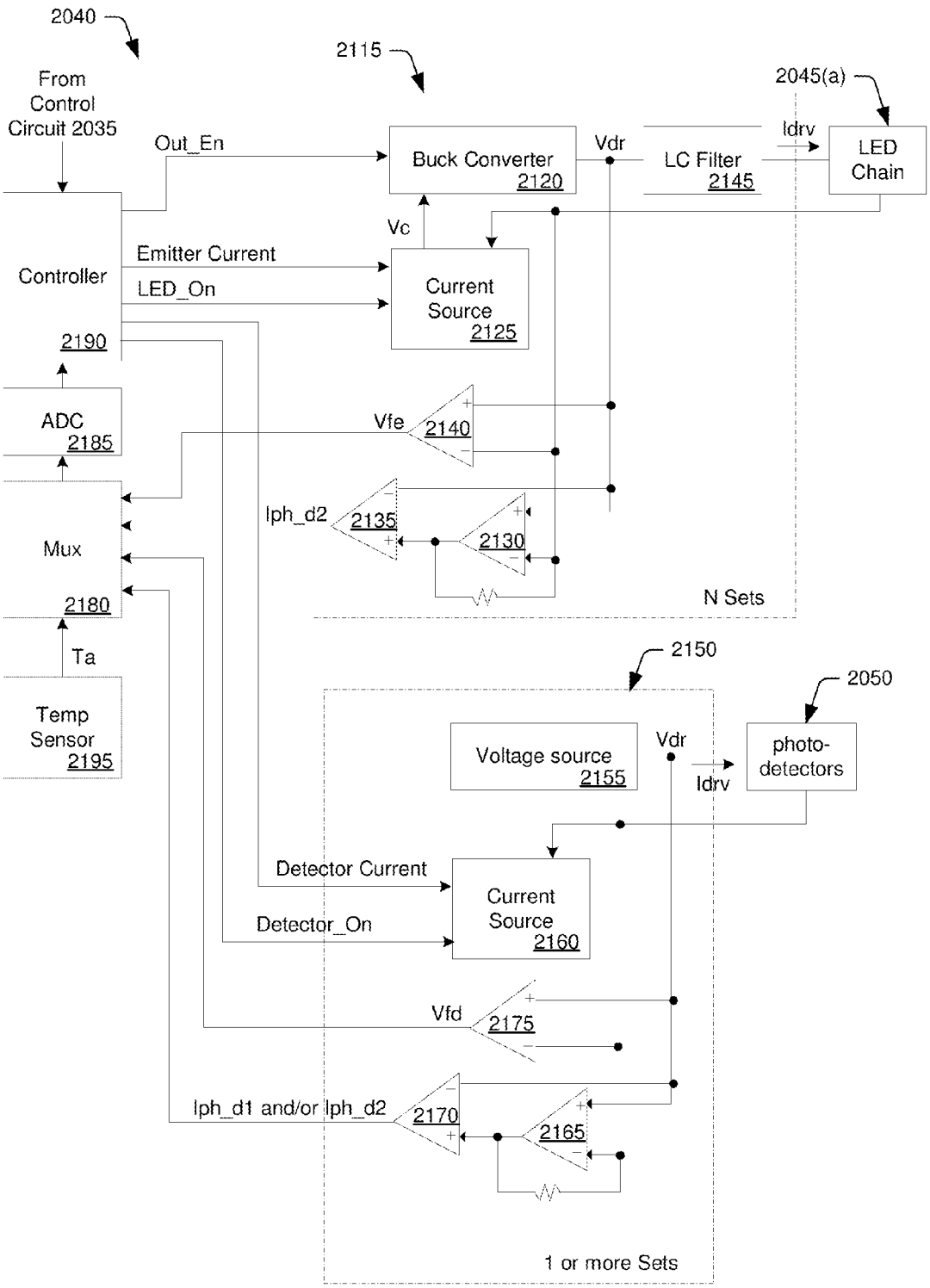
FIG. 21 is an exemplary block diagram of an embodiment of an LED driver and receiver circuit that may be included within the illumination device of FIG. 20.

FIG. 21 is an exemplary block diagram of an LED driver and receiver circuit 2040, according to one embodiment of the invention. As shown in FIG. 21, the LED driver and receiver circuit 2040 includes four driver blocks 2115, each block including a buck converter 2120, a current source 2125, and an LC filter 2145 for generating the drive currents that are supplied to a connected emission LED element 2045(a) to produce illumination and obtain forward voltage (Vfe) measurements. In some embodiments, buck converter 2120 may produce a pulse width modulated (PWM) voltage output (Vdr) when the controller 2190 drives the "Out_En" signal high. This voltage signal (Vdr) is filtered by the LC filter 2145 to produce a forward voltage on the anode of the connected LED chain 2045(a). The cathode of the LED chain is connected to the current source 2125, which forces a fixed drive current equal to the value provided by the "Emitter Current" signal through the LED chain 2045(a) when the "Led_On" signal is high. The "Vc" signal from the current source 2125 provides feedback to the buck converter 2120 to output the proper duty cycle and minimize the voltage drop across the current source 2125.

As shown in FIG. 21, each driver block 2115 includes a difference amplifier 2140 for measuring the forward voltage drop (Vfe) across the chain of emission LEDs 2045a. When measuring Vfe, the buck converter 2120 is turned off and the current source 2125 is configured for drawing a relatively small drive current (e.g., about 1 mA) through the connected chain of emission LEDs 2045(a). The voltage drop (Vfe) produced across the LED chain 2045(a) by that current is measured by the difference amplifier 2140. The difference amplifier 2140 produces a signal that is equal to the forward voltage (Vfe) drop across the emission LED chain 2045(a) during forward voltage measurements.

As noted above, some embodiments of the invention may use one of the emission LEDs (e.g., a green emission LED), at times, as a photodetector. In such embodiments, the driver blocks 2115 may include additional circuitry for measuring the photocurrents (Iph_d2), which are induced across an emission LED, when the emission LED is configured for detecting incident light. For example, each driver block 2115 may include a transimpedance amplifier 2130, which generally functions to convert an input current to an output voltage proportional to a feedback resistance. As shown in FIG. 21, the positive terminal of transimpedance amplifier 2130 is connected to the Vdr output of the buck converter 2120, while the negative terminal is connected to the cathode of the last LED in the LED chain 2045(a). Transimpedance amplifier 2130 is enabled when the "LED_On" signal is low. When the "LED_On" signal is high, the output of transimpedance amplifier 2130 is tri-stated.

When measuring the photocurrents (Iph_d2) induced by an emission LED, the buck converters 2120 connected to all other emission LEDs should be turned off to avoid visual artifacts produced by LED current transients. In addition, the buck converter 2120 coupled to the emission LED under test should also be turned off to prevent switching noise within the buck converter from interfering with the photocurrent measurements. Although turned off, the Vdr output of the buck converter 2120 coupled to the emission LED under test is held to a particular value (e.g., about 2-3.5 volts times the number of emission LEDs in the chain) by the capacitor within LC filter 2145. When this voltage (Vdr) is supplied to the anode of emission LED under test and the positive terminal of the transimpedance amplifier 2130, the transimpedance amplifier produces an output voltage (relative to Vdr) that is supplied to the positive terminal of difference amplifier 2135. Difference amplifier 2135 compares the output voltage of transimpedance amplifier 2130 to Vdr and generates a difference signal, which corresponds to the photocurrent (Iph_d2) induced across the LED chain 2045 (a).

In addition to including a plurality of driver blocks 2115, the LED driver and receiver circuit 2040 may include one or more receiver blocks 2150 for measuring the forward voltages (Vfd) and photocurrents (Iph_d1 or Iph_d2) induced across the one or more dedicated photodetectors 2050. Although only one receiver block 2150 is shown in FIG. 21, the LED driver and receiver circuit 2040 may generally include a number of receiver blocks 2150 equal to the number of dedicated photodetectors included within the emitter module.

In the illustrated embodiment, receiver block 2150 comprises a voltage source 2155, which is coupled for supplying a DC voltage (Vdr) to the anode of the dedicated photodetector 2050 coupled to the receiver block, while the cathode of the photodetector 2050 is connected to current source 2160. When photodetector 2050 is configured for obtaining forward voltage (Vfd), the controller 2190 supplies a "Detector_On" signal to the current source 2160, which forces a fixed drive current (Idrv) equal to the value provided by the "Detector Current" signal through photodetector 2050.

When obtaining detector forward voltage (Vfd) measurements, current source 2160 is configured for drawing a relatively small amount of drive current (Idrv) through photodetector 2050. The voltage drop (Vfd) produced across photodetector 2050 by that current is measured by difference amplifier 2175, which produces a signal equal to the forward voltage (Vfd) drop across photodetector 2050. As noted above, the drive current (Idrv) forced through photodetector 2050 by the current source 2160 is generally a relatively small, non-operative drive current. In the embodiment in which four dedicated photodetectors 2050 are coupled in parallel, the non-operative drive current may be roughly 1 mA. However, smaller/larger drive currents may be used in embodiments that include fewer/greater numbers of photodetectors, or embodiments that do not connect the photodetectors in parallel.

Similar to driver block 2115, receiver block 2150 also includes circuitry for measuring the photocurrents (Iph_d1 or Iph_d2) induced on photodetector 2050 by ambient light, as well as light emitted by the emission LEDs. As shown in FIG. 21, the positive terminal of transimpedance amplifier 2165 is coupled to the Vdr output of voltage source 2155, while the negative terminal is connected to the cathode of photodetector 2050. When connected in this manner, the transimpedance amplifier 2165 produces an output voltage relative to Vdr (e.g., about 0-1V), which is supplied to the positive terminal of difference amplifier 2170. Difference amplifier 2170 compares the output voltage to Vdr and generates a difference signal, which corresponds to the photocurrent (Iph_d1 or Iph_d2) induced across photodetector 2050. Transimpedance amplifier 2165 is enabled when the "Detector_On" signal is low. When the "Detector_On" signal is high, the output of transimpedance amplifier 2165 is tri-stated.

As noted above, some embodiments of the invention may scatter the individual LEDs within each chain of LEDs 2045 about the array of LEDs, so that no two LEDs of the same color exist in any row, column or diagonal (see, e.g., FIG. 19B). By connecting a plurality of dedicated photodetectors 2050 in parallel with the receiver block 2150, the photocurrents (Iph_d1 or Iph_d2) induced on each photodetector 2050 by the LEDs of a given color may be summed to minimize the spatial variation between the similarly colored LEDs, which are scattered about the array.

As shown in FIG. 21, the LED driver and receiver circuit 2040 may also include a multiplexor (Mux) 2180, an analog to digital converter (ADC) 2185, a controller 2190, and an optional temperature sensor 2195. In some embodiments, multiplexor 2180 may be coupled for receiving the emitter forward voltage (Vfe) and the (optional) photocurrent (Iph_d2) measurements from the driver blocks 2115, and the detector forward voltage (Vfd) and detector photocurrent (Iph_d1 and/or Iph_d2) measurements from the receiver block 2150. The ADC 2185 digitizes the emitter forward voltage (Vfe) and the optional photocurrent (Iph_d2) measurements output from the driver blocks 2115, and the detector forward voltage (Vfd) and detector photocurrent (Iph_d1 and/or Iph_d2) measurements output from the receiver block 2150, and provides the results to the controller 2190. The controller 2190 determines when to take forward voltage and photocurrent measurements and produces the Out_En, Emitter Current and Led_On signals, which are supplied to the driver blocks 2115, and the Detector Current and Detector_On signals, which are supplied to the receiver block 2150 as shown in FIG. 21.

In some embodiments, the LED driver and receiver circuit 2040 may include an optional temperature sensor 2195 for taking ambient temperature (Ta) measurements. In such embodiments, multiplexor 2180 may also be coupled for multiplexing the ambient temperature (Ta) with the forward voltage and photocurrent measurements sent to the ADC 2185. In some embodiments, the temperature sensor 2195 may be a thermistor, and may be included on the driver circuit chip for measuring the ambient temperature surrounding the LEDs, or a temperature from the heat sink of the emitter module. If the optional temperature sensor 2195 is included, the output of the temperature sensor may be used in some embodiments to determine if a significant change in temperature is detected. In some embodiments detection of a significant change in temperature may cause compensation measurements to be initiated.

One implementation of an improved illumination device 2000 has now been described in reference to FIGS. 20-21. Further description of such an illumination device may be found in commonly assigned U.S. application Ser. Nos. 13/970,944; 13/970,964; 13/970,990; and 14/097,339. A skilled artisan would understand how the illumination device could be alternatively implemented within the scope of the methods and devices described herein.

Figure 22:
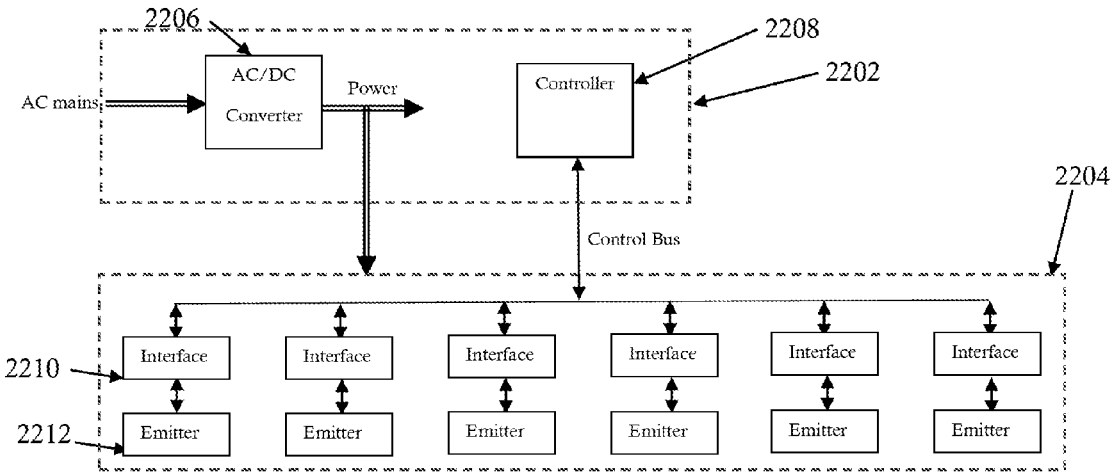
FIG. 22 is an exemplary block diagram of circuit components that may be included within an embodiment of a multi-lamp illumination device disclosed herein.

An exemplary block diagram of circuit components for an illumination device including multiple emitter modules is shown in FIG. 22. In the embodiment of FIG. 22, the circuit components are housed on a power supply board 2202 and emitter board 2204 which are dimensioned to fit within the housing of a linear illumination device. An external view of an embodiment of such a linear illumination device is shown in FIG. 18A. Emitter board 2204 in the embodiment of FIG. 22 includes 6 emitter modules 2212 arranged in a linear row. A representation of a top view of an exemplary embodiment of emitter module 2212 is shown in FIG. 18B.

In the embodiment of FIG. 22, power supply board 2202 comprises AC/DC converter 2206 and controller 2208. AC/DC converter 2206 converters AC mains power to a DC voltage of typically 15-20V, which is then used to power controller 2208 and emitter board 2204. The DC voltage from AC/DC converter 2206 may be converted to lower voltages as well elsewhere within the illumination device. Controller 2208 communicates with emitter board 2204 through a digital control bus, in this example. Controller 2208 could comprise a wireless, power line, or any other type of communication interface to enable the color of the linear illumination device to be adjusted. In an embodiment, controller 2208 also provides to each of interface circuits 2210 a timing signal and an offset from the timing signal at which measurement intervals and/or detection intervals for the associated emitter module are to occur. In a further embodiment, adjacently positioned emitter modules within the illumination device are assigned different offsets from the timing reference, so that compensation measurements performed by adjacent emitter modules are performed using non-overlapping sets of intervals. In one such embodiment, an illumination device including six emitter modules such as that illustrated in FIG. 22 uses three different offsets from a timing reference: a first offset for the first and fourth emitter modules (counting from one end of the device), a second offset for the second and fifth emitter modules, and a third offset for the third and sixth emitter modules. In alternative embodiments a different number of offsets may be used, including the use of a different offset for each individual emitter module.

Figure 23:
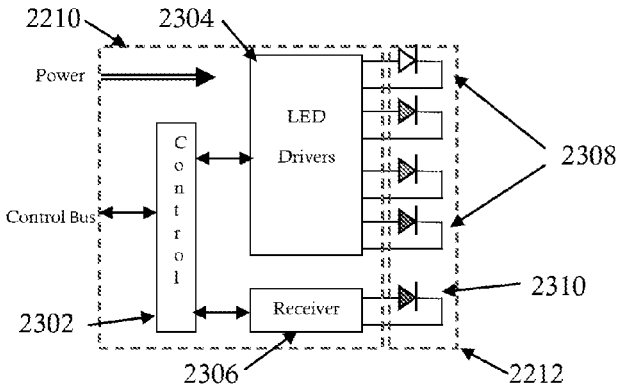
FIG. 23 is an exemplary block diagram of an embodiment of interface and emitter circuitry that may be included within the illumination device of FIG. 22.

In the illustrated embodiment, emitter board 2204 comprises six emitter modules 2212 and six interface circuits 2210. Interface circuits 2210 communicate with controller 2208 over the digital control bus and produce the drive currents supplied to the LEDs within the emitter modules 2212. FIG. 23 illustrates exemplary circuitry that may be included within interface circuitry 2210 and emitter modules 2212. Interface circuitry 2210 comprises control logic 2302, LED drivers 2304, and receiver 2306. Emitter module 2212 comprises emission LEDs 2308 and a detector 2310. Control logic 2302 may comprise a microcontroller or special logic, and communicates with controller 2208 over the digital control bus. Control logic 2302 also sets the drive current produced by LED drivers 2304 to adjust the color and/or intensity of the light produced by emission LEDs 2308, and manages receiver 2306 to monitor the light produced by each individual LED 2308 via detector 2310. In some embodiments, control logic 2302 may comprise memory for storing calibration information necessary for maintaining precise color, or alternatively, such information could be stored in controller 2208. Similarly, other information used in performing the methods described herein is in some embodiments stored in memory locations within control logic 2302, within controller 2208, or distributed between both of these circuits. Such other information may include configuration information such as that discussed in connection with FIG. 17 above.

In an embodiment, the circuit components on power supply board 2202 are implemented in a similar manner as the power supply and control circuitry shown in FIG. 20, including AC/DC converter 2010, DC/DC converter 2015, PLL 2020, wireless interface 2025, and control circuit 2035. Similarly, interface circuit 2210 is in some embodiments implemented in a manner similar to driver and receiver circuit 2040 shown in FIGS. 20-21. LEDs 2308 and detector 2310 are in some embodiments implemented using LED chains 2045 and detectors 2050 of FIG. 20, respectively. Functions of control circuit 2035 in FIG. 20 may in some embodiments be distributed between control logic 2302 of FIG. 23 and controller 2208 of FIG. 22. In some embodiments, certain functions of control circuit 2035 may be duplicated in both controller 2208 and control logic 2302. Controller 2208 may also be referred to as a device control circuit herein. In an embodiment, the device control circuit is configured to control the entire illumination device. Control logic 2302 may also be referred to herein as a module control circuit for its respective emitter module 2212. In an embodiment, the module control circuit is configured to control functionality of its respective emitter module, including performance of compensation measurements and adjustment of illumination settings. Certain functions of the module control circuits may in some embodiments be performed by the device control circuit 2208.

One implementation of an improved illumination device has now been described in reference to FIGS. 22-23. Further description of such an illumination device may be found in commonly assigned U.S. application Ser. Nos. 13/970,944; 13/970,964; 13/970,990; and 14/097,339. A skilled artisan would understand how the illumination device could be alternatively implemented within the scope of the methods and devices described herein.

It will be appreciated to those skilled in the art having the benefit of this disclosure that this invention is believed to provide an improved illumination device and methods for avoiding interference-related errors when compensating individual LEDs in the illumination device for variations in quantities such as drive current and temperature. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A method for controlling an illumination device comprising multiple emitter modules, wherein each emitter module comprises multiple emission light emitting diode (LED) elements and one or more photodetectors, the method comprising:

operating one or more of the multiple emission LED elements in each of the multiple emitter modules to produce illumination substantially continuously by supplying a respective drive current at an operative drive current level to each of the one or more of the multiple emission LED elements;

bringing the respective drive currents of all except one of the emission LED elements within a first emitter module of the multiple emitter modules to a non-operative drive current level, which is insufficient to produce illumination, for the duration of a measurement interval within a first series of measurement intervals interspersed with periods of said illumination; and bringing the respective drive currents of all except one of the emission LED elements within a second emitter module of the multiple emitter modules to a non-operative drive current level, which is insufficient to produce illumination, for the duration of a measurement interval within a second series of measurement intervals interspersed with periods of said illumination, wherein the first series of measurement intervals and the second series of measurement intervals are separated by a respective first offset and second offset from a timing reference.

2. The method of claim 1, for either of the first and second emitter modules, further comprising:

during the measurement interval within the respective first or second series of measurement intervals, applying an operative drive current level, which is sufficient to produce illumination, to the one of the emission LED elements; and during said applying an operative drive current level to the one of the emission LED elements, monitoring a respective first or second measurement photocurrent induced in the one or more photodetectors included within the emitter module.

3. The method of claim 2, for either of the first or second emitter modules, further comprising bringing the drive current applied to the one of the emission LED elements to a non-operative drive current level, which is insufficient to produce illumination, for a portion of the respective measurement interval, such that the respective drive currents of all of the emission LED elements within the respective emitter module are at a non-operative drive current level for the portion of the respective measurement interval.

4. The method of claim 3, for either of the first or second emitter modules and during the portion of the respective measurement interval, further comprising monitoring a respective first or second background photocurrent induced in the one or more photodetectors included within the emitter module.

5. The method of claim 4, for either of the first or second emitter modules, further comprising subtracting the respective first or second background photocurrent from the respective first or second measurement photocurrent.

6. The method of claim 5, for either of the first or second emitter modules, further comprising storing a result of said subtracting as a respective first or second corrected photocurrent.

7. The method of claim 6, wherein said storing a result of said subtracting is in response to a determination that the result is within an expected range.

8. The method of claim 1, wherein the timing reference comprises a periodic timing signal.

9. The method of claim 8, wherein the timing reference is derived from an AC mains signal.

10. The method of claim 1, wherein the multiple emitter modules consist of one or more sets of three emitter modules, and wherein each emitter module within a set uses a respective series of measurement intervals having a different offset from the timing reference than that used by the other emitter modules within the set.

11. An illumination device comprising:

multiple emitter modules, wherein each emitter module comprises multiple emission light emitting diode (LED) elements and one or more photodetectors; and a control circuit operably coupled to the multiple emitter modules, wherein the control circuit is adapted to:

operate one or more of the multiple emission LED elements within each of the multiple emitter modules to produce illumination substantially continuously by supplying a respective drive current at an operative drive current level to each of the one or more of the multiple emission LED elements;

bring the respective drive currents of all except one of the emission LED elements within a first emitter module of the multiple emitter modules to a non-operative drive current level, which is insufficient to produce illumination, for the duration of a measurement interval within a first series of measurement intervals interspersed with periods of said illumination; and bring the respective drive currents of all except one of the emission LED elements within a second emitter module of the multiple emitter modules to a non-operative drive current level, which is insufficient to produce illumination, for the duration of a measurement interval within a second series of measurement intervals interspersed with periods of said illumination, wherein the first series of measurement intervals and the second series of measurement intervals are separated by a respective first offset and second offset from a timing reference.

12. The illumination device of claim 11, further comprising a timing reference generator operatively coupled to the control circuit and adapted to generate the timing reference.

13. The illumination device of claim 12, wherein the timing reference comprises a periodic timing signal and the timing reference generator comprises a phase-locked loop.

14. The illumination device of claim 11, further comprising multiple driver circuits operably coupled to respective emitter modules of the multiple emitter modules and to the control circuit, and wherein the control circuit is configured to adjust a drive current of an LED element within an emitter module by providing a drive current setting to a respective driver circuit for the emitter module.

15. The illumination device of claim 11, wherein, for each of the first and second emitter modules, the control circuit is further adapted to:

during the measurement interval within the respective first or second series of measurement intervals, apply an operative drive current level, which is sufficient to produce illumination, to the one of the emission LED elements; and during said applying the operative drive current level to the one of the emission LED elements, monitor a respective first or second measurement photocurrent induced in the one or more photodetectors included within the emitter module.

16. The illumination device of claim 15, wherein, for each of the first and second emitter modules, the control circuit is further adapted to:

bring the drive current applied to the one of the emission LED elements to a non-operative drive current level, which is insufficient to produce illumination, for a portion of the respective measurement interval, such that the respective drive currents of all of the emission LED elements within the respective emitter module are at a non-operative drive current level for the portion of the respective measurement interval; and during the portion of the respective measurement interval, monitor a respective first or second background photocurrent induced in the one or more photodetectors included within the emitter module.

17. The illumination device of claim 16, wherein, for each of the first and second emitter modules, the control circuit is further adapted to subtract the respective first or second background photocurrent from the respective first or second measurement photocurrent.

18. The illumination device of claim 17, further comprising a plurality of storage locations accessible by the control circuit, and wherein the control circuit is further adapted to store a result of subtracting the first or second background photocurrent from the first or second measurement photocurrent in one or more of the storage locations as a first or second corrected photocurrent.

19. The illumination device of claim 18, wherein the control circuit is further adapted to determine whether the result is within an expected range and store the result in response to a determination that the result is within an expected range.

20. The illumination device of claim 11, wherein the multiple emitter modules consist of one or more sets of three emitter modules, and wherein the control circuit is further adapted to use, for each emitter module within a set, a respective measurement interval having a different offset from the timing reference than that of the other emitter modules within the set.

21. The illumination device of claim 11, wherein the control circuit comprises a respective module control circuit for each emitter module within the illumination device.

22. The illumination device of claim 21, wherein the control circuit further comprises a device control circuit adapted to provide to each of the module control circuits a respective offset from the timing reference for the respective series of measurement intervals used by the respective emitter module.

*23. A method for controlling an illumination device comprising first and second light emitting diode (LED) elements, the method comprising:*

*operating one or more of the first and second LED elements to produce illumination by supplying a respective drive current at an operative drive current level to each of the one or more of the first and second LED elements;*

*bringing the respective drive currents of all except the first LED element to a non-operative drive current level for a duration of a first measurement interval within a first series of measurement intervals; and*

*bringing the respective drive currents of all except the second LED element to a non-operative drive current level for a duration of a second measurement interval within a second series of measurement intervals,*

*wherein the first series of measurement intervals and the second series of measurement intervals are separated by a respective first offset and second offset from a timing reference.*

*24. The method of claim 23, for either of the first or second LED elements, further comprising:*

*during the measurement interval within the respective first or second series of measurement intervals, applying an operative drive current level, which is sufficient to produce illumination, to the respective one of the LED elements; and*

*during the applying the operative drive current level to the respective one of the LED elements, monitoring a respective first or second measurement photocurrent induced in at least one photodetector.*

*25. The method of claim 24, for either of the first or second LED elements, further comprising:*

*bringing the drive current applied to the respective one of the LED elements to a non-operative drive current level for a portion of the respective first or second measurement interval, such that the respective drive currents of all of the LED elements are at a non-operative drive current level for the portion of the respective measurement interval; and*

*during the portion of the respective measurement interval, monitoring a respective first or second background photocurrent induced in the at least one photodetector.*

*26. The method of claim 25, for either of the first or second LED elements, further comprising:*

*subtracting the respective first or second background photocurrent from the respective first or second measurement photocurrent; and*

*storing a respective result of the subtracting in response to a determination that the respective result is within an expected range.*

*27. The method of claim 23, wherein the timing reference is derived from an AC mains signal.*

*28. An illumination device comprising:*

*first and second light emitting diode (LED) elements; and*

*a control circuit operably coupled to the first and the second LED elements, wherein the control circuit is adapted to:*

*operate the first and second LED elements to produce illumination by supplying a respective drive current at an operative drive current level to each of the first and second LED elements;*

*bring the respective drive currents of all except the first LED element to a non-operative drive current level for a duration of a first measurement interval within a first series of measurement intervals; and*

*bring the respective drive currents of all except the second LED element to a non-operative drive current level for a duration of a second measurement interval within a second series of measurement intervals,*

*wherein the first series of measurement intervals and the second series of measurement intervals are separated by a respective first offset and second offset from a timing reference.*

*29. The illumination device of claim 28, further comprising a timing reference generator operatively coupled to the control circuit and adapted to generate the timing reference from an AC mains signal.*

*30. The illumination device of claim 28, wherein, for each of the first and second LED elements, the control circuit is further adapted to:*

*during the measurement interval within the respective first or second series of measurement intervals, apply an operative drive current level, which is sufficient to produce illumination, to the respective one of the LED elements; and*

*during the applying the operative drive current level to the respective one of the LED elements, monitor a respective first or second measurement photocurrent induced in at least one photodetector.*

*31. The illumination device of claim 30, wherein, for each of the first and second LED elements, the control circuit is further adapted to:*

*bring the drive current applied to the one of the LED elements to a non-operative drive current level for a portion of the respective measurement interval, such that the respective drive currents of all of the LED elements are at a non-operative drive current level for the portion of the respective measurement interval; and*

*during the portion of the respective measurement interval, monitor a respective first or second background photocurrent induced in the at least one photodetector.*

*32. The illumination device of claim 31, wherein, for each of the first and second LED elements, the control circuit is further adapted to:*

*subtract the respective first or second background photocurrent from the respective first or second measurement photocurrent; and*

*store in one or more storage locations a respective result of the subtracting in response to a determination that the respective result is within an expected range.*

*33. A method for controlling an illumination device comprising first and second lighting emitting diode (LED) elements, the method comprising:*

*supplying a respective drive current at an operative drive current level to each of the first LED element and the second LED element to produce illumination;*

*during a measurement interval:*

*measuring a first photocurrent induced in at least one photodetector while the respective drive current of the first LED element is supplied at an operative drive current level to produce illumination and the respective drive current of the second LED element is supplied at a non-operative drive current level; and*

*measuring a second photocurrent induced in the least one photodetector while the respective drive current of each of the first LED element and the second LED element is supplied at a non-operative drive current level;*

*subtracting the second photocurrent from the first photocurrent to obtain a corrected photocurrent; and*

*at an end of the measurement interval, supplying an operative drive current to the first LED element to produce illumination, wherein supplying the operative drive current to the first LED element comprises adjusting a level of the operative drive current supplied to the first LED element based at least in part on the corrected photocurrent.*

*34. The method of claim 33,*

*wherein the method further comprises comparing the corrected photocurrent to an expected value; and*

*wherein adjusting the level of the operative drive current supplied to the first LED element based at least in part on the corrected photocurrent comprises adjusting the level of the operative drive current level supplied to the first LED element based at least in part on comparing the corrected photocurrent to the expected value.*

*35. The method of claim 33, wherein the second photocurrent is measured before the first photocurrent is measured.*

*36. The method of claim 33, further comprising:*

*measuring a third photocurrent induced in the least one photodetector while the respective drive current of the second LED element is supplied at an operative drive current level to produce illumination and the respective drive current of the first LED element is supplied at a non-operative drive current level; and*

*measuring a fourth photocurrent induced in the least one photodetector while the respective drive current of each of the first LED element and the second LED element is supplied at a non-operative drive current level;*

*subtracting the fourth photocurrent from the third photocurrent to obtain another corrected photocurrent; and*

*supplying an operative drive current to the second LED element to produce illumination, wherein supplying the operative drive current to the second LED element comprises adjusting a level of the operative drive current supplied to the second LED element based at least in part on the another corrected photocurrent.*

*37. An illumination device comprising:*

*first and second light emitting diode (LED) elements; and*

*a control circuit operably coupled to the first and the second LED elements, wherein the control circuit is adapted to:*

*supply a respective drive current at an operative drive current level to each of the first LED element and the second LED element to produce illumination;*

*during a measurement interval:*

*measure a first photocurrent induced in at least one photodetector while the respective drive current of the first LED element is supplied at an operative drive current level to produce illumination and the respective drive current of the second LED element is supplied at a non-operative drive current level; and*

*measure a second photocurrent induced in the least one photodetector while the respective drive current of each of the first LED element and the second LED element is supplied at a non-operative drive current level;*

*subtract the second photocurrent from the first photocurrent to obtain a corrected photocurrent; and*

*at an end of the measurement interval, supply an operative drive current to the first LED element to produce illumination, wherein to supply the operative drive current to the first LED element comprises to adjust a level of the operative drive current supplied to the first LED element based at least in part on the corrected photocurrent.*

*38. The illumination device of claim 37,*

*wherein the control circuit is further adapted to compare the corrected photocurrent to an expected value; and*

*wherein to adjust the level of the operative drive current supplied to the first LED element based at least in part on the corrected photocurrent comprises to adjust the level of the operative drive current supplied to the first LED element based at least in part on comparing the corrected photocurrent to the expected value.*

*39. The illumination device of claim 37, wherein the control circuit is further adapted to measure the second photocurrent before measuring the first photocurrent.*

*40. The illumination device of claim 37, wherein the control circuit is further adapted to:*

*measure a third photocurrent induced in the least one photodetector while the respective drive current of the second LED element is supplied at an operative drive current level to produce illumination and the respective drive current of the first LED element is supplied at a non-operative drive current level; and*

*measure a fourth photocurrent induced in the least one photodetector while the respective drive current of each of the first LED element and the second LED element is supplied at a non-operative drive current level;*

*subtract the fourth photocurrent from the third photocurrent to obtain another corrected photocurrent; and*

*supply an operative drive current to the second LED element to produce illumination, wherein to supply the operative drive current to the second LED element comprises to adjust a level of the operative drive current supplied to the second LED element based at least in part on the another corrected photocurrent.*

* * * * *